US012523999B2

(12) United States Patent
Davis et al.

(10) Patent No.: US 12,523,999 B2
(45) Date of Patent: Jan. 13, 2026

(54) BUILDING MANAGEMENT SYSTEM WITH INTELLIGENT FAULT VISUALIZATION

(71) Applicant: Johnson Controls Tyco IP Holdings LLP, Milwaukee, WI (US)

(72) Inventors: Robbie Glen Davis, Milwaukee, WI (US); Sourabh Taranath Joshi, Mumbai (IN); Kerry Marie Bell, Mukwonago, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 392 days.

(21) Appl. No.: 17/970,389

(22) Filed: Oct. 20, 2022

(65) Prior Publication Data

US 2024/0134366 A1 Apr. 25, 2024
US 2024/0231349 A9 Jul. 11, 2024

(51) Int. Cl.
*G05B 23/02* (2006.01)
*G05B 15/02* (2006.01)

(52) U.S. Cl.
CPC ......... *G05B 23/0272* (2013.01); *G05B 15/02* (2013.01); *G05B 2223/02* (2018.08)

(58) Field of Classification Search
None
See application file for complete search history.

(56) References Cited

U.S. PATENT DOCUMENTS 5,301,109 A 4/1994 Landauer et al.
5,446,677 A 8/1995 Jensen et al.
5,581,478 A 12/1996 Cruse et al.
5,812,962 A 9/1998 Kovac
5,960,381 A 9/1999 Singers et al.
5,973,662 A 10/1999 Singers et al.
(Continued)

FOREIGN PATENT DOCUMENTS

AU 2019226217 A1 11/2020
AU 2019226264 A1 11/2020
(Continued)

OTHER PUBLICATIONS

U.S. Appl. No. 17/537,046, filed Nov. 29, 2021, Johnson Controls Tyco IP Holdings LLP.
(Continued)

*Primary Examiner* — Jason Lin
(74) *Attorney, Agent, or Firm* — Foley & Lardner LLP

(57) ABSTRACT

A building management system including one or more storage devices storing instructions thereon that, when executed by one or more processors, cause the one or more processors to ingest asset information; cause a graphical model of the building to include a fault indicator based on the asset information, the fault indicator corresponding to a fault occurring on a first physical asset corresponding to a first virtual asset; cause a display device of a user device to display the graphical model within a user interface; receive a selection of the fault indicator from a user via the user interface; and in response to receiving the selection, cause the user interface to navigate to a fault-driven view of the graphical model depicting the first virtual asset and one or more second virtual assets corresponding to one or more second physical assets affected by the fault occurring on the first physical asset.

18 Claims, 36 Drawing Sheets

(56) References Cited

U.S. PATENT DOCUMENTS

| | | | |
|---|---|---|---|
| 6,014,612 A | 1/2000 | Larson et al. |
| 6,031,547 A | 2/2000 | Kennedy |
| 6,134,511 A | 10/2000 | Subbarao |
| 6,157,943 A | 12/2000 | Meyer |
| 6,285,966 B1 | 9/2001 | Brown et al. |
| 6,363,422 B1 | 3/2002 | Hunter et al. |
| 6,385,510 B1 | 5/2002 | Hoog et al. |
| 6,389,331 B1 | 5/2002 | Jensen et al. |
| 6,401,027 B1 | 6/2002 | Xu et al. |
| 6,437,691 B1 | 8/2002 | Sandelman et al. |
| 6,477,518 B1 | 11/2002 | Li et al. |
| 6,487,457 B1 | 11/2002 | Hull et al. |
| 6,493,755 B1 | 12/2002 | Hansen et al. |
| 6,577,323 B1 | 6/2003 | Jamieson et al. |
| 6,626,366 B2 | 9/2003 | Kayahara et al. |
| 6,646,660 B1 | 11/2003 | Patty |
| 6,704,016 B1 | 3/2004 | Oliver et al. |
| 6,732,540 B2 | 5/2004 | Sugihara et al. |
| 6,764,019 B1 | 7/2004 | Kayahara et al. |
| 6,782,385 B2 | 8/2004 | Natsumeda et al. |
| 6,813,532 B2 | 11/2004 | Eryurek et al. |
| 6,816,811 B2 | 11/2004 | Seem |
| 6,823,680 B2 | 11/2004 | Jayanth |
| 6,826,454 B2 | 11/2004 | Sulfstede |
| 6,865,511 B2 | 3/2005 | Frerichs et al. |
| 6,925,338 B2 | 8/2005 | Eryurek et al. |
| 6,986,138 B1 | 1/2006 | Sakaguchi et al. |
| 7,031,880 B1 | 4/2006 | Seem et al. |
| 7,401,057 B2 | 7/2008 | Eder |
| 7,552,467 B2 | 6/2009 | Lindsay |
| 7,627,544 B2 | 12/2009 | Chkodrov et al. |
| 7,818,249 B2 | 10/2010 | Lovejoy et al. |
| 7,889,051 B1 | 2/2011 | Billig et al. |
| 7,996,488 B1 | 8/2011 | Casabella et al. |
| 8,078,330 B2 | 12/2011 | Brickfield et al. |
| 8,104,044 B1 | 1/2012 | Scofield et al. |
| 8,229,470 B1 | 7/2012 | Ranjan et al. |
| 8,401,991 B2 | 3/2013 | Wu et al. |
| 8,495,745 B1 | 7/2013 | Schrecker et al. |
| 8,516,016 B2 | 8/2013 | Park et al. |
| 8,532,808 B2 | 9/2013 | Drees et al. |
| 8,532,839 B2 | 9/2013 | Drees et al. |
| 8,600,556 B2 | 12/2013 | Nesler et al. |
| 8,635,182 B2 | 1/2014 | Mackay |
| 8,682,921 B2 | 3/2014 | Park et al. |
| 8,731,724 B2 | 5/2014 | Drees et al. |
| 8,737,334 B2 | 5/2014 | Ahn et al. |
| 8,738,334 B2 | 5/2014 | Jiang et al. |
| 8,751,487 B2 | 6/2014 | Byrne et al. |
| 8,788,097 B2 | 7/2014 | Drees et al. |
| 8,805,995 B1 | 8/2014 | Oliver |
| 8,843,238 B2 | 9/2014 | Wenzel et al. |
| 8,874,071 B2 | 10/2014 | Sherman et al. |
| 8,941,465 B2 | 1/2015 | Pineau et al. |
| 8,990,127 B2 | 3/2015 | Taylor |
| 9,070,113 B2 | 6/2015 | Shafiee et al. |
| 9,116,978 B2 | 8/2015 | Park et al. |
| 9,185,095 B1 | 11/2015 | Moritz et al. |
| 9,189,527 B2 | 11/2015 | Park et al. |
| 9,196,009 B2 | 11/2015 | Drees et al. |
| 9,229,966 B2 | 1/2016 | Aymeloglu et al. |
| 9,286,582 B2 | 3/2016 | Drees et al. |
| 9,311,807 B2 | 4/2016 | Schultz et al. |
| 9,344,751 B1 | 5/2016 | Ream et al. |
| 9,354,968 B2 | 5/2016 | Wenzel et al. |
| 9,507,686 B2 | 11/2016 | Horn et al. |
| 9,524,594 B2 | 12/2016 | Ouyang et al. |
| 9,558,196 B2 | 1/2017 | Johnston et al. |
| 9,652,813 B2 | 5/2017 | Gifford et al. |
| 9,753,455 B2 | 9/2017 | Drees |
| 9,811,249 B2 | 11/2017 | Chen et al. |
| 9,838,844 B2 | 12/2017 | Emeis et al. |
| 9,886,478 B2 | 2/2018 | Mukherjee |
| 9,948,359 B2 | 4/2018 | Horton |
| 10,055,114 B2 | 8/2018 | Shah et al. |
| 10,055,206 B2 | 8/2018 | Park et al. |
| 10,116,461 B2 | 10/2018 | Fairweather et al. |
| 10,169,454 B2 | 1/2019 | Ait-Mokhtar et al. |
| 10,171,297 B2 | 1/2019 | Stewart et al. |
| 10,171,586 B2 | 1/2019 | Shaashua et al. |
| 10,187,258 B2 | 1/2019 | Nagesh et al. |
| 10,514,963 B2 | 12/2019 | Shrivastava et al. |
| 10,515,098 B2 | 12/2019 | Park et al. |
| 10,534,326 B2 | 1/2020 | Sridharan et al. |
| 10,536,295 B2 | 1/2020 | Fairweather et al. |
| 10,564,993 B2 | 2/2020 | Deutsch et al. |
| 10,705,492 B2 | 7/2020 | Harvey |
| 10,708,078 B2 | 7/2020 | Harvey |
| 10,760,815 B2 | 9/2020 | Janakiraman et al. |
| 10,762,475 B2 | 9/2020 | Song et al. |
| 10,824,120 B2 | 11/2020 | Ahmed |
| 10,845,771 B2 | 11/2020 | Harvey |
| 10,854,194 B2 | 12/2020 | Park et al. |
| 10,862,928 B1 | 12/2020 | Badawy et al. |
| 10,921,760 B2 | 2/2021 | Harvey |
| 10,921,972 B2 | 2/2021 | Park et al. |
| 10,969,133 B2 | 4/2021 | Harvey |
| 10,976,068 B2 | 4/2021 | Hallendy et al. |
| 10,986,121 B2 | 4/2021 | Stockdale et al. |
| 11,016,998 B2 | 5/2021 | Park et al. |
| 11,024,292 B2 | 6/2021 | Park et al. |
| 11,038,709 B2 | 6/2021 | Park et al. |
| 11,041,650 B2 | 6/2021 | Li et al. |
| 11,054,796 B2 | 7/2021 | Holaso |
| 11,070,390 B2 | 7/2021 | Park et al. |
| 11,073,976 B2 | 7/2021 | Park et al. |
| 11,108,587 B2 | 8/2021 | Park et al. |
| 11,113,295 B2 | 9/2021 | Park et al. |
| 11,229,138 B1 | 1/2022 | Harvey et al. |
| 11,314,726 B2 | 4/2022 | Park et al. |
| 11,314,788 B2 | 4/2022 | Park et al. |
| 11,556,105 B2 | 1/2023 | Cooley et al. |
| 11,561,522 B2 | 1/2023 | Cooley et al. |
| 11,561,523 B2 | 1/2023 | Cooley et al. |
| 11,573,551 B2 | 2/2023 | Cooley et al. |
| 11,586,167 B2 | 2/2023 | Cooley et al. |
| 2002/0010562 A1 | 1/2002 | Schleiss et al. |
| 2002/0016639 A1 | 2/2002 | Smith et al. |
| 2002/0059229 A1 | 5/2002 | Natsumeda et al. |
| 2002/0123864 A1 | 9/2002 | Eryurek et al. |
| 2002/0135484 A1 | 9/2002 | Ciccolo et al. |
| 2002/0147506 A1 | 10/2002 | Eryurek et al. |
| 2002/0177909 A1 | 11/2002 | Fu et al. |
| 2003/0005486 A1 | 1/2003 | Ridolfo et al. |
| 2003/0014130 A1 | 1/2003 | Grumelart |
| 2003/0073432 A1 | 4/2003 | Meade, II |
| 2003/0158704 A1 | 8/2003 | Triginai et al. |
| 2003/0171851 A1 | 9/2003 | Brickfield et al. |
| 2003/0200059 A1 | 10/2003 | Ignatowski et al. |
| 2004/0068390 A1 | 4/2004 | Saunders |
| 2004/0128314 A1 | 7/2004 | Katibah et al. |
| 2004/0133314 A1 | 7/2004 | Ehlers et al. |
| 2004/0199360 A1 | 10/2004 | Friman et al. |
| 2005/0055308 A1 | 3/2005 | Meyer et al. |
| 2005/0108262 A1 | 5/2005 | Fawcett et al. |
| 2005/0154494 A1 | 7/2005 | Ahmed |
| 2005/0278703 A1 | 12/2005 | Lo et al. |
| 2005/0283337 A1 | 12/2005 | Sayal |
| 2006/0095521 A1 | 5/2006 | Patinkin |
| 2006/0140207 A1 | 6/2006 | Eschbach et al. |
| 2006/0184479 A1 | 8/2006 | Levine |
| 2006/0200476 A1 | 9/2006 | Gottumukkala et al. |
| 2006/0265751 A1 | 11/2006 | Cosquer et al. |
| 2006/0271589 A1 | 11/2006 | Horowitz et al. |
| 2007/0028179 A1 | 2/2007 | Levin et al. |
| 2007/0203693 A1 | 8/2007 | Estes |
| 2007/0261062 A1 | 11/2007 | Bansal et al. |
| 2007/0273497 A1 | 11/2007 | Kuroda et al. |
| 2007/0273610 A1 | 11/2007 | Baillot |
| 2008/0034425 A1 | 2/2008 | Overcash et al. |
| 2008/0094230 A1 | 4/2008 | Mock et al. |
| 2008/0097816 A1 | 4/2008 | Freire et al. |
| 2008/0186160 A1 | 8/2008 | Kim et al. |
| 2008/0249756 A1 | 10/2008 | Chaisuparasmikul |

(56) References Cited

U.S. PATENT DOCUMENTS

| | | |
|---|---|---|
| 2008/0252723 A1 | 10/2008 | Park |
| 2008/0281472 A1 | 11/2008 | Podgorny et al. |
| 2009/0195349 A1* | 8/2009 | Frader-Thompson ............... G01D 4/002 340/3.1 |
| 2010/0045439 A1 | 2/2010 | Tak et al. |
| 2010/0058248 A1 | 3/2010 | Park |
| 2010/0131533 A1 | 5/2010 | Ortiz |
| 2010/0274366 A1 | 10/2010 | Fata et al. |
| 2010/0281387 A1 | 11/2010 | Holland et al. |
| 2010/0286937 A1 | 11/2010 | Hedley et al. |
| 2010/0324962 A1 | 12/2010 | Nesler et al. |
| 2011/0015802 A1 | 1/2011 | Imes |
| 2011/0047418 A1 | 2/2011 | Drees et al. |
| 2011/0061015 A1 | 3/2011 | Drees et al. |
| 2011/0071685 A1* | 3/2011 | Huneycutt ............ G05B 15/02 700/275 |
| 2011/0077950 A1 | 3/2011 | Hughston |
| 2011/0087650 A1 | 4/2011 | Mackay et al. |
| 2011/0087988 A1 | 4/2011 | Ray et al. |
| 2011/0088000 A1 | 4/2011 | Mackay |
| 2011/0125737 A1 | 5/2011 | Pothering et al. |
| 2011/0137853 A1 | 6/2011 | Mackay |
| 2011/0153603 A1* | 6/2011 | Adiba ................. G06F 16/2477 707/E17.005 |
| 2011/0154363 A1 | 6/2011 | Karmarkar |
| 2011/0157357 A1 | 6/2011 | Weisensale et al. |
| 2011/0178977 A1 | 7/2011 | Drees |
| 2011/0191343 A1 | 8/2011 | Heaton et al. |
| 2011/0205022 A1 | 8/2011 | Cavallaro et al. |
| 2011/0218777 A1 | 9/2011 | Chen et al. |
| 2012/0011126 A1 | 1/2012 | Park et al. |
| 2012/0011141 A1 | 1/2012 | Park et al. |
| 2012/0022698 A1 | 1/2012 | Mackay |
| 2012/0062577 A1 | 3/2012 | Nixon |
| 2012/0064923 A1 | 3/2012 | Imes et al. |
| 2012/0083930 A1 | 4/2012 | Ilic et al. |
| 2012/0100825 A1 | 4/2012 | Sherman et al. |
| 2012/0101637 A1 | 4/2012 | Imes et al. |
| 2012/0135759 A1 | 5/2012 | Imes et al. |
| 2012/0136485 A1 | 5/2012 | Weber et al. |
| 2012/0158633 A1 | 6/2012 | Eder |
| 2012/0259583 A1 | 10/2012 | Noboa et al. |
| 2012/0272228 A1 | 10/2012 | Marndi et al. |
| 2012/0278051 A1 | 11/2012 | Jiang et al. |
| 2013/0007063 A1 | 1/2013 | Kalra et al. |
| 2013/0038430 A1 | 2/2013 | Blower et al. |
| 2013/0038707 A1 | 2/2013 | Cunningham et al. |
| 2013/0060820 A1 | 3/2013 | Bulusu et al. |
| 2013/0086497 A1 | 4/2013 | Ambuhl et al. |
| 2013/0097706 A1 | 4/2013 | Titonis et al. |
| 2013/0103221 A1 | 4/2013 | Raman et al. |
| 2013/0167035 A1 | 6/2013 | Imes et al. |
| 2013/0170710 A1 | 7/2013 | Kuoch et al. |
| 2013/0204836 A1 | 8/2013 | Choi et al. |
| 2013/0246916 A1 | 9/2013 | Reimann et al. |
| 2013/0247205 A1 | 9/2013 | Schrecker et al. |
| 2013/0262035 A1 | 10/2013 | Mills |
| 2013/0275174 A1 | 10/2013 | Bennett et al. |
| 2013/0275908 A1 | 10/2013 | Reichard |
| 2013/0297050 A1 | 11/2013 | Reichard et al. |
| 2013/0298244 A1 | 11/2013 | Kumar et al. |
| 2013/0331995 A1 | 12/2013 | Rosen |
| 2013/0338970 A1 | 12/2013 | Reghetti |
| 2014/0032506 A1 | 1/2014 | Hoey et al. |
| 2014/0059483 A1 | 2/2014 | Mairs et al. |
| 2014/0081652 A1 | 3/2014 | Klindworth |
| 2014/0135952 A1 | 5/2014 | Maehara |
| 2014/0152651 A1 | 6/2014 | Chen et al. |
| 2014/0172184 A1 | 6/2014 | Schmidt et al. |
| 2014/0189861 A1 | 7/2014 | Gupta et al. |
| 2014/0207282 A1 | 7/2014 | Angle et al. |
| 2014/0258052 A1 | 9/2014 | Khuti et al. |
| 2014/0269614 A1* | 9/2014 | Maguire ............... H04L 67/125 370/331 |
| 2014/0277765 A1 | 9/2014 | Karimi et al. |
| 2014/0278461 A1 | 9/2014 | Artz |
| 2014/0327555 A1 | 11/2014 | Sager et al. |
| 2015/0019174 A1 | 1/2015 | Kiff et al. |
| 2015/0042240 A1 | 2/2015 | Aggarwal et al. |
| 2015/0105917 A1 | 4/2015 | Sasaki et al. |
| 2015/0145468 A1* | 5/2015 | Ma ......................... H02J 7/007 320/107 |
| 2015/0156031 A1 | 6/2015 | Fadell et al. |
| 2015/0168931 A1* | 6/2015 | Jin ........................ G05B 15/02 700/90 |
| 2015/0172300 A1 | 6/2015 | Cochenour |
| 2015/0178421 A1 | 6/2015 | Borrelli et al. |
| 2015/0185261 A1 | 7/2015 | Frader-Thompson et al. |
| 2015/0186777 A1 | 7/2015 | Lecue et al. |
| 2015/0202962 A1 | 7/2015 | Habashima et al. |
| 2015/0204563 A1 | 7/2015 | Imes et al. |
| 2015/0235267 A1* | 8/2015 | Steube .................... G06V 20/20 705/14.58 |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0316918 A1 | 11/2015 | Schleiss et al. |
| 2015/0324422 A1 | 11/2015 | Elder |
| 2015/0341212 A1* | 11/2015 | Hsiao ..................... H04L 67/12 715/735 |
| 2015/0348417 A1 | 12/2015 | Ignaczak et al. |
| 2015/0379080 A1 | 12/2015 | Jochimski |
| 2016/0011753 A1 | 1/2016 | Mcfarland et al. |
| 2016/0033946 A1 | 2/2016 | Zhu et al. |
| 2016/0035246 A1 | 2/2016 | Curtis |
| 2016/0065601 A1 | 3/2016 | Gong et al. |
| 2016/0070736 A1 | 3/2016 | Swan et al. |
| 2016/0078229 A1 | 3/2016 | Gong et al. |
| 2016/0090839 A1 | 3/2016 | Stolarczyk |
| 2016/0119434 A1* | 4/2016 | Dong ..................... H04L 67/63 709/220 |
| 2016/0127712 A1 | 5/2016 | Alfredsson et al. |
| 2016/0139752 A1 | 5/2016 | Shim et al. |
| 2016/0140868 A1 | 5/2016 | Lovett et al. |
| 2016/0163186 A1 | 6/2016 | Davidson et al. |
| 2016/0170390 A1 | 6/2016 | Xie et al. |
| 2016/0171862 A1* | 6/2016 | Das ........................ G08B 21/02 340/686.1 |
| 2016/0173816 A1 | 6/2016 | Huenerfauth et al. |
| 2016/0179315 A1 | 6/2016 | Sarao et al. |
| 2016/0179342 A1* | 6/2016 | Sarao ................... G06F 3/04842 715/771 |
| 2016/0179990 A1 | 6/2016 | Sarao et al. |
| 2016/0195856 A1 | 7/2016 | Spero |
| 2016/0212165 A1 | 7/2016 | Singla et al. |
| 2016/0239660 A1 | 8/2016 | Azvine et al. |
| 2016/0239756 A1 | 8/2016 | Aggour et al. |
| 2016/0247129 A1 | 8/2016 | Song et al. |
| 2016/0260063 A1 | 9/2016 | Harris et al. |
| 2016/0313751 A1 | 10/2016 | Risbeck et al. |
| 2016/0313752 A1 | 10/2016 | Przybylski |
| 2016/0313902 A1 | 10/2016 | Hill et al. |
| 2016/0350364 A1 | 12/2016 | Anicic et al. |
| 2016/0357521 A1 | 12/2016 | Zhang et al. |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1* | 12/2016 | Perez ..................... G05B 15/02 |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1 | 2/2017 | Warner et al. |

(56) References Cited

U.S. PATENT DOCUMENTS

| | | |
|---|---|---|
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0084168 A1 | 3/2017 | Janchookiat |
| 2017/0090437 A1 | 3/2017 | Veeramani et al. |
| 2017/0093700 A1* | 3/2017 | Gilley ............... H04L 45/44 |
| 2017/0098086 A1 | 4/2017 | Hoernecke et al. |
| 2017/0103327 A1 | 4/2017 | Penilla et al. |
| 2017/0103403 A1 | 4/2017 | Chu et al. |
| 2017/0123389 A1 | 5/2017 | Baez et al. |
| 2017/0132841 A1 | 5/2017 | Morrison |
| 2017/0134415 A1 | 5/2017 | Muddu et al. |
| 2017/0177715 A1 | 6/2017 | Chang et al. |
| 2017/0180147 A1 | 6/2017 | Brandman et al. |
| 2017/0188216 A1 | 6/2017 | Koskas et al. |
| 2017/0212482 A1 | 7/2017 | Boettcher et al. |
| 2017/0212668 A1 | 7/2017 | Shah et al. |
| 2017/0220641 A1 | 8/2017 | Chi et al. |
| 2017/0230930 A1 | 8/2017 | Frey |
| 2017/0235817 A1 | 8/2017 | Deodhar et al. |
| 2017/0251182 A1 | 8/2017 | Siminoff et al. |
| 2017/0270124 A1 | 9/2017 | Nagano et al. |
| 2017/0277769 A1 | 9/2017 | Pasupathy et al. |
| 2017/0278003 A1 | 9/2017 | Liu |
| 2017/0294132 A1 | 10/2017 | Colmenares |
| 2017/0315522 A1 | 11/2017 | Kwon et al. |
| 2017/0315697 A1 | 11/2017 | Jacobson et al. |
| 2017/0322534 A1 | 11/2017 | Sinha et al. |
| 2017/0323240 A1 | 11/2017 | Johnson et al. |
| 2017/0323389 A1 | 11/2017 | Vavrasek |
| 2017/0329289 A1 | 11/2017 | Kohn et al. |
| 2017/0336770 A1 | 11/2017 | Macmillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357908 A1 | 12/2017 | Cabadi et al. |
| 2018/0012159 A1 | 1/2018 | Kozloski et al. |
| 2018/0013579 A1 | 1/2018 | Fairweather et al. |
| 2018/0024520 A1 | 1/2018 | Sinha et al. |
| 2018/0039238 A1 | 2/2018 | Gärtner et al. |
| 2018/0048485 A1 | 2/2018 | Pelton et al. |
| 2018/0069932 A1 | 3/2018 | Tiwari et al. |
| 2018/0114140 A1* | 4/2018 | Chen .................. G06N 5/02 |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0176241 A1 | 6/2018 | Manadhata et al. |
| 2018/0198627 A1 | 7/2018 | Mullins |
| 2018/0203961 A1 | 7/2018 | Aisu et al. |
| 2018/0239982 A1 | 8/2018 | Rutschman et al. |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0336785 A1 | 11/2018 | Ghannam et al. |
| 2018/0356775 A1 | 12/2018 | Harvey |
| 2018/0359111 A1 | 12/2018 | Harvey |
| 2018/0364654 A1 | 12/2018 | Locke et al. |
| 2019/0005025 A1 | 1/2019 | Malabarba |
| 2019/0013023 A1 | 1/2019 | Pourmohammad et al. |
| 2019/0025771 A1 | 1/2019 | Park et al. |
| 2019/0037135 A1 | 1/2019 | Hedge |
| 2019/0042988 A1 | 2/2019 | Brown et al. |
| 2019/0088106 A1 | 3/2019 | Grundstrom |
| 2019/0094824 A1 | 3/2019 | Xie et al. |
| 2019/0096217 A1 | 3/2019 | Pourmohammad et al. |
| 2019/0102840 A1 | 4/2019 | Perl et al. |
| 2019/0121801 A1 | 4/2019 | Jethwa et al. |
| 2019/0138512 A1 | 5/2019 | Pourmohammad et al. |
| 2019/0146431 A1* | 5/2019 | Nayak ............... G05B 15/02 700/276 |
| 2019/0147883 A1 | 5/2019 | Mellenthin et al. |
| 2019/0158309 A1 | 5/2019 | Park et al. |
| 2019/0163152 A1 | 5/2019 | Worrall et al. |
| 2019/0172161 A1 | 6/2019 | Conboy |
| 2019/0268178 A1 | 8/2019 | Fairweather et al. |
| 2019/0310979 A1 | 10/2019 | Masuzaki et al. |
| 2019/0377306 A1 | 12/2019 | Harvey |
| 2020/0133978 A1 | 4/2020 | Ramamurti et al. |
| 2020/0142365 A1 | 5/2020 | Sharma et al. |
| 2020/0226156 A1 | 7/2020 | Borra et al. |
| 2020/0285203 A1 | 9/2020 | Thakur et al. |
| 2020/0336328 A1 | 10/2020 | Harvey |
| 2020/0348038 A1 | 11/2020 | Risbeck et al. |
| 2020/0348632 A1 | 11/2020 | Harvey |
| 2020/0387576 A1 | 12/2020 | Brett et al. |
| 2020/0393157 A1 | 12/2020 | Turney et al. |
| 2020/0396208 A1 | 12/2020 | Brett et al. |
| 2021/0006622 A1 | 1/2021 | Knight et al. |
| 2021/0010701 A1 | 1/2021 | Nesler et al. |
| 2021/0011444 A1 | 1/2021 | Risbeck et al. |
| 2021/0018881 A1* | 1/2021 | Rezgui ............... G06N 20/00 |
| 2021/0042299 A1 | 2/2021 | Migliori |
| 2021/0043221 A1 | 2/2021 | Yelchuru et al. |
| 2021/0073449 A1* | 3/2021 | Segev ............... G06F 30/27 |
| 2021/0173969 A1 | 6/2021 | Abbey et al. |
| 2021/0191826 A1 | 6/2021 | Duraisingh et al. |
| 2021/0200171 A1* | 7/2021 | Sridharan ......... G06F 16/288 |
| 2021/0200174 A1* | 7/2021 | Sridharan ......... G06F 40/30 |
| 2021/0200713 A1* | 7/2021 | Sridharan ......... G05B 15/02 |
| 2021/0200764 A1 | 7/2021 | Ploegert et al. |
| 2021/0280034 A1 | 9/2021 | Wedig et al. |
| 2021/0325070 A1 | 10/2021 | Endel et al. |
| 2021/0342961 A1 | 11/2021 | Winter et al. |
| 2021/0364181 A1 | 11/2021 | Risbeck et al. |
| 2021/0373509 A1 | 12/2021 | Borah et al. |
| 2021/0373510 A1 | 12/2021 | Borah et al. |
| 2021/0381711 A1 | 12/2021 | Harvey et al. |
| 2021/0381712 A1 | 12/2021 | Harvey et al. |
| 2021/0382445 A1 | 12/2021 | Harvey et al. |
| 2021/0383041 A1 | 12/2021 | Harvey et al. |
| 2021/0383042 A1 | 12/2021 | Harvey et al. |
| 2021/0383200 A1 | 12/2021 | Harvey et al. |
| 2021/0383219 A1 | 12/2021 | Harvey et al. |
| 2021/0383235 A1 | 12/2021 | Harvey et al. |
| 2021/0383236 A1 | 12/2021 | Harvey et al. |
| 2022/0057099 A1 | 2/2022 | Clement et al. |
| 2022/0065479 A1 | 3/2022 | Douglas et al. |
| 2022/0066402 A1 | 3/2022 | Harvey et al. |
| 2022/0066405 A1 | 3/2022 | Harvey |
| 2022/0066432 A1 | 3/2022 | Harvey et al. |
| 2022/0066434 A1 | 3/2022 | Harvey et al. |
| 2022/0066528 A1 | 3/2022 | Harvey et al. |
| 2022/0066722 A1 | 3/2022 | Harvey et al. |
| 2022/0066754 A1 | 3/2022 | Harvey et al. |
| 2022/0066761 A1 | 3/2022 | Harvey et al. |
| 2022/0067226 A1 | 3/2022 | Harvey et al. |
| 2022/0067227 A1 | 3/2022 | Harvey et al. |
| 2022/0067230 A1 | 3/2022 | Harvey et al. |
| 2022/0069863 A1 | 3/2022 | Harvey et al. |
| 2022/0070293 A1 | 3/2022 | Harvey et al. |
| 2022/0082280 A1 | 3/2022 | Douglas et al. |
| 2022/0121965 A1 | 4/2022 | Chatterji et al. |
| 2022/0138684 A1 | 5/2022 | Harvey |
| 2022/0147000 A1 | 5/2022 | Cooley et al. |
| 2022/0150124 A1 | 5/2022 | Cooley et al. |
| 2022/0215264 A1 | 7/2022 | Harvey et al. |
| 2022/0299963 A1* | 9/2022 | Waghmare ......... G05B 19/042 |
| 2023/0010757 A1 | 1/2023 | Preciado |
| 2023/0042065 A1 | 2/2023 | Douglas et al. |
| 2023/0070313 A1 | 3/2023 | Douglas et al. |
| 2023/0071312 A1 | 3/2023 | Preciado et al. |
| 2023/0076011 A1 | 3/2023 | Preciado et al. |
| 2023/0083703 A1 | 3/2023 | Meiners |
| 2023/0103453 A1 | 4/2023 | Douglas et al. |
| 2023/0139152 A1 | 5/2023 | Smith et al. |
| 2023/0153477 A1 | 5/2023 | Somu et al. |
| 2023/0177422 A1 | 6/2023 | Douglas et al. |
| 2023/0250988 A1 | 8/2023 | Risbeck et al. |
| 2023/0272933 A1 | 8/2023 | Douglas et al. |
| 2023/0273576 A1 | 8/2023 | Douglas et al. |
| 2023/0280064 A1 | 9/2023 | Risbeck et al. |

(56) References Cited

U.S. PATENT DOCUMENTS

| | | | |
|---|---|---|---|
| 2023/0324069 | A1 | 10/2023 | Drees et al. |
| 2023/0332794 | A1 | 10/2023 | Douglas |
| 2023/0335272 | A1 | 10/2023 | Douglas |
| 2023/0360517 | A1 | 11/2023 | Beale et al. |
| 2023/0393443 | A1 | 12/2023 | Marquez et al. |
| 2024/0044538 | A1 | 2/2024 | Douglas et al. |
| 2025/0209897 | A1 | 6/2025 | Metzler et al. |
| 2025/0246055 | A1 | 7/2025 | P et al. |

FOREIGN PATENT DOCUMENTS

| | | | |
|---|---|---|---|
| CN | 101415011 | A | 4/2009 |
| CN | 102136099 | A | 7/2011 |
| CN | 102136100 | A | 7/2011 |
| CN | 102650876 | A | 8/2012 |
| CN | 104040583 | A | 9/2014 |
| CN | 104603832 | A | 5/2015 |
| CN | 104919484 | A | 9/2015 |
| CN | 106204392 | A | 12/2016 |
| CN | 106406806 | A | 2/2017 |
| CN | 106960269 | A | 7/2017 |
| CN | 107147639 | A1 | 9/2017 |
| CN | 107598928 | A | 1/2018 |
| CN | 114245857 | A | 3/2022 |
| CN | 114364926 | A | 4/2022 |
| CN | 116391095 | A | 7/2023 |
| EP | 2 528 033 | A1 | 11/2012 |
| EP | 3 268 821 | B1 | 1/2018 |
| EP | 3 324 306 | A1 | 5/2018 |
| EP | 3 997 390 | A1 | 5/2022 |
| EP | 3 997 391 | A1 | 5/2022 |
| EP | 4 214 450 | A1 | 7/2023 |
| EP | 4 226 263 | A1 | 8/2023 |
| JP | H10-049552 | A | 2/1998 |
| JP | 2003-162573 | A | 6/2003 |
| JP | 2007-018322 | A | 1/2007 |
| JP | 4073946 | B1 | 4/2008 |
| JP | 2008-107930 | A | 5/2008 |
| JP | 2013-152618 | A | 8/2013 |
| JP | 2014-044457 | A | 3/2014 |
| KR | 2016/0102923 | A | 8/2016 |
| WO | WO-2009/020158 | A1 | 2/2009 |
| WO | WO-2011/100255 | A2 | 8/2011 |
| WO | WO-2013/050333 | A1 | 4/2013 |
| WO | WO-2015/106702 | A1 | 7/2015 |
| WO | WO-2015/145648 | A1 | 10/2015 |
| WO | WO-2017/035536 | A1 | 3/2017 |
| WO | WO-2017/192422 | A1 | 11/2017 |
| WO | WO-2017/194244 | A1 | 11/2017 |
| WO | WO-2017/205330 | A1 | 11/2017 |
| WO | WO-2017/213918 | A1 | 12/2017 |
| WO | WO-2018/132112 | A1 | 7/2018 |
| WO | WO-2020/061621 | A1 | 4/2020 |
| WO | WO-2021/011464 | A1 | 1/2021 |
| WO | WO-2021/011497 | A1 | 1/2021 |
| WO | WO-2022/042925 | A1 | 3/2022 |
| WO | WO-2022/060886 | A1 | 3/2022 |
| WO | WO-2022/103812 | A1 | 5/2022 |
| WO | WO-2022/103813 | A1 | 5/2022 |
| WO | WO-2022/103820 | A1 | 5/2022 |
| WO | WO-2022/103822 | A1 | 5/2022 |
| WO | WO-2022/103824 | A1 | 5/2022 |
| WO | WO-2022/103829 | A1 | 5/2022 |
| WO | WO-2022/103831 | A1 | 5/2022 |
| WO | WO-2022/155439 | A1 | 7/2022 |

OTHER PUBLICATIONS

U.S. Appl. No. 17/566,029, Passivelogic, Inc.
U.S. Appl. No. 17/567,275, Passivelogic, Inc.
U.S. Appl. No. 17/722,115, Passivelogic, Inc.
Balaji et al., "Brick: Metadata schema for portable smart building applications," Applied Energy, 2018 (20 pages).
Balaji et al., "Brick: Metadata schema for portable smart building applications," Applied Energy, Sep. 15, 2018, 3 pages, (Abstract).
Balaji et al., "Demo Abstract: Portable Queries Using the Brick Schema for Building Applications," BuildSys '16, Palo Alto, CA, USA, Nov. 16-17, 2016 (2 pages).
Balaji, B. et al., "Brick: Towards a Unified Metadata Schema For Buildings." BuildSys '16, Palo Alto, CA, USA, Nov. 16-17, 2016 (10 pages).
Bhattacharya et al., "Short Paper: Analyzing Metadata Schemas for Buildings—The Good, The Bad and The Ugly," BuildSys '15, Seoul, South Korea, Nov. 4-5, 2015 (4 pages).
Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).
Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).
Brick, "Brick: Towards a Unified Metadata Schema For Buildings," URL: chrome-extension://efaidnbmnnnibpcajpcglclefindmkaj/https://brickschema.org/papers/Brick_BuildSys_Presentation.pdf, Presented at BuildSys '16, Nov. 2016 (46 pages).
Brick, "Metadata Schema for Buildings," URL: https://brickschema.org/docs/Brick-Leaflet.pdf, retrieved from internet Dec. 24, 2019 (3 pages).
Chinese Office Action on CN Appl. No. 201780003995.9 dated Apr. 8, 2021 (21 pages with English language translation).
Chinese Office action on CN Appl. No. 201780043400.2 dated Apr. 25, 2021 (15 pages with English language translation).
Curry, E. et al., "Linking building data in the cloud: Integrating cross-domain building data using linked data." Advanced Engineering Informatics, 2013, 27 (pp. 206-219).
Digital Platform Litigation Documents Part 1, includes cover letter, dismissal of case DDE-1-21-cv-01796, IPR2023-00022 (documents filed Jan. 23, 2023-Oct. 7, 2022), and IPR2023-00085 (documents filed Jan. 26, 2023-Oct. 20, 2022) (748 pages total).
Digital Platform Litigation Documents Part 10, includes DDE-1-21-cv-01796 (documents filed Nov. 1, 2022-Dec. 22, 2021 (1795 pages total).
Digital Platform Litigation Documents Part 2, includes IPR2023-00085 (documents filed Oct. 20, 2022) (172 pages total).
Digital Platform Litigation Documents Part 3, includes IPR2023-00085 (documents filed Oct. 20, 2022) and IPR2023-00170 (documents filed Nov. 28, 2022-Nov. 7, 2022) (397 pages total).
Digital Platform Litigation Documents Part 4, includes IPR2023-00170 (documents filed Nov. 7, 2022) and IPR2023-00217 (documents filed Jan. 18, 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2023-Nov. 23, 2022) (316 pages total).
Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).
Digital Platform Litigation Documents Part 9, includes DDE-1-21-cv-01796 (documents filed Jan. 10, 2023-Nov. 1, 2022 (203 pages total).
El Kaed, C. et al., "Building management insights driven by a multi-system semantic representation approach," 2016 IEEE 3rd World Forum on Internet of Things (WF-IoT), Dec. 12-14, 2016, (pp. 520-525).
Ellis, C. et al., "Creating a room connectivity graph of a building from per-room sensor units." BuildSys '12, Toronto, ON, Canada, Nov. 6, 2012 (7 pages).

(56) References Cited

OTHER PUBLICATIONS

Extended European Search Report on EP Application No. 18196948.6 dated Apr. 10, 2019 (9 pages).
Fierro et al., "Beyond a House of Sticks: Formalizing Metadata Tags with Brick," BuildSys '19, New York, NY, USA, Nov. 13-14, 2019 (10 pages).
Fierro et al., "Dataset: An Open Dataset and Collection Tool for BMS Point Labels," DATA'19, New York, NY, USA, Nov. 10, 2019 (3 pages).
Fierro et al., "Design and Analysis of a Query Processor for Brick," ACM Transactions on Sensor Networks, Jan. 2018, vol. 1, No. 1, art. 1 (25 pages).
Fierro et al., "Design and Analysis of a Query Processor for Brick," BuildSys '17, Delft, Netherlands, Nov. 8-9, 2017 (10 pages).
Fierro et al., "Mortar: An Open Testbed for Portable Building Analytics," BuildSys '18, Shenzhen, China, Nov. 7-8, 2018 (10 pages).
Fierro et al., "Why Brick is a Game Changer for Smart Buildings," URL: https://brickschema.org/papers/Brick_Memoori_Webinar_Presentation.pdf, Memoori Webinar, 2019 (67 pages).
Fierro, "Writing Portable Building Analytics with the Brick Metadata Schema," UC Berkeley, ACM E-Energy, 2019 (39 pages).
Fierro, G., "Design of an Effective Ontology and Query Processor Enabling Portable Building Applications," Electrical Engineering and Computer Sciences, University of California at Berkeley, Technical Report No. UCB/EECS-2019-106, Jue 27, 2019 (118 pages).
File History for U.S. Appl. No. 12/776,159, filed May 7, 2010 (722 pages).
Final Conference Program, ACM BuildSys 2016, Stanford, CA, USA, Nov. 15-17, 2016 (7 pages).
Gao et al., "A large-scale evaluation of automated metadata inference approaches on sensors from air handling units," Advanced Engineering Informatics, 2018, 37 (pp. 14-30).
Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/feb21/articles/passivelogic/210127124501passivelogic.html, Feb. 2021 (6 pages).
Hu, S. et al., "Building performance optimisation: A hybrid architecture for the integration of contextual information and time-series data," Automation in Construction, 2016, 70 (pp. 51-61).
International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on PCT Appl. No. PCT/US2022/034101 dated Oct. 10, 2022 (21 pages).
International Search Report and Written Opinion on PCT/US2017/052060, mailed Oct. 5, 2017, 11 pages.
International Search Report and Written Opinion on PCT/US2017/052633, mailed Oct. 23, 2017, 9 pages.
International Search Report and Written Opinion on PCT/US2017/052829, mailed Nov. 27, 2017, 24 pages.
International Search Report and Written Opinion on PCT/US2018/024068, mailed Jun. 15, 2018, 22 pages.
International Search Report and Written Opinion on PCT/US2018/052971, dated Mar. 1, 2019, 19 pages.
International Search Report and Written Opinion on PCT/US2018/052974, mailed Dec. 19, 2018, 13 pages.
International Search Report and Written Opinion on PCT/US2018/052975, mailed Jan. 2, 2019, 13 pages.
International Search Report and Written Opinion on PCT/US2018/052994, mailed Jan. 7, 2019, 15 pages.
International Search Report and Written Opinion on PCT/US2019/015481, dated May 17, 2019, 15 pages.
International Search Report and Written Opinion on PCT/US2020/058381, dated Jan. 27, 2021, 30 pages.
Japanese Office Action on JP Appl. No. 2018-534963 dated May 11, 2021 (16 pages with English language translation).
Koh et al., "Plaster: An Integration, Benchmark, and Development Framework for Metadata Normalization Methods," BuildSys '18, Shenzhen, China, Nov. 7-8, 2018 (10 pages).
Koh et al., "Scrabble: Transferrable Semi-Automated Semantic Metadata Normalization using Intermediate Representation," BuildSys '18, Shenzhen, China, Nov. 7-8, 2018 (10 pages).
Koh et al., "Who can Access What, and When?" BuildSys '19, New York, NY, USA, Nov. 13-14, 2019 (4 pages).
Li et al., "Event Stream Processing with Out-of-Order Data Arrival," International Conferences on Distributed Computing Systems, 2007, (8 pages).
Nissin Electric Co., Ltd., "Smart power supply system (SPSS)," Outline of the scale verification plan, Nissin Electric Technical Report, Japan, Apr. 23, 2014, vol. 59, No. 1 (23 pages).
Passivelogic, "Explorer: Digital Twin Standard for Autonomous Systems. Made interactive." URL: https://passivelogic.com/software/quantum-explorer/, retrieved from internet Jan. 4, 2023 (13 pages).
Passivelogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).
Quantum Alliance, "Quantum Explorer Walkthrough," 2022, (7 pages) (screenshots from video).
Results of the Partial International Search for PCT/US2018/052971, dated Jan. 3, 2019, 3 pages.
Sinha, Sudhi and Al Huraimel, Khaled, "Reimagining Businesses with AI" John Wiley & Sons, Inc., Hoboken, NJ, USA, First ed. published 2020 (156 pages).
Sinha, Sudhi R. and Park, Youngchoon, "Building an Effective IoT Ecosystem for Your Business," Johnson Controls International, Springer International Publishing, 2017 (286 pages).
Sinha, Sudhi, "Making Big Data Work For Your Business: A guide to effective Big Data analytics," Impackt Publishing LTD., Birmingham, UK, Oct. 2014 (170 pages).
The Virtual Nuclear Tourist, "Calvert Cliffs Nuclear Power Plant," URL: http://www.nucleartourist.com/us/calvert.htm, Jan. 11, 2006 (2 pages).
University of California at Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2023 (7 pages).
Van Hoof, Bert, "Announcing Azure Digital Twins: Create digital replicas of spaces and infrastructure using cloud, AI and IoT," URL: https://azure.microsoft.com/en-us/blog/announcing-azure-digital-twins-create-digital-replicas-of-spaces-and-infrastructure-using-cloud-ai-and-iot/, Sep. 24, 2018 (11 pages).
W3C, "SPARQL: Query Language for RDF," located on The Wayback Machine, URL: https://web.archive.org/web/20161230061728/http://www.w3.org/TR/rdf-sparql-query/), retrieved from internet Nov. 15, 2022 (89 pages).
Wang et al., "Linking energy-cyber-physical systems with occupancy prediction and interpretation through WiFi probe-based ensemble classification," Applied Energy, 2019, 236 (pp. 55-69).
Wei et al., "Development and Implementation of Software Gateways of Fire Fighting Subsystem Running on EBI," Control, Automation and Systems Engineering, IITA International Conference on, IEEE, Jul. 2009 (pp. 9-12).
White et al., "Reduce building maintenance costs with AWS IoT TwinMaker Knowledge Graph," The Internet of Things on AWS—Official Blog, URL: https://aws.amazon.com/blogs/iot/reduce-building-maintenance-costs-with-aws-iot-twinmaker-knowledge-graph/, Nov. 18, 2022 (10 pages).
Yao et al., "State of the art review on model predictive control (MPC) in Heating Ventilation and Air-conditioning (HVAC) field," Building and Environment, 2021, 200 (18 pages).
Zhou, Q. et al., "Knowledge-infused and Consistent Complex Event Processing over Real-time and Persistent Streams," Further Generation Computer Systems, 2017, 76 (pp. 391-406).
U.S. Appl. No. 18/271,549, filed Jul. 10, 2023, Drees et al.

(56) References Cited

OTHER PUBLICATIONS

U.S. Appl. No. 18/375,066, filed Sep. 29, 2023, Risbeck et al.

* cited by examiner

BUILDING MANAGEMENT SYSTEM WITH INTELLIGENT FAULT VISUALIZATION

BACKGROUND

This application relates generally to a building management system of a building. This application relates more particularly to systems for managing, processing, and visualizing data for the building.

A building management system may aggregate and store building data received from building equipment and/or other data sources. The building data can be stored in a database. The building management system can include a building system that operates analytic and/or control algorithms against the data of the database to control the building equipment. However, the development and/or deployment of the analytic and/or control algorithms may be time consuming and require a significant amount of software development. Furthermore, the analytic and/or control algorithms may lack flexibility to adapt to changing circumstances in the building. In some cases, the output data of the analytic and/or control algorithms may be hard for a user to conceptualize and relate to the physical components of the building for which the information is generated.

SUMMARY

One implementation of the present disclosure is a building management system for a building comprising one or more storage devices storing instructions thereon that, when executed by one or more processors, cause the one or more processors to ingest asset information from a building system of the building. The instructions, when executed by the one or more processors, further cause the one or more processors to cause a graphical model of the building to include a fault indicator based on the asset information, the fault indicator corresponding to a fault occurring on a first physical asset within the building, the first physical asset corresponding to a first virtual asset within the graphical model. The instructions, when executed by the one or more processors, further cause the one or more processors to cause a display device of a user device to display the graphical model within a user interface. The instructions, when executed by the one or more processors, further cause the one or more processors to receive a selection of the fault indicator from a user via the user interface. The instructions, when executed by the one or more processors, further cause the one or more processors to, in response to receiving the selection, cause the user interface to navigate to a fault-driven view of the graphical model depicting the first virtual asset and one or more second virtual assets, the one or more second virtual assets corresponding to one or more second physical assets affected by the fault occurring on the first physical asset.

Another implementation of the present disclosure is a building management system for a building comprising one or more storage devices storing instructions thereon that, when executed by one or more processors, cause the one or more processors to ingest asset information from a building system of the building. The instructions, when executed by the one or more processors, further cause the one or more processors to identify a plurality of faults within the building based on the asset information, each fault of the plurality of faults being identified based on one or more of a cost impact of the fault, a criticality of the fault, or a duration of the fault. The instructions, when executed by the one or more processors, further cause the one or more processors to cause a graphical model of the building to include a plurality of fault indicators corresponding to the plurality of faults. The instructions, when executed by the one or more processors, further cause the one or more processors to cause a display device of a user device to display the graphical model within a user interface. The instructions, when executed by the one or more processors, further cause the one or more processors to receive a selection of a fault indicator of the plurality of fault indicators associated with a corresponding fault of the plurality of faults from a user via the user interface. The instructions, when executed by the one or more processors, further cause the one or more processors to, in response to receiving the selection, cause the user interface to navigate to an intelligent fault visualization view of the graphical model, the intelligent fault visualization view being based on a first piece of equipment on which the corresponding fault is occurring and one or more of a second piece of equipment that is affected by the corresponding fault, a space affected by the corresponding fault, or a fault type of the corresponding fault.

Another implementation of the present disclosure is a method comprising ingesting asset information from a building system of a building. The method further comprises causing a graphical model of the building to include a fault indicator based on the asset information, the fault indicator corresponding to a fault occurring on a first physical asset within the building, the first physical asset corresponding to a first virtual asset within the graphical model. The method further comprises causing a display device of a user device to display the graphical model within a user interface. The method further comprises receiving a selection of the fault indicator from a user via the user interface. The method further comprises in response to receiving the selection, causing the user interface to navigate to a fault-driven view of the graphical model depicting the first virtual asset and one or more second virtual assets, the one or more second virtual assets corresponding to one or more second physical assets affected by the fault occurring on the first physical asset.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1:
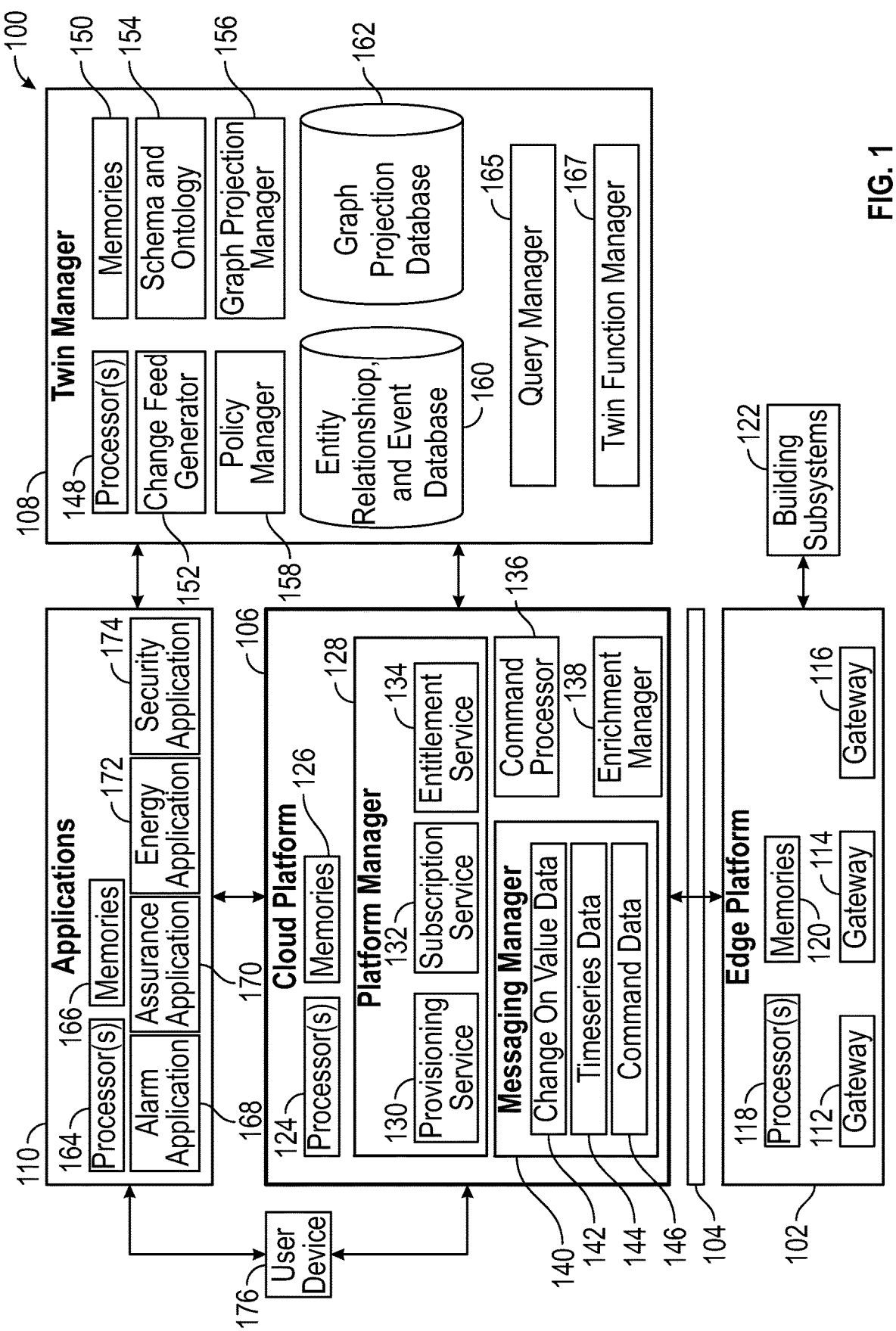
FIG. 1 is a block diagram of a building data platform including an edge platform, a cloud platform, and a twin manager, according to an exemplary embodiment.

Referring generally to the FIGURES, systems and methods for generating three dimensional graphical models (e.g., building models) with intelligent visualization are shown, according to various exemplary embodiments. For example, the systems and methods described herein may pull in or ingest various information, such as a plurality of digital twins (e.g., graph projections associated with virtually represented assets), a variety of externally accessed information relating to one or more virtually represented assets, and/or various other information relating to, associated with, or otherwise pertaining to a graphical model to be generated and displayed to a user.

In some instances, a digital twin can be a virtual representation of a building and/or an entity of the building (e.g., space, piece of equipment, occupant, etc.). Furthermore, the digital twin can represent a service performed in a building, e.g., facility management, clean air optimization, energy prediction, equipment maintenance, etc. In some instances, the systems and methods described herein allow for the cross-correlation of information received or ingested from one or more external sources or systems (e.g., via one or more external access application programming interface (APIs) or software development kit (SDK) components) by using one or more device or asset identification numbers to determine a location of a corresponding virtual asset (e.g., associated with an ingested digital twin) within the graphical model. The cross-correlated information may then be visually represented within the graphical model by displaying the cross-correlated information near the corresponding virtual asset or by utilizing the cross-correlated information to alter a visual representation of the virtual asset itself (e.g., creating a heat map at a cross-correlated location or space within the graphical model, highlighting the corresponding virtual asset within the graphical model, etc.).

In some embodiments, each digital twin can include an information data store and a connector. The information data store can store the information describing the entity that the digital twin operates for (e.g., attributes of the entity, measurements associated with the entity, control points or commands of the entity, etc.). In some embodiments, the data store can be a graph including various nodes and edges. The connector can be a software component that provides device measurement and recording data from the entity (e.g., physical device) to the information store. In some embodiments, the systems and methods described herein are configured to allow for various cross-correlated information received from or ingested from the one or more external sources or systems to be pushed to the corresponding digital twin associated with the virtual asset and used to update one or more pieces of stored information of the digital twin.

In some embodiments, the systems and methods described herein can cause the graphical model to render in a user interface of a user device and allow a user to view the model, view information associated with the components of the model, and/or navigate throughout the model. In some embodiments, a user can provide commands and/or inputs via the user device within the rendered graphical model to request information from and/or push data to one or more of the digital twins and/or one or more external sources or systems associated with one or more virtual assets. In some instances, the commands and/or inputs may further trigger one or more actions by one or more physical assets (e.g., increasing the set point temperature of an air conditioning unit) corresponding to one or more virtual assets interacted with by the user within the graphical model.

Referring now to FIG. 1, a building data platform 100 including an edge platform 102, a cloud platform 106, and a twin manager 108 are shown, according to an exemplary embodiment. The edge platform 102, the cloud platform 106, and the twin manager 108 can each be separate services deployed on the same or different computing systems. In some embodiments, the cloud platform 106 and the twin manager 108 are implemented in off premises computing systems, e.g., outside a building. The edge platform 102 can be implemented on-premises, e.g., within the building. However, any combination of on-premises and off-premises components of the building data platform 100 can be implemented.

The building data platform 100 includes applications 110. The applications 110 can be various applications that operate to manage the building subsystems 122. The applications 110 can be remote or on-premises applications (or a hybrid of both) that run on various computing systems. The applications 110 can include an alarm application 168 configured to manage alarms for the building subsystems 122. The applications 110 include an assurance application 170 that implements assurance services for the building subsystems 122. In some embodiments, the applications 110 include an energy application 172 configured to manage the energy usage of the building subsystems 122. The applications 110 include a security application 174 configured to manage security systems of the building.

In some embodiments, the applications 110 and/or the cloud platform 106 interacts with a user device 176. In some embodiments, a component or an entire application of the applications 110 runs on the user device 176. The user device 176 may be a laptop computer, a desktop computer, a smartphone, a tablet, and/or any other device with an input interface (e.g., touch screen, mouse, keyboard, etc.) and an output interface (e.g., a speaker, a display, etc.).

The applications 110, the twin manager 108, the cloud platform 106, and the edge platform 102 can be implemented on one or more computing systems, e.g., on processors and/or memory devices. For example, the edge platform 102 includes processor(s) 118 and memories 120, the cloud platform 106 includes processor(s) 124 and memories 126, the applications 110 include processor(s) 164 and memories 166, and the twin manager 108 includes processor(s) 148 and memories 150.

The processors can be general purpose or specific purpose processors, an application specific integrated circuit (ASIC), one or more field programmable gate arrays (FPGAs), a group of processing components, or other suitable processing components. The processors may be configured to execute computer code and/or instructions stored in the memories or received from other computer readable media (e.g., CDROM, network storage, a remote server, etc.).

The memories can include one or more devices (e.g., memory units, memory devices, storage devices, etc.) for storing data and/or computer code for completing and/or facilitating the various processes described in the present disclosure. The memories can include random access memory (RAM), read-only memory (ROM), hard drive storage, temporary storage, non-volatile memory, flash memory, optical memory, or any other suitable memory for storing software objects and/or computer instructions. The memories can include database components, object code components, script components, or any other type of information structure for supporting the various activities and information structures described in the present disclosure. The memories can be communicably connected to the processors and can include computer code for executing (e.g., by the processors) one or more processes described herein.

The edge platform 102 can be configured to provide connection to the building subsystems 122. The edge platform 102 can receive messages from the building subsystems 122 and/or deliver messages to the building subsystems 122. The edge platform 102 includes one or multiple gateways, e.g., the gateways 112-116. The gateways 112-116 can act as a gateway between the cloud platform 106 and the building subsystems 122. The gateways 112-116 can be or function similar to the gateways described in U.S. patent application Ser. No. 17/127,303, filed Dec. 18, 2020, the entirety of which is incorporated by reference herein. In some embodiments, the applications 110 can be deployed on the edge platform 102. In this regard, lower latency in management of the building subsystems 122 can be realized.

The edge platform 102 can be connected to the cloud platform 106 via a network 104. The network 104 can communicatively couple the devices and systems of building data platform 100. In some embodiments, the network 104 is at least one of and/or a combination of a Wi-Fi network, a wired Ethernet network, a ZigBee network, a Bluetooth network, and/or any other wireless network. The network 104 may be a local area network or a wide area network (e.g., the Internet, a building WAN, etc.) and may use a variety of communications protocols (e.g., BACnet, IP, LON, etc.). The network 104 may include routers, modems, servers, cell towers, satellites, and/or network switches. The network 104 may be a combination of wired and wireless networks.

The cloud platform 106 can be configured to facilitate communication and routing of messages between the applications 110, the twin manager 108, the edge platform 102, and/or any other system. The cloud platform 106 can include a platform manager 128, a messaging manager 140, a command processor 136, and an enrichment manager 138. In some embodiments, the cloud platform 106 can facilitate messaging between the building data platform 100 via the network 104.

The messaging manager 140 can be configured to operate as a transport service that controls communication with the building subsystems 122 and/or any other system, e.g., managing commands to devices (C2D), commands to connectors (C2C) for external systems, commands from the device to the cloud (D2C), and/or notifications. The messaging manager 140 can receive different types of data from the applications 110, the twin manager 108, and/or the edge platform 102. The messaging manager 140 can receive change on value data 142, e.g., data that indicates that a value of a point has changed. The messaging manager 140 can receive time series data 144, e.g., a time correlated series of data entries each associated with a particular time stamp. Furthermore, the messaging manager 140 can receive command data 146. All of the messages handled by the cloud platform 106 can be handled as an event, e.g., the data 142-146 can each be packaged as an event with a data value occurring at a particular time (e.g., a temperature measurement made at a particular time).

The cloud platform 106 includes a command processor 136. The command processor 136 can be configured to receive commands to perform an action from the applications 110, the building subsystems 122, the user device 176, etc. The command processor 136 can manage the commands, determine whether the commanding system is authorized to perform the particular commands, and communicate the commands to the commanded system, e.g., the building subsystems 122 and/or the applications 110. The commands could be a command to change an operational setting that control environmental conditions of a building, a command to run analytics, etc.

The cloud platform 106 includes an enrichment manager 138. The enrichment manager 138 can be configured to enrich the events received by the messaging manager 140. The enrichment manager 138 can be configured to add contextual information to the events. The enrichment manager 138 can communicate with the twin manager 108 to retrieve the contextual information. In some embodiments, the contextual information is an indication of information related to the event. For example, if the event is a time series temperature measurement of a thermostat, contextual information such as the location of the thermostat (e.g., what room), the equipment controlled by the thermostat (e.g., what VAV), etc. can be added to the event. In this regard, when a consuming application, e.g., one of the applications 110 receives the event, the consuming application can operate based on the data of the event, the temperature measurement, and also the contextual information of the event.

The enrichment manager 138 can solve a problem that when a device produces a significant amount of information, the information may contain simple data without context. An example might include the data generated when a user scans a badge at a badge scanner of the building subsystems 122. This physical event can generate an output event including such information as "DeviceBadgeScannerID," "BadgeID," and/or "Date/Time." However, if a system sends this data to a consuming application, e.g., Consumer A and a Consumer B, each customer may need to call the building data platform knowledge service to query information with queries such as, "What space, build, floor is that badge scanner in?" or "What user is associated with that badge?"

By performing enrichment on the data feed, a system can be able to perform inferences on the data. A result of the enrichment may be transformation of the message "DeviceBadgeScannerId, BadgeId, Date/Time," to "Region, Building, Floor, Asset, DeviceId, BadgeId, UserName, EmployeeId, Date/Time Scanned." This can be a significant optimization, as a system can reduce the number of calls by 1/n, where n is the number of consumers of this data feed.

By using this enrichment, a system can also have the ability to filter out undesired events. If there are 100 building in a campus that receive 100,000 events per building each hour, but only 1 building is actually commissioned, only 1/10 of the events are enriched. By looking at what events are enriched and what events are not enriched, a system can do traffic shaping of forwarding of these events to reduce the cost of forwarding events that no consuming application wants or reads.

An example of an event received by the enrichment manager 138 may be:

```
{
"id": "someguid",
"eventType": "Device_Heartbeat",
"eventTime": "2018-01-27T00:00:00+00:00"
"eventValue": 1,
"deviceID": "someguid"
}
```

An example of an enriched event generated by the enrichment manager 138 may be:

```
{
"id": "someguid",
"eventType": "Device_Heartbeat",
"eventTime": "2018-01-27T00:00:00+00:00"
"eventValue": 1,
"deviceID": "someguid",
"buildingName": "Building-48",
"buildingID": "SomeGuid",
"panelID": "SomeGuid",
"panelName": "Building-48-Panel-13",
"cityID": 371,
"cityName": "Milwaukee",
"stateID": 48,
"stateName": "Wisconsin (WI)",
"countryID": 1,
"countryName": "United States"
}
```

By receiving enriched events, an application of the applications 110 can be able to populate and/or filter what events are associated with what areas. Furthermore, user interface generating applications can generate user interfaces that include the contextual information based on the enriched events.

The cloud platform 106 includes a platform manager 128. The platform manager 128 can be configured to manage the users and/or subscriptions of the cloud platform 106. For example, what subscribing building, user, and/or tenant utilizes the cloud platform 106. The platform manager 128 includes a provisioning service 130 configured to provision the cloud platform 106, the edge platform 102, and the twin manager 108. The platform manager 128 includes a subscription service 132 configured to manage a subscription of the building, user, and/or tenant while the entitlement service 134 can track entitlements of the buildings, users, and/or tenants.

The twin manager 108 can be configured to manage and maintain a digital twin. The digital twin can be a digital representation of the physical environment, e.g., a building. The twin manager 108 can include a change feed generator 152, a schema and ontology 154, a graph projection manager 156, a policy manager 158, an entity, relationship, and event database 160, and a graph projection database 162.

Figure 2:
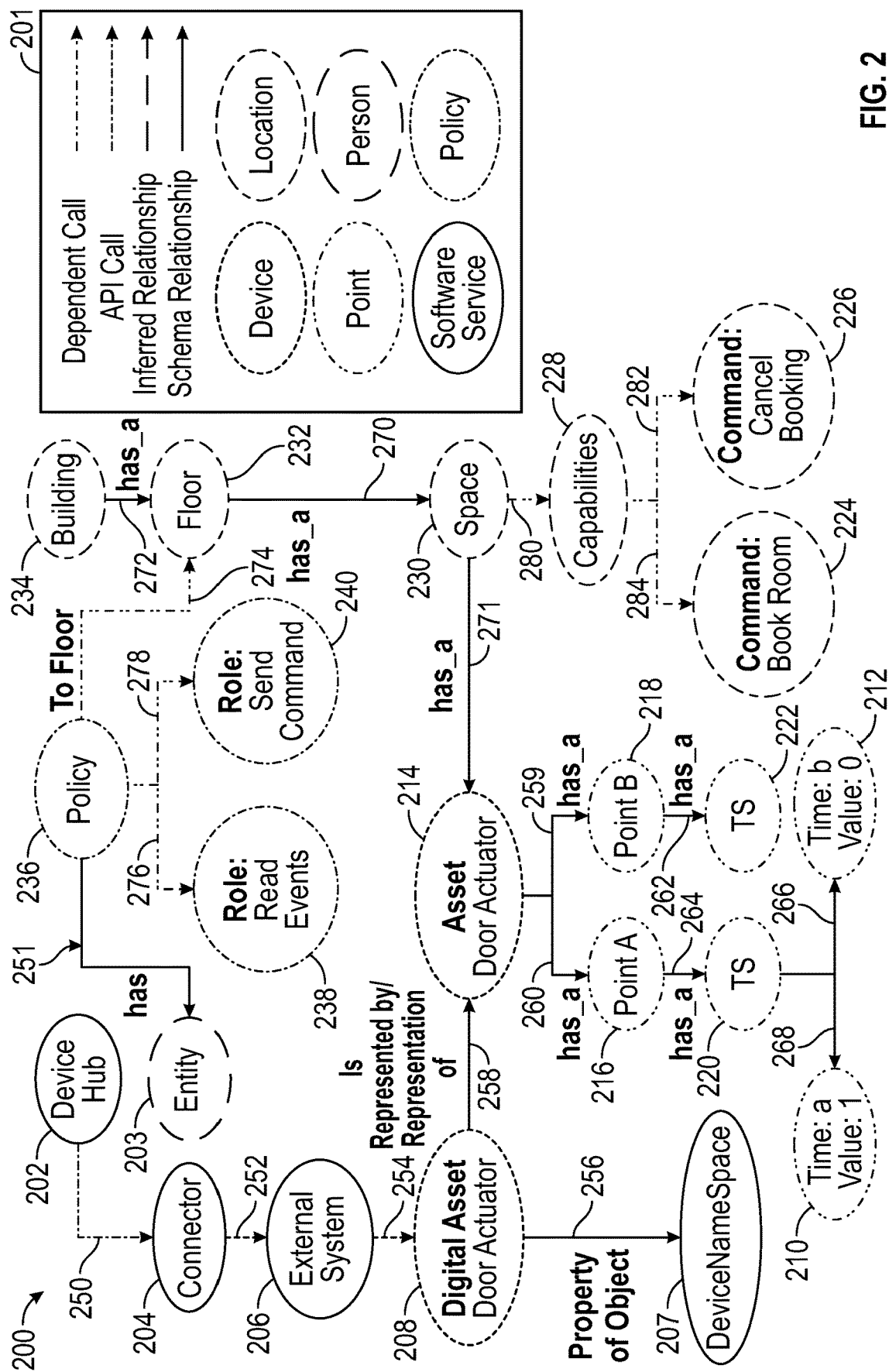
FIG. 2 is a graph projection of the twin manager of FIG. 1 including application programming interface (API) data, capability data, policy data, and services, according to an exemplary embodiment.
Figure 3:
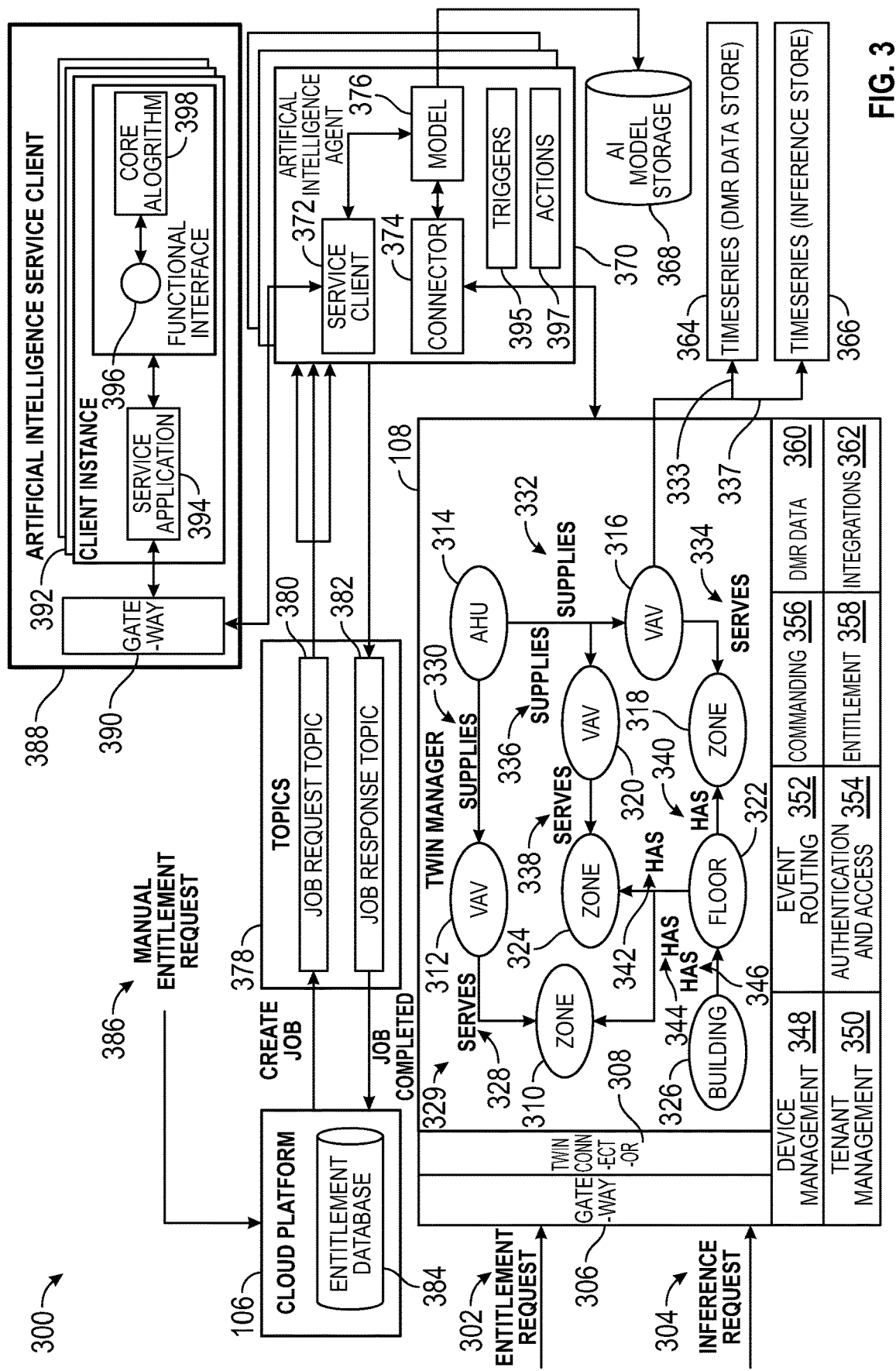
FIG. 3 is a block diagram of a system for managing a digital twin where an artificial intelligence agent can be executed to infer information for an entity of a graph, according to an exemplary embodiment.

The graph projection manager 156 can be configured to construct graph projections and store the graph projections in the graph projection database 162. Example of graph projections are shown in FIGS. 2 and 3. Entities, relationships, and events can be stored in the database 160. The graph projection manager 156 can retrieve entities, relationships, and/or events from the database 160 and construct a graph projection based on the retrieved entities, relationships and/or events. In some embodiments, the database 160 includes an entity-relationship collection for multiple subscriptions.

In some embodiment, the graph projection manager 156 generates a graph projection for a particular user, application, subscription, and/or system. In this regard, the graph projection can be generated based on policies for the particular user, application, and/or system in addition to an ontology specific for that user, application, and/or system. In this regard, an entity could request a graph projection and the graph projection manager 156 can be configured to generate the graph projection for the entity based on policies and an ontology specific to the entity. The policies can indicate what entities, relationships, and/or events the entity has access to. The ontology can indicate what types of relationships between entities the requesting entity expects to see, e.g., floors within a building, devices within a floor, etc. Another requesting entity may have an ontology to see devices within a building and applications for the devices within the graph.

The graph projections generated by the graph projection manager 156 and stored in the graph projection database 162 can be a knowledge graph and is an integration point. For example, the graph projections can represent floor plans and systems associated with each floor. Furthermore, the graph projections can include events, e.g., device measurement and recording data of the building subsystems 122. The graph projections can show application services as nodes and API calls between the services as edges in the graph. The graph projections can illustrate the capabilities of spaces, users, and/or devices. The graph projections can include indications of the building subsystems 122, e.g., thermostats, cameras, air handling units, variable air volume (VAV) systems, cooling towers, pumps, chillers, valves, dampers, lighting, light sensors, fire and safety devices, access control devices, parking sensors, Wifi devices, audio/visual systems, etc. The graph projection database 162 can store graph projections that keep up a current state of a building.

The graph projections of the graph projection database 162 can be digital twins of a building. Digital twins can be digital replicas of physical entities (e.g., locations, spaces, equipment, assets, etc.) that enable an in-depth analysis of data of the physical entities and provide the potential to monitor systems to mitigate risks, manage issues, and utilize simulations to test future solutions. Digital twins can play an important role in helping technicians find the root cause of issues and solve problems faster, in supporting safety and security protocols, and in supporting building managers in more efficient use of energy and other facilities resources. Digital twins can be used to enable and unify security systems, employee experience, facilities management, sustainability, etc.

In some embodiments the enrichment manager 138 can use a graph projection of the graph projection database 162 to enrich events. In some embodiments, the enrichment manager 138 can identify nodes and relationships that are associated with, and are pertinent to, the device that generated the event. For example, the enrichment manager 138 could identify a thermostat generating a temperature measurement event within the graph. The enrichment manager 138 can identify relationships between the thermostat and spaces, e.g., a zone that the thermostat is located in. The enrichment manager 138 can add an indication of the zone to the event.

Furthermore, the command processor 136 can be configured to utilize the graph projections to command the building subsystems 122. The command processor 136 can identify a policy for a commanding entity within the graph projection to determine whether the commanding entity has the ability to make the command. For example, the command processor 136, before allowing a user to make a command, may determine, based on the graph projection database 162, that the user has a policy to be able to make the command.

In some embodiments, the policies can be conditional based policies. For example, the building data platform 100 can apply one or more conditional rules to determine whether a particular system has the ability to perform an action. In some embodiments, the rules analyze a behavioral based biometric. For example, a behavioral based biometric can indicate normal behavior and/or normal behavior rules for a system. In some embodiments, when the building data platform 100 determines, based on the one or more conditional rules, that an action requested by a system does not match a normal behavior, the building data platform 100 can deny the system the ability to perform the action and/or request approval from a higher level system.

For example, a behavior rule could indicate that a user has access to log into a system with a particular IP address between 8 A.M. through 5 P.M. However, if the user logs in to the system at 7 P.M., the building data platform 100 may contact an administrator to determine whether to give the user permission to log in.

The change feed generator 152 can be configured to generate a feed of events that indicate changes to the digital twin, e.g., to the graph. The change feed generator 152 can track changes to the entities, relationships, and/or events of the graph. For example, the change feed generator 152 can detect an addition, deletion, and/or modification of a node or edge of the graph, e.g., changing the entities, relationships, and/or events within the database 160. In response to detecting a change to the graph, the change feed generator 152 can generate an event summarizing the change. The event can indicate what nodes and/or edges have changed and how the nodes and edges have changed. The events can be posted to a topic by the change feed generator 152.

The change feed generator 152 can implement a change feed of a knowledge graph. The building data platform 100 can implement a subscription to changes in the knowledge graph. When the change feed generator 152 posts events in the change feed, subscribing systems or applications can receive the change feed event. By generating a record of all changes that have happened, a system can stage data in different ways, and then replay the data back in whatever order the system wishes. This can include running the changes sequentially one by one and/or by jumping from one major change to the next. For example, to generate a graph at a particular time, all change feed events up to the particular time can be used to construct the graph.

The change feed can track the changes in each node in the graph and the relationships related to them, in some embodiments. If a user wants to subscribe to these changes and the user has proper access, the user can simply submit a web API call to have sequential notifications of each change that happens in the graph. A user and/or system can replay the changes one by one to reinstitute the graph at any given time slice. Even though the messages are "thin" and only include notification of change and the reference "id/seq id," the change feed can keep a copy of every state of each node and/or relationship so that a user and/or system can retrieve those past states at any time for each node. Furthermore, a consumer of the change feed could also create dynamic "views" allowing different "snapshots" in time of what the graph looks like from a particular context. While the twin manager 108 may contain the history and the current state of the graph based upon schema evaluation, a consumer can retain a copy of that data, and thereby create dynamic views using the change feed.

The schema and ontology 154 can define the message schema and graph ontology of the twin manager 108. The message schema can define what format messages received by the messaging manager 140 should have, e.g., what parameters, what formats, etc. The ontology can define graph projections, e.g., the ontology that a user wishes to view. For example, various systems, applications, and/or users can be associated with a graph ontology. Accordingly, when the graph projection manager 156 generates a graph projection for a user, system, or subscription, the graph projection manager 156 can generate a graph projection according to the ontology specific to the user. For example, the ontology can define what types of entities are related in what order in a graph, for example, for the ontology for a subscription of "Customer A," the graph projection manager 156 can create relationships for a graph projection based on the rule:

Region←→Building←→Floor←→Space←→Asset

For the ontology of a subscription of "Customer B," the graph projection manager 156 can create relationships based on the rule:

Building←→Floor←→Asset

The policy manager 158 can be configured to respond to requests from other applications and/or systems for policies. The policy manager 158 can consult a graph projection to determine what permissions different applications, users, and/or devices have. The graph projection can indicate various permissions that different types of entities have and the policy manager 158 can search the graph projection to identify the permissions of a particular entity. The policy manager 158 can facilitate fine grain access control with user permissions. The policy manager 158 can apply permissions across a graph, e.g., if "user can view all data associated with floor 1" then they see all subsystem data for that floor, e.g., surveillance cameras, heating, ventilation, and/or air conditioning ("HVAC") devices, fire detection and response devices, etc.

The twin manager 108 includes a query manager 165 and a twin function manager 167. The query manger 164 can be configured to handle queries received from a requesting system, e.g., the user device 176, the applications 110, and/or any other system. The query manager 165 can receive queries that include query parameters and context. The query manager 165 can query the graph projection database 162 with the query parameters to retrieve a result. The query manager 165 can then cause an event processor, e.g., a twin function, to operate based on the result and the context. In some embodiments, the query manager 165 can select the twin function based on the context and/or perform operates based on the context. In some embodiments, the query manager 165 is configured to perform a variety of differing operations. For example, in some instances, the query manager 165 is configured to perform any of the operations performed by the query manager described in U.S. patent application Ser. No. 17/537,046, filed Nov. 29, 2021, the entirety of which is incorporated by reference herein.

The twin function manager 167 can be configured to manage the execution of twin functions. The twin function manager 167 can receive an indication of a context query that identifies a particular data element and/or pattern in the graph projection database 162. Responsive to the particular data element and/or pattern occurring in the graph projection database 162 (e.g., based on a new data event added to the graph projection database 162 and/or change to nodes or edges of the graph projection database 162), the twin function manager 167 can cause a particular twin function to execute. The twin function can be executed based on an event, context, and/or rules. The event can be data that the twin function executes against. The context can be information that provides a contextual description of the data, e.g., what device the event is associated with, what control point should be updated based on the event, etc. The twin function manager 167 can be configured to perform a variety of differing operations. For example, in some instances, the twin function manager 167 is configured to perform any of the operations of the twin function manager described in U.S. patent application Ser. No. 17/537,046, referenced above.

Referring now to FIG. 2, a graph projection 200 of the twin manager 108 including application programming interface (API) data, capability data, policy data, and services is shown, according to an exemplary embodiment. The graph projection 200 includes nodes 202-240 and edges 250-284. The nodes 202-240 and the edges 250-284 are defined according to the key 201. The nodes 202-240 represent different types of entities, devices, locations, points, persons, policies, and software services (e.g., API services). The edges 250-284 represent relationships between the nodes 202-240, e.g., dependent calls, API calls, inferred relationships, and schema relationships (e.g., BRICK relationships).

The graph projection 200 includes a device hub 202 which may represent a software service that facilitates the communication of data and commands between the cloud platform 106 and a device of the building subsystems 122, e.g., door actuator 214. The device hub 202 is related to a connector 204, an external system 206, and a digital asset "Door Actuator" 208 by edge 250, edge 252, and edge 254.

The cloud platform 106 can be configured to identify the device hub 202, the connector 204, the external system 206 related to the door actuator 214 by searching the graph projection 200 and identifying the edges 250-254 and edge 258. The graph projection 200 includes a digital representation of the "Door Actuator," node 208. The digital asset "Door Actuator" 208 includes a "DeviceNameSpace" represented by node 207 and related to the digital asset "Door Actuator" 208 by the "Property of Object" edge 256.

The "Door Actuator" 214 has points and time series. The "Door Actuator" 214 is related to "Point A" 216 by a "has_a" edge 260. The "Door Actuator" 214 is related to "Point B" 218 by a "has_A" edge 259. Furthermore, time series associated with the points A and B are represented by nodes "TS" 220 and "TS" 222. The time series are related to the points A and B by "has_a" edge 264 and "has_a" edge 262. The time series "TS" 220 has particular samples, sample 210 and 212 each related to "TS" 220 with edges 268 and 266 respectively. Each sample includes a time and a value. Each sample may be an event received from the door actuator that the cloud platform 106 ingests into the entity, relationship, and event database 160, e.g., ingests into the graph projection 200.

The graph projection 200 includes a building 234 representing a physical building. The building includes a floor represented by floor 232 related to the building 234 by the "has_a" edge from the building 234 to the floor 232. The floor has a space indicated by the edge "has_a" 270 between the floor 232 and the space 230. The space has particular capabilities, e.g., is a room that can be booked for a meeting, conference, private study time, etc. Furthermore, the booking can be canceled. The capabilities for the floor 232 are represented by capabilities 228 related to space 230 by edge 280. The capabilities 228 are related to two different commands, command "book room" 224 and command "cancel booking" 226 related to capabilities 228 by edge 284 and edge 282 respectively.

If the cloud platform 106 receives a command to book the space represented by the node, space 230, the cloud platform 106 can search the graph projection 200 for the capabilities for the 228 related to the space 230 to determine whether the cloud platform 106 can book the room.

In some embodiments, the cloud platform 106 could receive a request to book a room in a particular building, e.g., the building 234. The cloud platform 106 could search the graph projection 200 to identify spaces that have the capabilities to be booked, e.g., identify the space 230 based on the capabilities 228 related to the space 230. The cloud platform 106 can reply to the request with an indication of the space and allow the requesting entity to book the space 230.

The graph projection 200 includes a policy 236 for the floor 232. The policy 236 is related set for the floor 232 based on a "To Floor" edge 274 between the policy 236 and the floor 232. The policy 236 is related to different roles for the floor 232, read events 238 via edge 276 and send command 240 via edge 278. The policy 236 is set for the entity 203 based on has edge 251 between the entity 203 and the policy 236.

The twin manager 108 can identify policies for particular entities, e.g., users, software applications, systems, devices, etc. based on the policy 236. For example, if the cloud platform 106 receives a command to book the space 230. The cloud platform 106 can communicate with the twin manager 108 to verify that the entity requesting to book the space 230 has a policy to book the space. The twin manager 108 can identify the entity requesting to book the space as the entity 203 by searching the graph projection 200. Furthermore, the twin manager 108 can further identify the edge has 251 between the entity 203 and the policy 236 and the edge 1178 between the policy 236 and the command 240.

Furthermore, the twin manager 108 can identify that the entity 203 has the ability to command the space 230 based on the edge 274 between the policy 236 and the floor 232 and the edge 270 between the floor 232 and the space 230. In response to identifying the entity 203 has the ability to book the space 230, the twin manager 108 can provide an indication to the cloud platform 106.

Furthermore, if the entity 203 makes a request to read events for the space 230, e.g., the sample 210 and the sample 212, the twin manager 108 can identify the edge has 251 between the entity 203 and the policy 236, the edge 276 between the policy 236 and the read events 238, the edge 274 between the policy 236 and the floor 232, the "has_a" edge 270 between the floor 232 and the space 230, the edge 271 between the space 230 and the door actuator 214, the edge 260 between the door actuator 214 and the point A 216, the "has_a" edge 264 between the point A 216 and the TS 220, and the edges 268 and 266 between the TS 220 and the samples 210 and 212 respectively.

Additional examples of potential graph projections can be found in U.S. patent application Ser. No. 17/537,046, referenced above. However, it will be appreciated that a variety of differing graph projections may be implemented, as desired for a given application or scenario. As such, the example graph projections provided herein are provided as examples, and are in no way meant to be limiting.

Referring now to FIG. 3, a system 300 for managing a digital twin where an artificial intelligence agent can be executed to infer and/or predict information for an entity of a graph is shown, according to an exemplary embodiment. The system 300 can be components of the building data platform 100, e.g., components run on the processors and memories of the edge platform 102, the cloud platform 106, the twin manager 108, and/or the applications 110. The system 300 can, in some implementations, implement a digital twin with artificial intelligence.

A digital twin (or a shadow) may be a computing entity that describes a physical thing (e.g., a building, spaces of a building, devices of a building, people of the building, equipment of the building, etc.) through modeling the physical thing through a set of attributes that define the physical thing. A digital twin can refer to a digital replica of physical assets (a physical device twin) and can be extended to store processes, people, places, systems that can be used for various purposes. The digital twin can include both the ingestion of information and actions learned and executed through artificial intelligence agents.

In FIG. 3, the digital twin can be a graph 329 managed by the twin manager 108 and/or artificial intelligence agents 370. In some embodiments, the digital twin is the combination of the graph 329 with the artificial intelligence agents 370. In some embodiments, the digital twin enables the creation of a chronological time-series database of device measurement and recording data events for analytical purposes. In some embodiments, the graph 329 uses the BRICK schema.

The twin manager 108 stores the graph 329 which may be a graph data structure including various nodes and edges interrelating the nodes. The graph 329 may be the same as, or similar to, the graph projections described herein with reference to FIGS. 1 and 2. The graph 329 includes nodes 310-326 and edges 328-346. The graph 329 includes a building node 326 representing a building that has a floor indicated by the "has" edge 346 to the floor node 322. The floor node 322 is relate to a zone node 310 via a "has" edge 344 indicating that the floor represented by the node 322 has a zone represented by the zone 310.

The floor node 322 is related to the zone node 318 by the "has" edge 340 indicating that the floor represented by the floor node 322 has another zone represented by the zone node 318. The floor node 322 is related to another zone node 324 via a "has" edge 342 representing that the floor represented by the floor node 322 has a third zone represented by the zone node 324.

The graph 329 includes an AHU node 314 representing an AHU of the building represented by the building node 326. The AHU node 314 is related by a "supplies" edge 330 to the VAV node 312 to represent that the AHU represented by the AHU node 314 supplies air to the VAV represented by the VAV node 312. The AHU node 314 is related by a "supplies" edge 336 to the VAV node 320 to represent that the AHU represented by the AHU node 314 supplies air to the VAV represented by the VAV node 320. The AHU node 314 is related by a "supplies" edge 332 to the VAV node 316 to represent that the AHU represented by the AHU node 314 supplies air to the VAV represented by the VAV node 316.

The VAV node 316 is related to the zone node 318 via the "serves" edge 334 to represent that the VAV represented by the VAV node 316 serves (e.g., heats or cools) the zone represented by the zone node 318. The VAV node 320 is related to the zone node 324 via the "serves" edge 338 to represent that the VAV represented by the VAV node 320 serves (e.g., heats or cools) the zone represented by the zone node 324. The VAV node 312 is related to the zone node 310 via the "serves" edge 328 to represent that the VAV represented by the VAV node 312 serves (e.g., heats or cools) the zone represented by the zone node 310.

Furthermore, the graph 329 includes an edge 333 related to a time series node 364. The time series node 364 can be information stored within the graph 329 and/or can be information stored outside the graph 329 in a different database (e.g., a time series database). In some embodiments, the time series node 364 stores time series data (or any other type of data) for a data point of the VAV represented by the VAV node 316. The data of the time series node 364 can be aggregated and/or collected device measurement and recording (DMR) data of the time series node 364.

Furthermore, the graph 329 includes an edge 337 related to a time series node 366. The time series node 366 can be information stored within the graph 329 and/or can be information stored outside the graph 329 in a different database (e.g., a time series database). In some embodiments, the time series node 366 stores time series data (or any other type of data) for a data point of the VAV represented by the VAV node 316. The data of the time series node 364 can be inferred information, e.g., data inferred by one of the artificial intelligence agents 370 and written into the time series node 364 by the artificial intelligence agent 370. In some embodiments, the time series 364 and/or 366 are stored in the graph 329 but are stored as references to time series data stored in a time series database.

The twin manager 108 includes various software components. For example, the twin manager 108 includes a device management component 348 for managing devices of a building. The twin manager 108 includes a tenant management component 350 for managing various tenant subscriptions. The twin manager 108 includes an event routing component 352 for routing various events. The twin manager 108 includes an authentication and access component 354 for performing user and/or system authentication and grating the user and/or system access to various spaces, pieces of software, devices, etc. The twin manager 108 includes a commanding component 356 allowing a software application and/or user to send commands to physical devices. The twin manager 108 includes an entitlement component 358 that analyzes the entitlements of a user and/or system and grants the user and/or system abilities based on the entitlements. The twin manager 108 includes a device measurement and recording (DMR) data component 360 that can receive device measurement and recording data from physical systems and/or devices and ingest the device measurement and recording data into the graph 329. For example, the device measurement and recording data can come from thermostats, cameras, air handling units, variable air volume (VAV) systems, cooling towers, pumps, chillers, valves, dampers, lighting, light sensors, fire and safety devices, access control devices, parking sensors, Wifi devices, audio/visual systems, or any other devices within the building. Furthermore, the twin manager 108 includes an integrations component 362 allowing the twin manager 108 to integrate with other applications.

The twin manager 108 includes a gateway 306 and a twin connector 308. The gateway 306 can be configured to integrate with other systems and the twin connector 308 can be configured to allow the gateway 306 to integrate with the twin manager 108. The gateway 306 and/or the twin connector 308 can receive an entitlement request 302 and/or an inference request 304. The entitlement request 302 can be a request received from a system and/or a user requesting that an AI agent action be taken by the AI agent 370. The entitlement request 302 can be checked against entitlements for the system and/or user to verify that the action requested by the system and/or user is allowed for the user and/or system. The inference request 304 can be a request that the AI agent 370 generates an inference, e.g., a projection of information, a prediction of a future data measurement, an extrapolated data value, etc.

The cloud platform 106 is shown to receive a manual entitlement request 386. The request 386 can be received from a system, application, and/or user device (e.g., from the applications 110, the building subsystems 122, and/or the user device 176). The manual entitlement request 386 may be a request for the AI agent 370 to perform an action, e.g., an action that the requesting system and/or user has an entitlement for. The cloud platform 106 can receive the manual entitlement request 386 and check the manual entitlement request 386 against an entitlement database 384 storing a set of entitlements to verify that the requesting system has access to the user and/or system. The cloud platform 106, responsive to the manual entitlement request 386 being approved, can create a job for the AI agent 370 to perform. The created job can be added to a job request topic 380 of a set of topics 378.

The job request topic 380 can be fed to AI agents 370. For example, the topics 380 can be fanned out to various AI agents 370 based on the AI agent that each of the topics 380 pertains to (e.g., based on an identifier that identifies an agent and is included in each job of the topic 380). The AI agents 370 include a service client 372, a connector 374, and a model 376. The model 376 can be loaded into the AI agent 370 from a set of AI models stored in the AI model storage 368. The AI model storage 368 can store models for making energy load predictions for a building, weather forecasting models for predicting a weather forecast, action/decision models to take certain actions responsive to certain conditions being met, an occupancy model for predicting occupancy of a space and/or a building, etc. The models of the AI model storage 368 can be neural networks (e.g., convolutional neural networks, recurrent neural networks, deep learning networks, etc.), decision trees, support vector machines, and/or any other type of artificial intelligence, machine learning, and/or deep learning category. In some embodiments, the models are rule based triggers and actions that include various parameters for setting a condition and defining an action.

The AI agent 370 can include triggers 395 and actions 397. The triggers 395 can be conditional rules that, when met, cause one or more of the actions 397. The triggers 395 can be executed based on information stored in the graph 329 and/or data received from the building subsystems 122. The actions 397 can be executed to determine commands, actions, and/or outputs. The output of the actions 397 can be stored in the graph 329 and/or communicated to the building subsystems 122.

The AI agent 370 can include a service client 372 that causes an instance of an AI agent to run. The instance can be hosted by the artificial intelligence service client 388. The client 388 can cause a client instance 392 to run and communicate with the AI agent 370 via a gateway 390. The client instance 392 can include a service application 394 that interfaces with a core algorithm 398 via a functional interface 396. The core algorithm 398 can run the model 376, e.g., train the model 376 and/or use the model 376 to make inferences and/or predictions.

In some embodiments, the core algorithm 398 can be configured to perform learning based on the graph 329. In some embodiments, the core algorithm 398 can read and/or analyze the nodes and relationships of the graph 329 to make decisions. In some embodiments, the core algorithm 398 can be configured to use device measurement and recording data (e.g., the time series data 364) from the graph 329 to make inferences on and/or perform model learning. In some embodiments, the result of the inferences can be the time series 366. In some embodiments, the time series 364 is an input into the model 376 that predicts the time series 366.

In some embodiments, the core algorithm 398 can generate the time series 366 as an inference for a data point, e.g., a prediction of values for the data point at future times. The time series 364 may be actual data for the data point. In this regard, the core algorithm 398 can learn and train by comparing the inferred data values against the true data values. In this regard, the model 376 can be trained by the core algorithm 398 to improve the inferences made by the model 376.

In some embodiments, the system 300 is configured to execute one or more artificial intelligence agents to infer and/or predict information based on information obtained or otherwise retrieved from the graph 329. For example, in some instances, the system 300 may include a variety of different AI agents associated with and configured to analyze information pertaining to any of the various nodes within the graph 329. In some instances, the AI agents may analyze not only the nodes they pertain to, but also a variety of connectors and various triggers associated with those AI agents. For example, in some instances AI agents may be utilized to infer and/or predict information pertaining to the corresponding nodes, and to subsequently trigger various actions within the system 300. In some embodiment, the AI agents may trigger various actions according to associated trigger rules and action rules. The trigger rules and action rules can be logical statements and/or conditions that include parameter values and/or create associated output actions. In some instances, these trigger rules and actions rule may be defined by a user of the system 300. In some other instances, the AI agents may learn, create, or otherwise generate the trigger rules and actions rules based on various desired outcomes (e.g., reduce or minimize energy usage, improve or maximize air circulation, etc.). Example AI agents, triggers, actions, and trigger/rule learning processes are described in U.S. patent application Ser. No. 17/537,046, referenced above.

Figure 4:
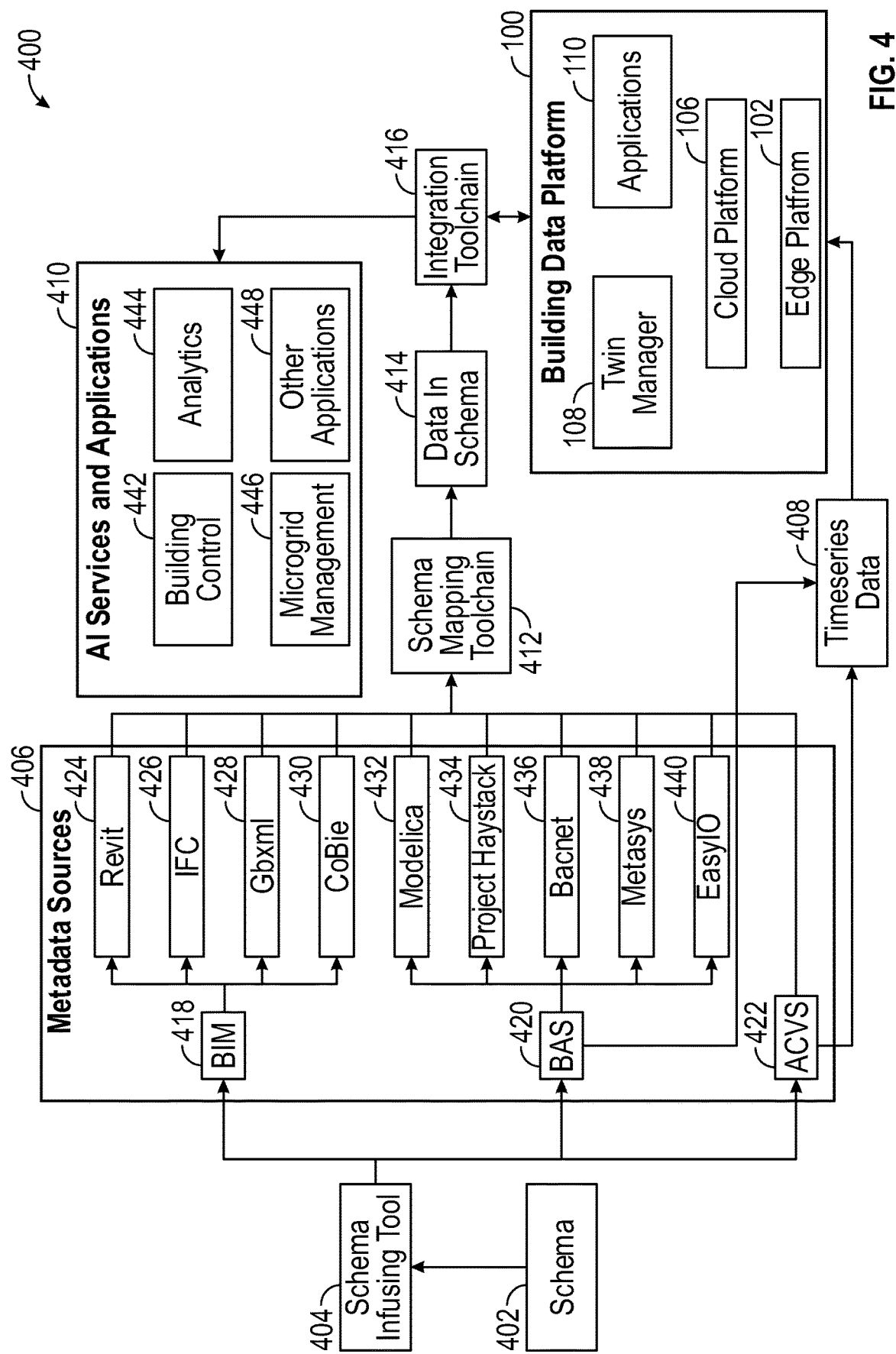
FIG. 4 is a block diagram of metadata sources being integrated with the building data platform of FIG. 1, according to an exemplary embodiment.

Referring now to FIG. 4, a system 400 where metadata sources 406 are integrated with the building data platform 100 is shown, according to an exemplary embodiment. The system 400 can be implemented on one or more processing circuits, e.g., as instructions stored on one or more memory devices and executed on one or more processors. The memory devices and processors may be the same as or similar to the memory devices and processors described with reference to FIG. 1.

The system 400 includes a schema infusing tool 404. The schema infusing tool can infuse a particular schema, the schema 402, into various systems, services, and/or equipment in order to integrate the data of the various systems, services, and/or equipment into the building data platform 100. The schema 402 may be the BRICK schema, in some embodiments. In some embodiment, the schema 402 may be a schema that uses portions and/or all of the BRICK schema but also includes unique class, relationship types, and/or unique schema rules. The schema infusing tool 404 can infuse the schema 402 into systems such as systems that manage and/or produce building information model (BIM) data 418, building automation system (BAS) systems that produce BAS data 420, and/or access control and video surveillance (ACVS) systems that produce ACVS data 422. In some embodiments, the BIM data 418 can be generated by BIM automation utilities 2501.

The BIM data 418 can include data such as Revit data 424 (e.g., Navisworks data), industrial foundation class (IFC) data 426, gbxml data 428, and/or CoBie data 430. The BAS data 420 can include Modelica data 432 (e.g., Control Description Language (CDL) data), Project Haystack data 434, BACnet data 436, Metasys data 438, and/or EasyIO data 440. All of this data can utilize the schema 402 and/or be capable of being mapped into the schema 402.

The BAS data 420 and/or the ACVS data 422 may include time series data 408. The time series data 408 can include trends of data points over time, e.g., a time correlated set of data values each corresponding to time stamps. The time series data can be a time series of data measurements, e.g., temperature measurements, pressure measurements, etc. Furthermore, the time series data can be a time series of inferred and/or predicted information, e.g., an inferred temperature value, an inferred energy load, a predicted weather forecast, identities of individuals granted access to a facility over time, etc. The time series data 408 can further indicate command and/or control data, e.g., the damper position of a VAV over time, the set point of a thermostat over time, etc.

The system 400 includes a schema mapping toolchain 412. The schema mapping toolchain 412 can map the data of the metadata sources 406 into data of the schema 402, e.g., the data in schema 414. The data in schema 414 may be in a schema that can be integrated by an integration toolchain 416 with the building data platform 100 (e.g. ingested into the databases, graphs, and/or knowledge bases of the building data platform 100) and/or provided to the AI services and applications 410 for execution).

The AI services and applications 410 include building control 442, analytics 444, micro-grid management 446, and various other applications 448. The building control 442 can include various control applications that may utilize AI, ML, and/or any other software technique for managing control of a building. The building control 442 can include auto sequence of operation, optimal supervisory controls, etc. The analytics 444 include clean air optimization (CAO) applications, energy prediction model (EPM) applications, and/or any other type of analytics.

Figure 5A:
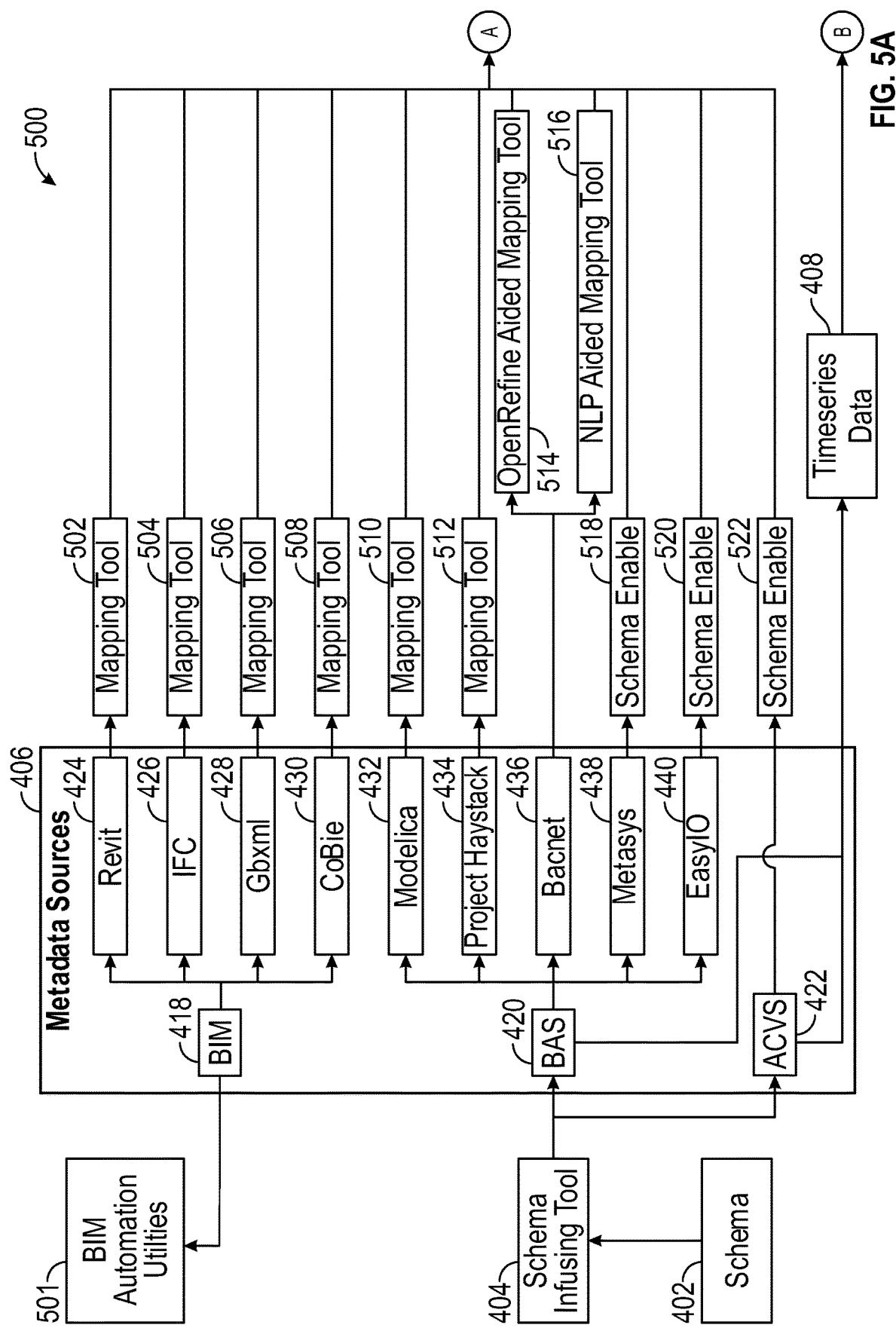
FIGS. 5A and 5B depict another block diagram of metadata sources being integrated with the building data platform of FIG. 1 and including AI agents, according to an exemplary embodiment.
Figure 5B:
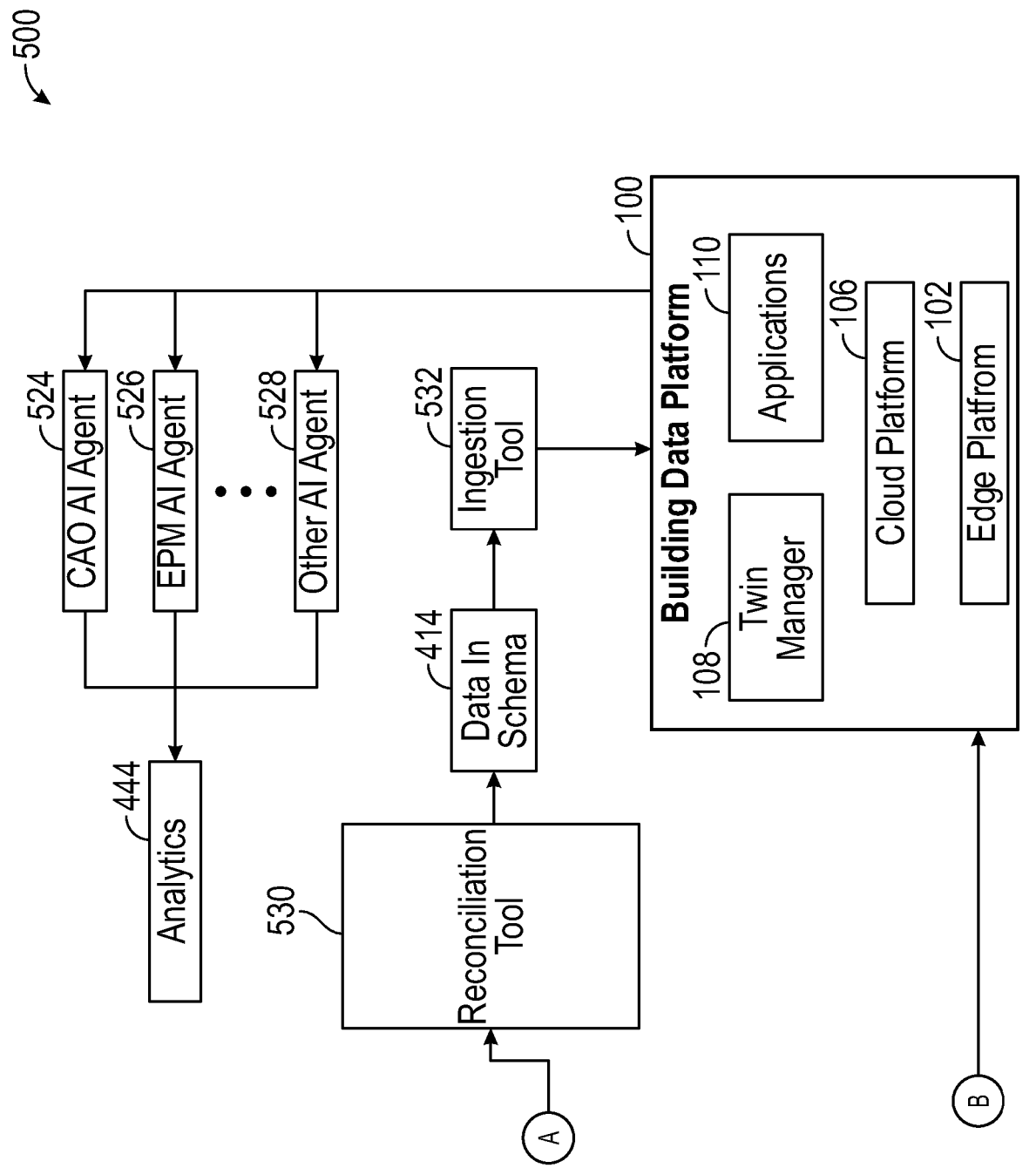

Referring now to FIG. 5, a system 500 including metadata sources 406 being integrated with the building data platform 100 and including AI agents is shown, according to an exemplary embodiment. The system 500 can be implemented on one or more processing circuits, e.g., as instructions stored on one or more memory devices and executed on one or more processors. The memory devices and processors may be the same as or similar to the memory devices and processors described with reference to FIG. 1.

The system 500 includes various tools for converting the metadata sources 406 into the data in schema 414. Various mapping tools 502-512 can map data from an existing schema into the schema 402. For example, the mapping tools 502-512 can utilize a dictionary that provides mapping rules and syntax substitutions. In some embodiments, that data sources can have the schema 402 activated, e.g., schema enable 518-522. If the schema 402 is enabled for a Metasys data source, an easy IO data source, or an ACVS data sources, the output data by said systems can be in the schema 402. Examples of schema mapping techniques can be found in U.S. patent application Ser. No. 16/663,623 filed Oct. 25, 2019, U.S. patent application Ser. No. 16/885,968 filed May 28, 2020, and U.S. patent application Ser. No. 16/885,959 filed May 28, 2020, the entireties of which are incorporated by reference herein.

For the EasyIO data 440, the EasyIO controller objects could be tagged with classes of the schema 402. For the Revit data 424, the metadata of a REVIT model could be converted into the schema 402, e.g., into a resource description format (RDF). For the Metasys data 438, Metasys SCT data could be converted into RDF. An OpenRefine aided mapping tool 514 and/or a natural language aided mapping tool 516 could perform the schema translation for the BACnet data 436.

The schema data output by the tools 502-522 can be provided to a reconciliation tool 530. The reconciliation tool 530 can be configured to merge complementary or duplicate information and/or resolve any conflicts in the data received from the tools 502-522. The result of the reconciliation performed by the reconciliation tool 530 can be the data in schema 414 which can be ingested into the building data platform 100 by the ingestion tool 532. The ingestion tool 532 can generate and/or update one or more graphs managed and/or stored by the twin manager 108. For example, the graph could be any of the graphs described with reference to FIGS. 1-3 or any other graph, as desired for a given application, scenario, or configuration.

The system 500 includes agents that perform operations on behalf of the AI services and applications 410. For example, as shown in the system 500, the analytics 444 are related to various agents, a CAO AI agent 524, an EPM AI agent 526, and various other AI agents 528. The agents 524-528 can receive data from the building data platform 100, e.g., the data that the ingestion tool 532 ingests into the building data platform 100, and generate analytics data for the analytics 444.

Figure 6:
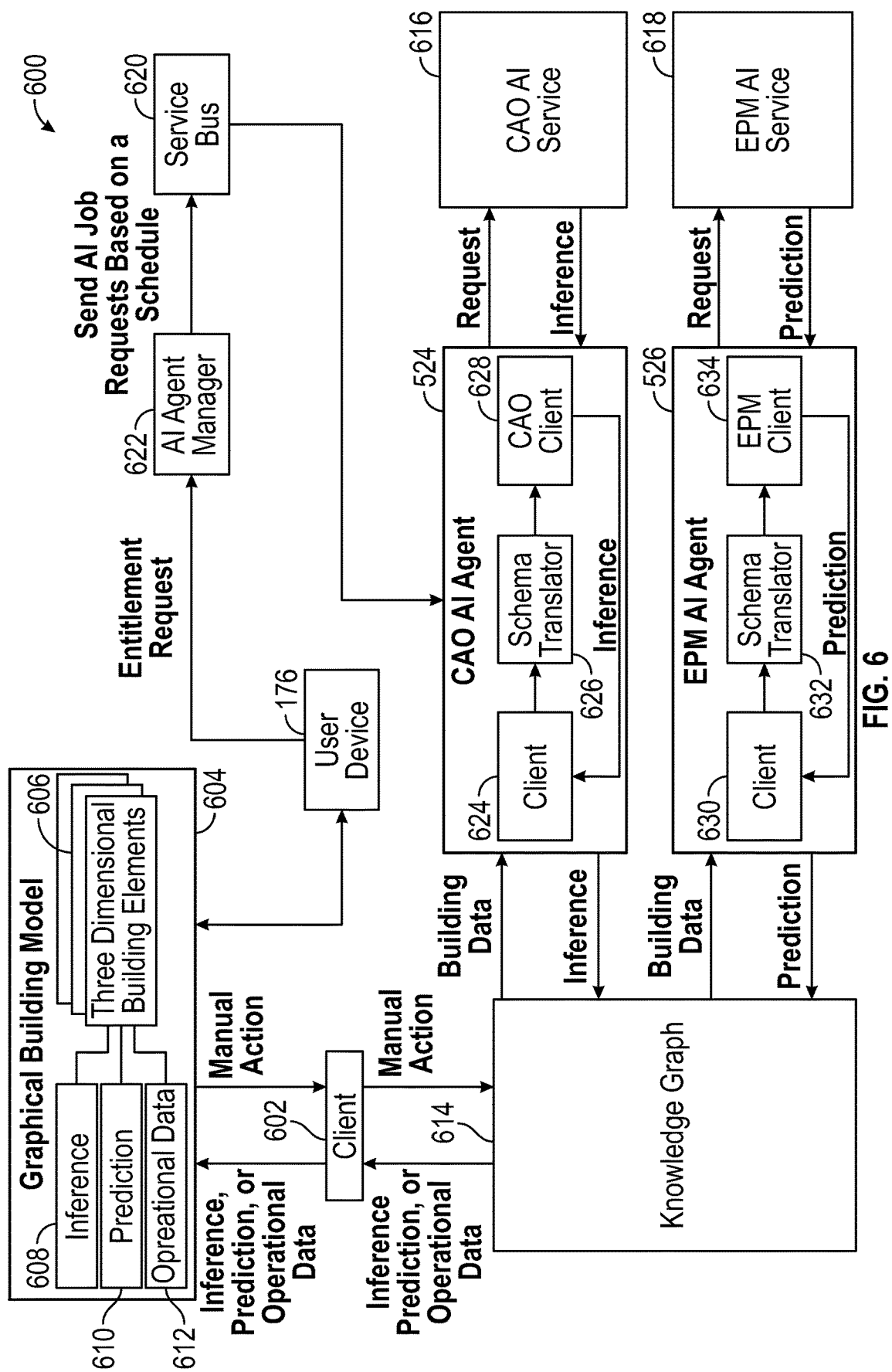
FIG. 6 is a block diagram of inferences and predictions of the CAO AI agent and the EPM AI agent being presented in a three dimensional graphic interface, according to an exemplary embodiment.

Referring now to FIG. 6, inferences and/or predictions of the CAO AI agent 524 and the EPM AI agent 526 being presented in a three dimensional graphic interface by a system 600 is shown, according to an exemplary embodiment. The system 600 can be implemented on one or more processing circuits, e.g., as instructions stored on one or more memory devices and executed on one or more processors. The memory devices and processors may be the same as or similar to the memory devices and processors described with reference to FIG. 1. It should be appreciated that the inferences and predictions described herein with reference to the CAO AI agent 524 and the EPM AI agent 526 are provided as examples. In some other instances, the system 600 may allow for various other inferences and/or predictions to be presented via various other agents, as desired for a given application, scenario, or configuration.

The system 600 includes a client 602. The client 602 can integrate with the knowledge graph 614 and also with a graphical building model 604 that can be rendered on a screen of the user device 176. For example, the knowledge graph 614 could be any of the graphs described with reference to FIGS. 1-3 or any other graph, as desired for a given application, scenario, or configurations. In some instances, the knowledge graph 614 may be any of the graph projections found in U.S. patent application Ser. No. 17/537,046, referenced above.

The client 602 can retrieve information from the knowledge graph 614, e.g., an inference generated by the CAO AI agent 524, a prediction made by the EPM AI agent 526, operational data stored in the knowledge graph 614, and/or any other relevant information. The client 602 can ingest the values of the retrieved information into the graphical building model 604 which can be displayed on the user device 176. In some embodiments, when a particular visual component is being displayed on the user device 176 for the virtual model 604, e.g., a building, the corresponding information for the building can be displayed in the interface, e.g., inferences, predictions, and/or operational data.

For example, the client 602 could identify a node of the building in the knowledge graph 614, e.g., a building node, such as building node 234. The client 602 could identify information linked to the building node via edges, e.g., an energy prediction node related to the building node via an edge. The client 602 can cause the energy prediction associated with the building node to be displayed in the graphical building model 604.

In some embodiments, a user can provide input through the graphical building model 604. The input may be a manual action that a user provides via the user device 176. The manual action can be ingested into the knowledge graph 614 and stored as a node within the knowledge graph 614. In some embodiments, the manual action can trigger one of the agents 524-526 causing the agent to generate an inference and/or prediction which is ingested into the knowledge graph 614 and presented for user review in the model 604.

In some embodiments, the knowledge graph 614 includes data for the inferences and/or predictions that the agents 524 and 526 generate. For example, the knowledge graph 614 can store information such as the size of a building, the number of floors of the building, the equipment of each floor of the building, the square footage of each floor, square footage of each zone, ceiling heights, etc. The data can be stored as nodes in the knowledge graph 614 representing the physical characteristics of the building. In some embodiments, the CAO AI agent generates inferences and/or the EPM AI agent 526 makes the predictions based on the characteristic data of the building and/or physical areas of the building.

For example, the CAO AI agent 524 can operate on behalf of a CAO AI service 616. Similarly, the EPM AI agent 526 can operate on behalf of an EPM AI service 618. Furthermore a service bus 620 can interface with the agent 524 and/or the agent 526. A user can interface with the agents 524-526 via the user device 176. The user can provide an entitlement request, e.g., a request that the user is entitled to make and can be verified by an AI agent manager 622. The AI agent manager 622 can send an AI job request based on a schedule to the service bus 620 based on the entitlement request. The service bus 620 can communicate the AI job request to the appropriate agent and/or communicate results for the AI job back to the user device 176.

In some embodiments, the CAO AI agent 524 can provide a request for generating an inference to the CAO AI service 616. The request can include data read from the knowledge graph 614, in some embodiments.

The CAO AI agent 524 includes a client 624, a schema translator 626, and a CAO client 628. The client 624 can be configured to interface with the knowledge graph 614, e.g., read data out of the knowledge graph 614. The client 624 can further ingest inferences back into the knowledge graph 614. For example, the client 624 could identify time series nodes related to one or more nodes of the knowledge graph 614, e.g., time series nodes related to an AHU node via one or more edges. The client 624 can then ingest the inference made by the CAO AI agent 524 into the knowledge graph 614, e.g., add a CAO inference or update the CAO inference within the knowledge graph 614.

The client 624 can provide data it reads from the knowledge graph 614 to a schema translator 626 that may translate the data into a specific format in a specific schema that is appropriate for consumption by the CAO client 628 and/or the CAO AI service 616. The CAO client 628 can run one or more algorithms, software components, machine learning models, etc. to generate the inference and provide the inference to the client 624. In some embodiments, the client 624 can interface with the EPM AI service 618 and provide the translated data to the EPM AI service 618 for generating an inference. The inference can be returned by the EPM AI service 618 to the CAO client 628.

The EPM AI agent 526 can operate in a similar manner to the CAO AI agent 524, in some embodiments. The client 630 can retrieve data from the knowledge graph 614 and provide the data to the schema translator 632. The schema translator 632 can translate the data into a readable format by the CAO AI service 616 and can provide the data to the EPM client 634. The EPM client 634 can provide the data along with a prediction request to the CAO AI service 616. The CAO AI service 616 can generate the prediction and provide the prediction to the EPM client 634. The EPM client 634 can provide the prediction to the client 630 and the client 630 can ingest the prediction into the knowledge graph 614.

In some embodiments, the agents 524-526 combined with the knowledge graph 614 can create a digital twin. In some embodiments, the agents 524-526 are implemented for a specific node of the knowledge graph 614, e.g., on behalf of some and/or all of the entities of the knowledge graph 614. In some embodiments, the digital twin includes trigger and/or actions as also described in U.S. patent application Ser. No. 17/537,046, referenced above. In this regard, the agents can trigger based on information of the knowledge graph 614 (e.g., building ingested data and/or manual commands provide via the model 604) and generate inferences and/or predictions with data of the knowledge graph 614 responsive to being triggered. The resulting inferences and/or predictions can be ingested into the knowledge graph 614. The inferences and/or predictions can be displayed within the model 604.

In some embodiments, the animations of the model 604 can be based on the inferences and/or predictions of the agents 524-526. In some embodiments, charts or graphs can be included within the model 604, e.g., charting or graphing time series values of the inferences and/or predictions. For example, if an inference is an inference of a flow rate of a fluid (e.g., water, air, refrigerant, etc.) through a conduit, the speed at which arrows moving through the virtual conduit can be controlled based on the inferred flow rate inferred by an agent. Similarly, if the model 604 provides a heat map indicating occupancy, e.g., red indicating high occupancy, blue indicating medium occupancy, and green indicating low occupancy, an agent could infer an occupancy level for each space of the building and the color coding for the heat map of the model 604 could be based on the inference made by the agent.

In some embodiments, the graphical building model 604 can be a three dimensional or two dimensional graphical building. The graphical building model 604 can be a building information model (BIM), in some embodiments. The BIM can be generated and viewed based on the knowledge graph 614. An example of rendering graph data and/or BIM data in a user interface is described in greater detail in U.S. patent application Ser. No. 17/136,752 filed Dec. 29, 2020, U.S. patent application Ser. No. 17/136,768 filed Dec. 29, 2020, and U.S. patent application Ser. No. 17/136,785 filed Dec. 29, 2020, the entirety of which is incorporated by reference herein.

In some embodiments, the graphical building model 604 includes one or multiple three dimensional building elements 606. The three dimensional building elements 606 can form a building when combined, e.g., can form a building model of a building or a campus model of a campus. The building elements 606 can include floors of a building, spaces of a building, equipment of a building, etc. Furthermore, each three dimensional building element 606 can be linked to certain data inferences 608, predictions 610, and/or operational data 612. The data 608-612 can be retrieved from the knowledge graph 614 for display in an interface via the user device 176.

Intelligent Visualization

Figure 7:
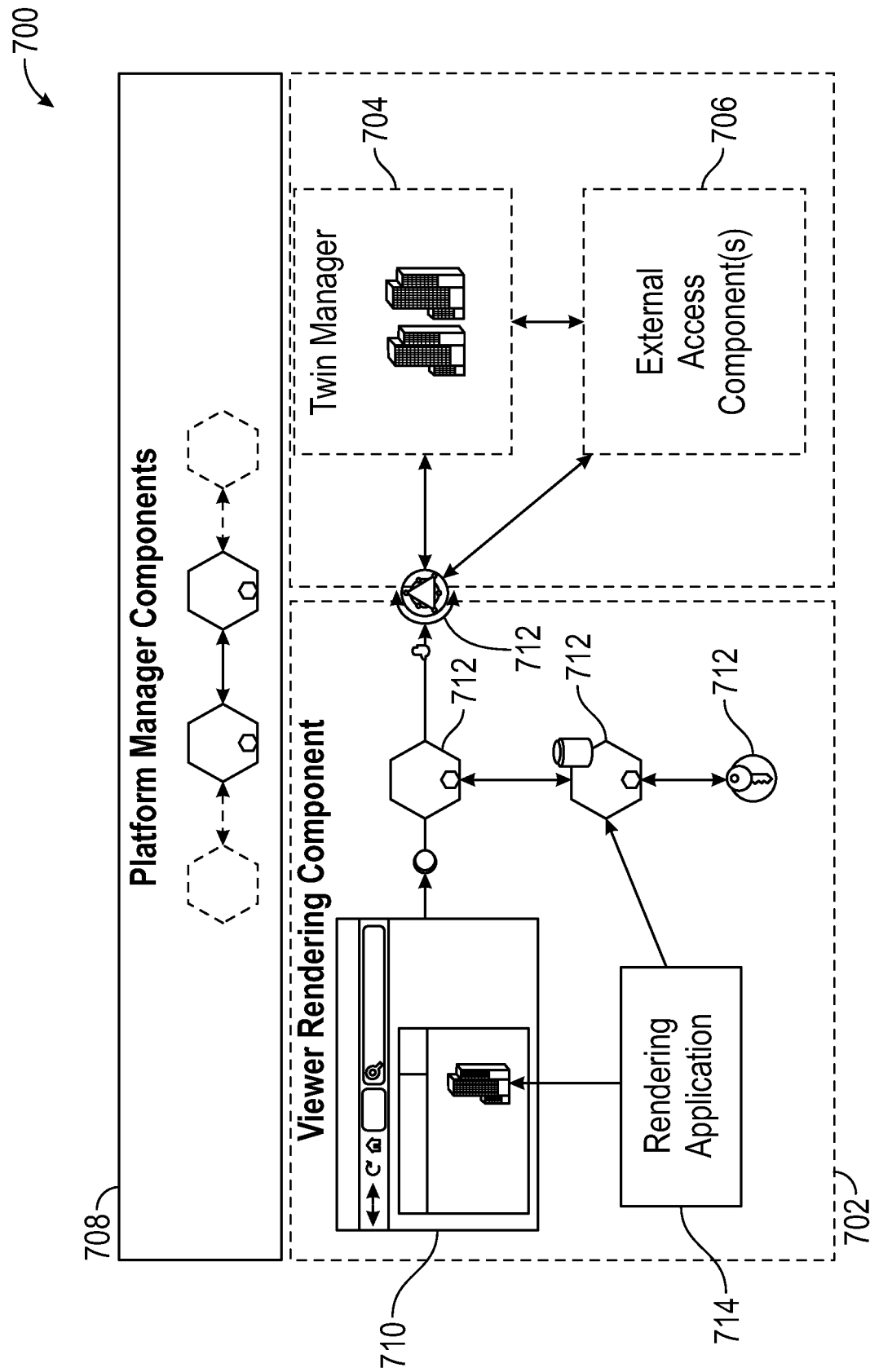
FIG. 7 is a block diagram of a system for generating and presenting a three-dimensional rendering of a virtual building with intelligent visualization, according to an exemplary embodiment.

Referring now to FIG. 7, a system 700 for generating and presenting a three-dimensional (or in some instances two-dimensional) rendering of a virtual building (or any other suitable virtual environment, such as a virtual campus, a virtual city, a metaverse environment, etc.) with intelligent visualization is shown, according to an exemplary embodiment. The system 700 may or may not include, implement, or otherwise incorporate any of the various systems and components thereof discussed above, with respect to FIGS. 1-6. The system 700 can be implemented on one or more processing circuits, e.g., as instructions stored on one or more memory devices and executed on one or more processors. The memory devices and processors may be the same as or similar to the memory devices and processors described with reference to FIG. 1.

In some embodiments, the systems and methods described herein (e.g., the system 700 and the associated methods performed by the system 700) may be configured to ingest data from and/or output data to digital twins of a building and associated entities. In some embodiments, the systems and methods may additionally or alternatively be configured to ingest data from and/or output data to data sources/systems other than digital twins.

As shown, the system 700 includes a viewer rendering component 702 configured to communicate with a twin manager 704, one or more external access components 706 (which may also be referred to as "plug-in packs"), and various platform manager components 708 to obtain building information (or any other type of environment information) and generate the rendering of the virtual building for display on a viewer interface 710 for viewing by an end user. For example, in some embodiments, the user views the viewer interface 710 via the user device 176. It should be appreciated that the various components of the system 700 may be accessible from or otherwise stored, managed, operated, or supported by any combination of the various components of the building data platform 100 (e.g., the edge platform 102, the cloud platform 106, the twin manager 108, the applications 110, and/or any other system accessible via the network 104).

Figure 8:
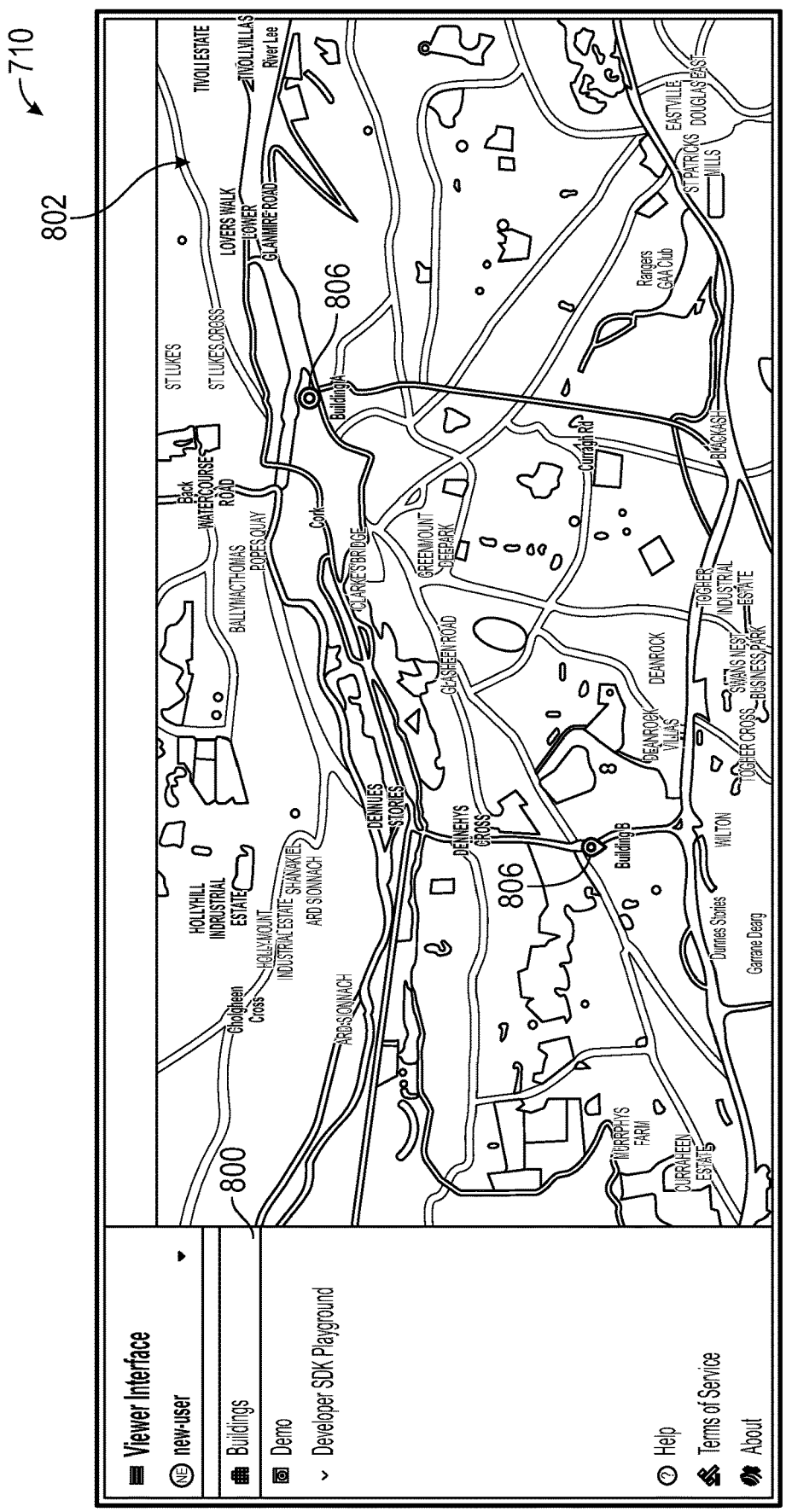
FIG. 8 is a user interface showing a building selection page, according to an exemplary embodiment.

For example, in some instances, the user selects to view a rendering of a virtual building via the viewer interface 710. In some instances, the viewer interface 710 is configured to provide one or more potential virtual buildings from which the user may select to view a rendering within the viewer interface 710. For example, as shown in FIG. 8, the viewer interface 710 may include a "buildings" button 800 configured to navigate the user to a building selection page 802. In some instances, the building selection page 802 may display a list of selectable buildings for selection by the user. In some instances, the building selection page 802 may include a map graphic having a variety of selectable buildings (e.g., selectable buildings 806).

With reference again to FIG. 7, the viewer rendering component 702 is configured to obtain the environment information and generate the rendering of the graphical model (e.g., the virtual building) for display on the viewer interface 710 (or for transmitting to another device to be displayed elsewhere) via one or more beckon applications 712 and a rendering application 714. The beckon applications 712 may communicate with the twin manager 704 to fetch, pull, ingest, or otherwise retrieve information (e.g., via one or more AI tools or other BIM ingestion applications) from one or more graph projections (e.g., including one or more digital twins) associated with the graphical model to be rendered. For example, the twin manager 704 may be similar to or the same as twin manager 108 described herein. Accordingly, the twin manager 108 may include or store the various information used by the rendering application 714 to generate the rendering of the graphical model. In some instances, the beckon applications 712 may further be configured to push information to the twin manager 704 to update one or more graph projections or other information stored within the twin manager 704 based on one or more inputs from a user via the viewer interface 710 (e.g., movement of a virtual entity, a command to a given device, etc.). In some instances, the beckon applications 712 are configured to ingest information (e.g., new virtual assets) into a graph projection of the twin manager 108 via one or more asset ingestion APIs, AI agents, and/or applications. In some instances, the beckon applications 712 are configured to pull information (e.g., inferences and/or prediction) pertaining to one or more virtual assets associated with the graphical model from one or more artificial intelligence agents (e.g., the artificial intelligence agents 370 described above).

The beckon applications 712 may additionally pull in external information from one or more external sources or computing systems via the external access components 706 to be implemented, overlaid, or otherwise incorporated within the display of the rendering of the graphical model (e.g., the virtual building). For example, in some instances, the external access components 706 may be one or more external access application programming interface (API) and/or software development kit (SDK) components. In some instances, the external access components 706 may pull external information from one or more external third-party applications associated with vendors, maintenance companies, third-party service providers (e.g., HVAC service providers, internal air quality service providers, occupancy data service providers, security service providers, fire suppression and prevention service providers, etc.), and/or other entities associated with the building being virtually rendered. In some instances, the external access components 706 may pull external information from one or more external third-party applications associated with various other entities (e.g., weather service applications, traffic monitoring applications, etc.) that may be pertinent to the virtual building being rendered. In some instances, the beckon applications 712 may further push information to the various third-party applications via the external access components 706 based on one or more inputs from the user via the viewer interface (e.g., movement of a virtual entity, a command to a given device, etc.). In some instances, the information pushed to the various third-party applications may be defined via a subscription service application, an entitlement service, and/or any other application associated with controlling the flow of information into and out of the viewer interface 710 provided to the user.

In some embodiments, the external access components 706 are configured to provide a mapping or list of commands to receive and/or request data from and/or push data to the one or more external applications or systems. In some embodiments, the external access components 706 are additionally configured to receive, request, or push information about the format and content of the data. In some embodiments, this information about the format and content of the data may include information allowing the system 700 to correlate disparate formats of multiple external systems to a format of the viewer rendering component 702 (e.g., to be displayed within the viewer interface 710).

In some instances, the beckon applications 712 further communicate with one or more of the platform manager components 708. For example, the platform manager components 708 may include a digital key service application to fetch corresponding entitlements associated with entities attempting to access or view the virtual rendering of the building. For example, in some instances, a particular entitlement may be accessed using a digital key service (e.g., a digital credential and a corresponding validation application) to ensure that the user attempting to access or view the rendering of the virtual building is entitled to so. Further, the entitlements for a given user may give the user access to varying levels of information to be displayed within or overlaid on the rendering of the virtual building, in the same or a similar manner to that described above, with reference to the entitlement service 134 of FIG. 1 and entitlement component 358 of FIG. 3.

In some instances, the platform manager components 708 may include a tenant service application configured to define the various entitlements associated with the entities (e.g., similar to the subscription service 132). In some instances, the platform manager components 708 may include applications similar to or the same as any of the provisioning service 130, the subscription service 132, and/or the entitlement service 134 described herein.

The rendering application 714 may be configured to ingest the various information fetched by the beckon applications 712 (e.g., a REVIT or NEVUS work file, associated graph projection information, various externally obtained information from third parties, etc.) and use the various information to render the graphical model (e.g., the virtual building) within the viewer interface 710. In some instances, the rendering application 714 may incorporate both the virtual representation of the various entities associated with the building (e.g., the building layout, devices within the buildings) and information pertaining to the various entities associated with the building (e.g., event information, alarm information, inferences about the entities, predictions about the entities, etc.), as discussed below, with reference to FIGS. 9-20. In some instances, the rendering application 714 may cause a display device to display the graphical model (e.g., the virtual building). For example, the rendering application 714 may display the graphical model within the viewer interface 710 on a display device of the user device 176 or any other computing system within the building data platform 100. In some instances, the rendering application 714 may transmit the rendering of the graphical model to be displayed on another device to display the virtual building.

In some instances, the rendering application 714 may receive or ingest the external information from the one or more external sources or systems via the external access components 706. In these instances, the rendering application 714 may then cross-correlate one or more device or asset identification numbers associated with the received or ingested external information with one or more device or asset identification numbers received from the twin manager 704 (e.g., associated with one or more rendered virtual assets within a virtual building) to determine a location of the corresponding virtual asset within the graphical model (e.g., within the virtual building). The rendering application 714 may then cause the graphical model (e.g., the virtual building) to include a representation of the external information associated with the virtual asset. For example, in some instances, the rendering application 714 may overlay the external information received from the one or more external sources or systems pertaining to the virtual asset within the viewer interface 710. In some instances, the rendering application 714 may modify the virtual asset within the viewer interface 710 based on the external information (e.g., a heat map having various colors based on the external information at various locations within the virtual building, highlighting one or more assets based on the external information, etc.).

Referring generally to FIGS. 9-20, a variety of functionalities are shown and described below. However, it will be appreciated that a variety of differing functionalities may be provided based on different types of information stored within corresponding graph projections of entities of the virtual building displayed and/or fetched by or received via the external access components 706. As such, the functionalities shown and described with reference to FIGS. 9-20 are provided as examples and are in no way meant to be limiting.

Figure 9:
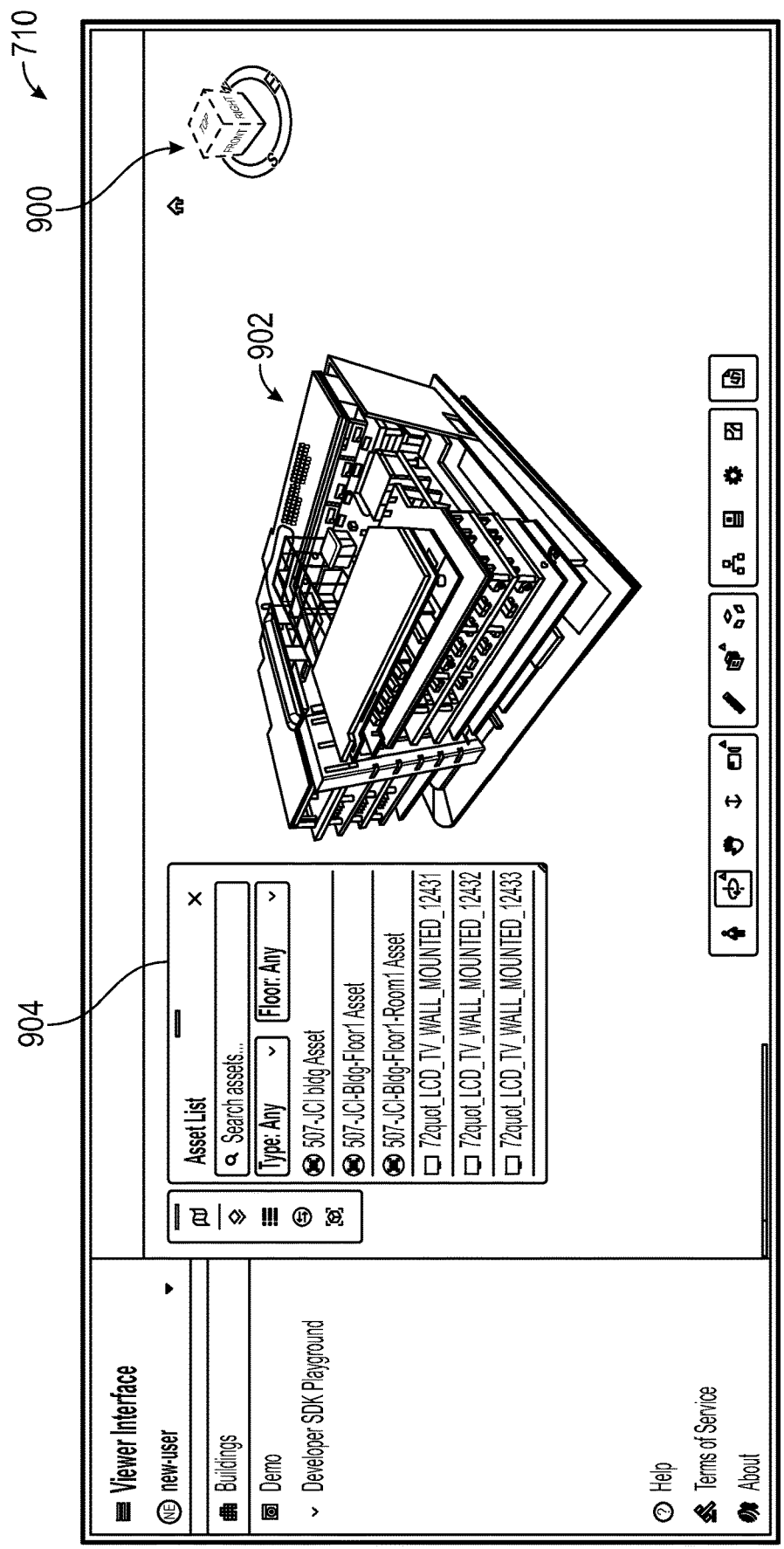
FIGS. 9-15 is a user interface showing various views of a virtual building rendering page, according to an exemplary embodiment.

Referring now to FIG. 9, upon the user selecting a virtual building, as discussed above, the viewer interface 710 can display a virtual building rendering page 900 showing a virtual building 902 (e.g., a graphical model) rendered by the rendering application 714, as discussed above. In some instances, the virtual building rendering page 900 includes a variety of selectable user interface buttons configured to provide the user a variety of differing functionality options. For example, the virtual building rendering page 900 may include a variety of navigation tools available to the user to allow the user to navigate or otherwise manipulate the view of the virtual building 902. In some instances, the user may be allowed to zoom, rotate, cross-section, hide, or otherwise manipulate the virtual building 902 or a component thereof.

In some instances, one of the selectable user interface buttons may be clicked by the user to display an asset list window 904. Within the asset list window 904, the user is able to select from a list of virtual assets (e.g., entities) within the virtual building 902 (e.g., an asset list including all of the virtual equipment assets within the virtual building 902). In some instances, each entity displayed within the asset list window 904 includes a name of the entity (e.g., a device ID) and an accompanying entity icon. In some instances, the entities may include mechanical entities, electrical entities, plumbing entities, air distribution entities, or any other entities used within a given building. Upon selection of an entity, the user may be provided with various asset details pertaining to the entity and/or navigated to the entity within the rendering of the virtual building 902, as will be discussed below with reference to FIGS. 12-14. In some instances, the asset list window 904 may allow for the user to search for a particular entity name. In some instances, the asset list window 904 may allow for the user to filter the displayed entities by entity type (e.g., system type, subsystem type, device type), by floor within the virtual building 902, by room within the virtual building 902, etc.

Figure 10:
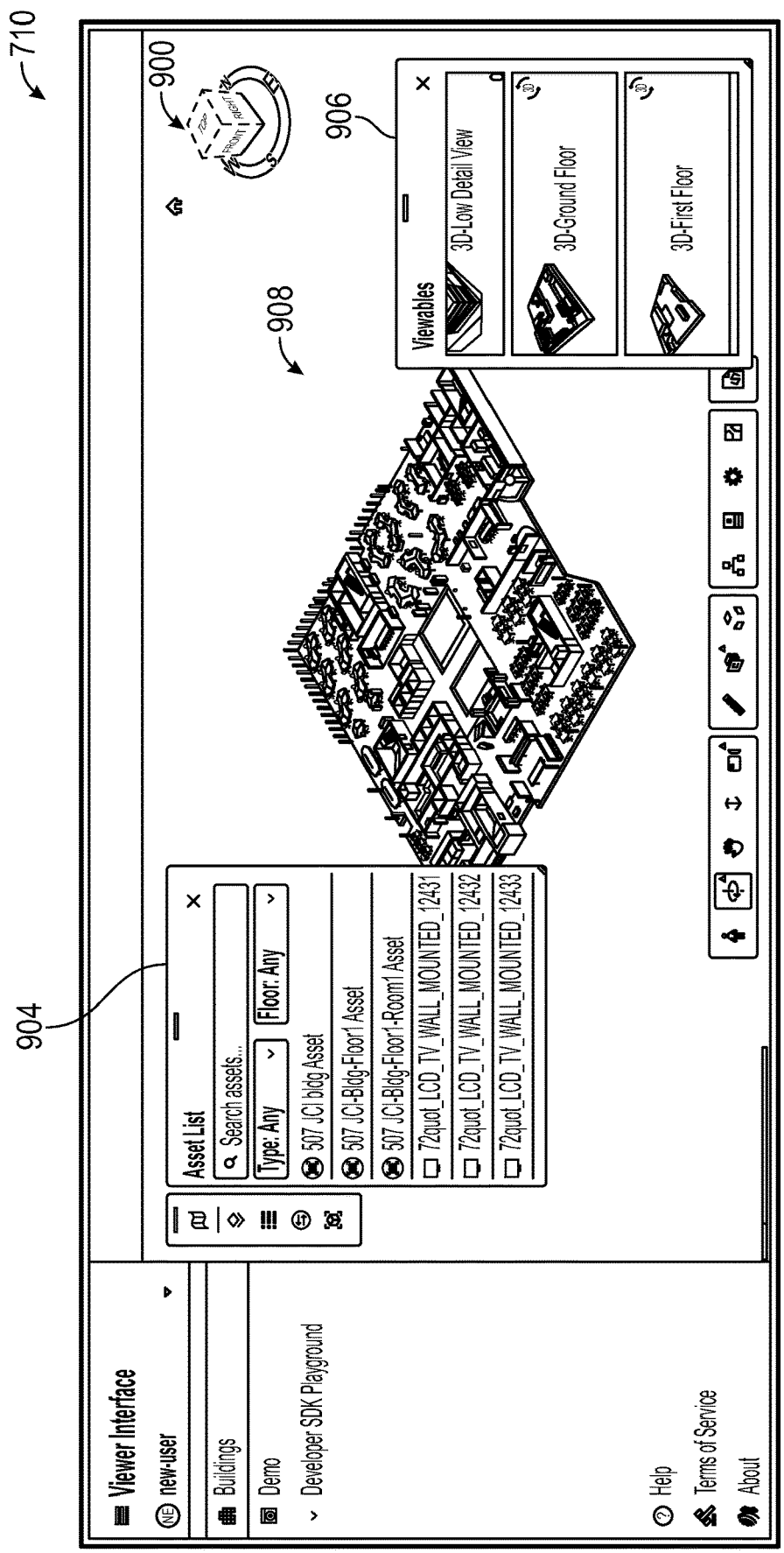

Referring now to FIG. 10, in some instances, one of the selectable user interface buttons may be clicked by the user to display a viewables window 906. In some instances, the viewables window 906 may include a list of selectable building views. The user may then select one of the selectable building views to be provided with a different view of the virtual building 902, such as a floor view 908. In some instances, the selectable building views may include one or more selectable floor views, one or more selectable detail views showing differing levels of detail (e.g., only the building, only certain types of equipment, only certain systems, etc.). For example, in some instances, a "shell" view of a building may be selectably viewable by the user, showing only a selected subsystem and basic building elements (e.g., walls, floors, ceilings, doors).

Figure 11:
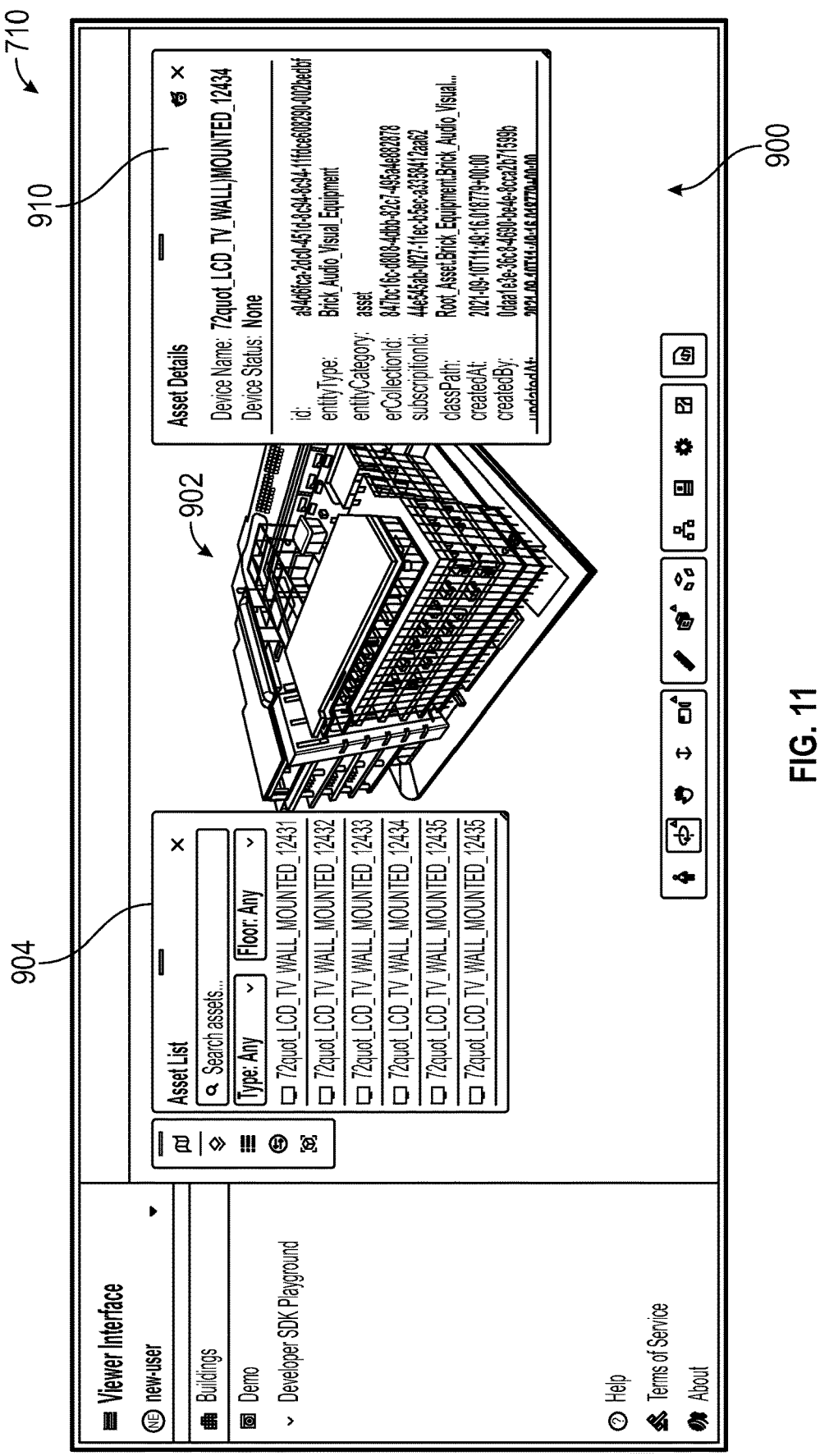

Referring now to FIG. 11, in some instances, as discussed above, upon selecting a given entity within the asset list window 904, the user may be provided with an asset details window 910. The asset details window 910 may include a variety of information pertaining to the selected asset or entity. For example, in some instances, the information within the asset details window 910 may include a device name, a device status (e.g., DEVICE ON, DEVICE OFF, FAULT, etc.), an ID associated with the device, an entity type (e.g., audio/visual equipment, thermostat, HVAC equipment, etc.), an entity category (e.g., asset, system, subsystem, etc.), an indication of when the device was created or added to the virtual building or graph projection, an indication of who created or added the device to the virtual building or graph projection, and/or a variety of other information associated with the device pulled from the graph projection or from external applications or computing systems (e.g., via the external access components 706). In some instances, the asset details window 910 may include information from multiple external applications or computing systems acquired via multiple external access components 706. In some instances, the user may similarly be provided with the asset details window 910 upon clicking on a virtually represented asset or entity within the rendered virtual building 902, which may be linked (e.g., via a corresponding device or asset ID) with the corresponding graph projection information and externally acquired information (e.g., acquired via the external access API components).

Figure 12:
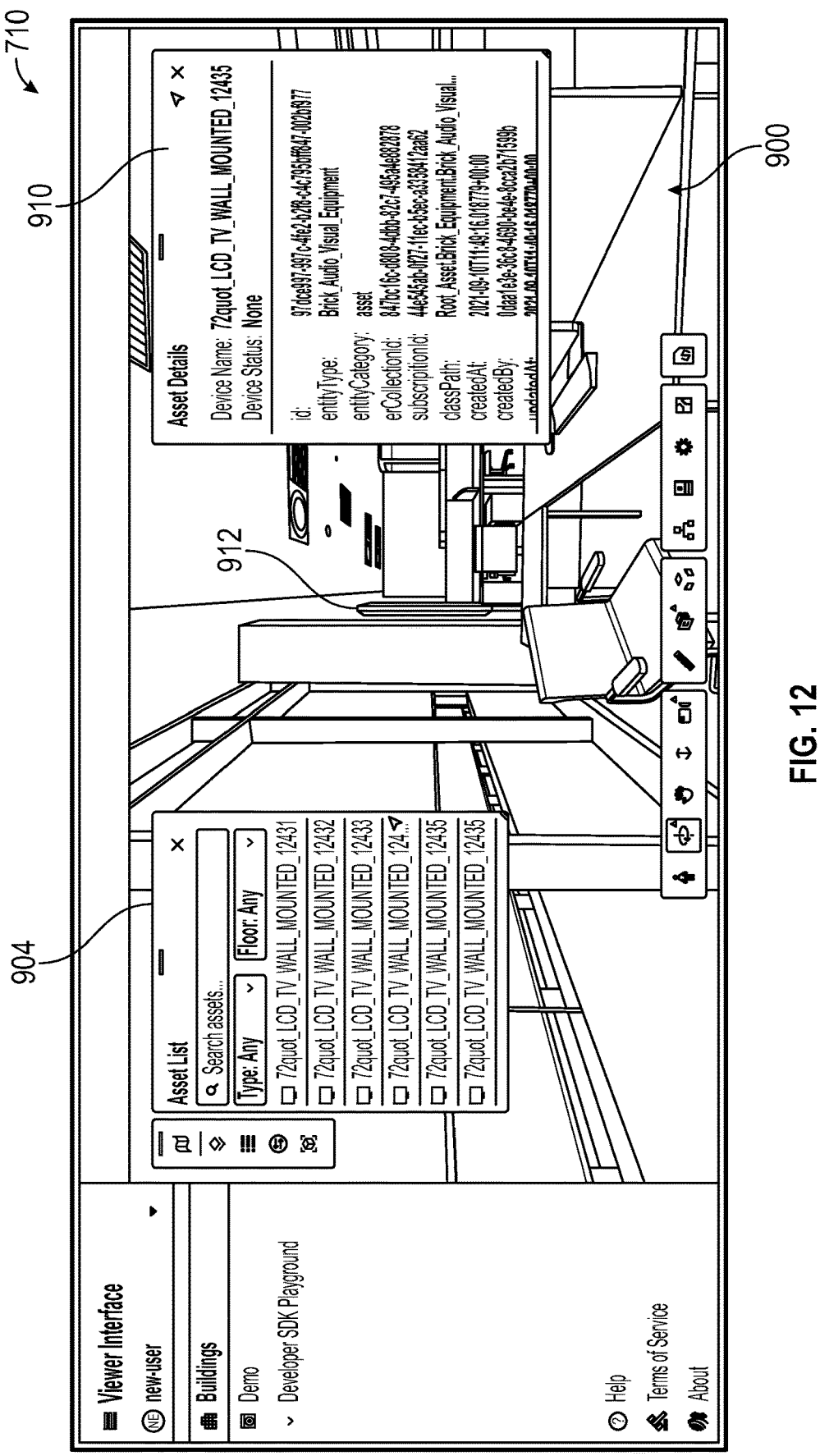

In some instances, as discussed above, upon selecting a given entity within the asset list window 904, the user may be navigated to the entity within the rendering of the virtual building 902. In some instances, the user may select to be navigated to the entity within the rendering of the virtual building using a navigation icon presented within the asset details window 910. For example, FIG. 12 illustrates a detail view of a space within the virtual building 902 provided within the virtual building rendering page 900, showing a selected entity 912 (e.g., a mounted television) within the virtual building 902. As illustrated, in some instances, the selected entity 912 may be highlighted or otherwise indicated to the user within the virtual building rendering page 900.

With reference again to FIGS. 9 and 10, in some instances, the asset list window 904 may include both modelled assets (e.g., assets within the virtual building 902 that have or are associated with a defined three-dimensional representation of the underlying physical asset and, in some instances, include various characteristic information associated with the underlying physical asset) and also unmodelled assets (e.g., assets that are designated within the virtual building 902, but do not have or are not associated with a defined three-dimensional representation associated with the underlying physical asset and, in some instances, do not include characteristic information associated with the underlying physical asset). In some instances, the modelled assets and the unmodelled have differing entity icons to indicate whether the asset or entity is modelled or unmodelled. Further, unmodelled assets may still be associated with corresponding digital twins and/or graph projections stored within the twin manager 704 that may be retrieved and/or updated with corresponding asset information (e.g., provided by the user via the viewer interface 710 or ingested into the graphical model via one or more of the external access components 706) in a similar manner to modelled assets In some instances, the entity icons for the modelled assets and the unmodelled assets may be shown in different colors (e.g., the entity icons for the modelled assets may be gray and the entity icons for the unmodelled assets may be red). In some other instances, the entity icons for the modelled assets may be representative of the asset that the entity icon is associated with, while the entity icons for the unmodelled assets may be null icons (e.g., a circle with an X through it). For example, the selected entity 912 shown in FIG. 12 is an example of a modelled asset. As shown, the entity icon for the selected entity 912 is representative of the asset it is associated with (e.g., the entity icon is a television graphic and represents a television asset within the virtual building 902).

Figure 13:
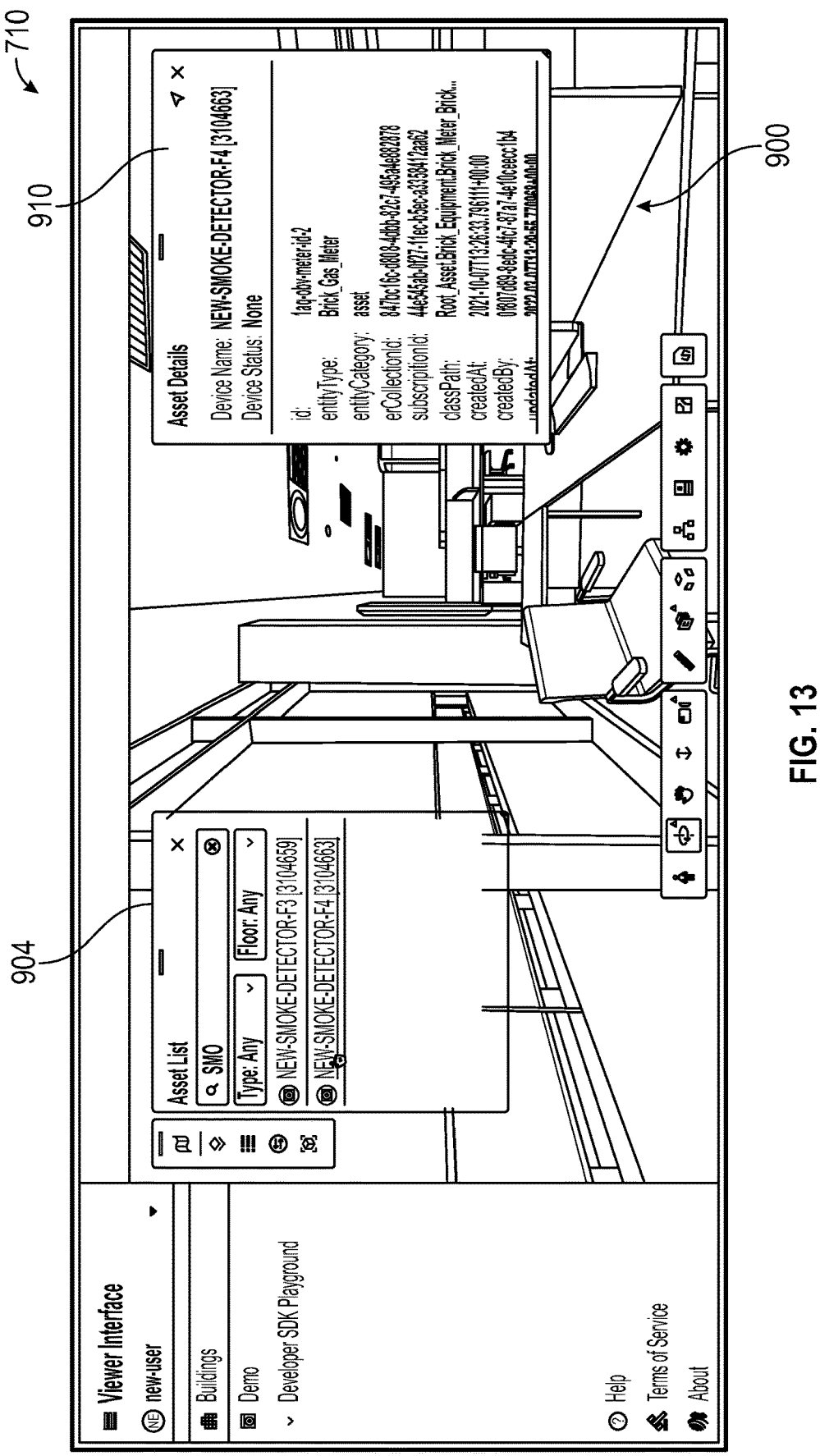
Figure 14:
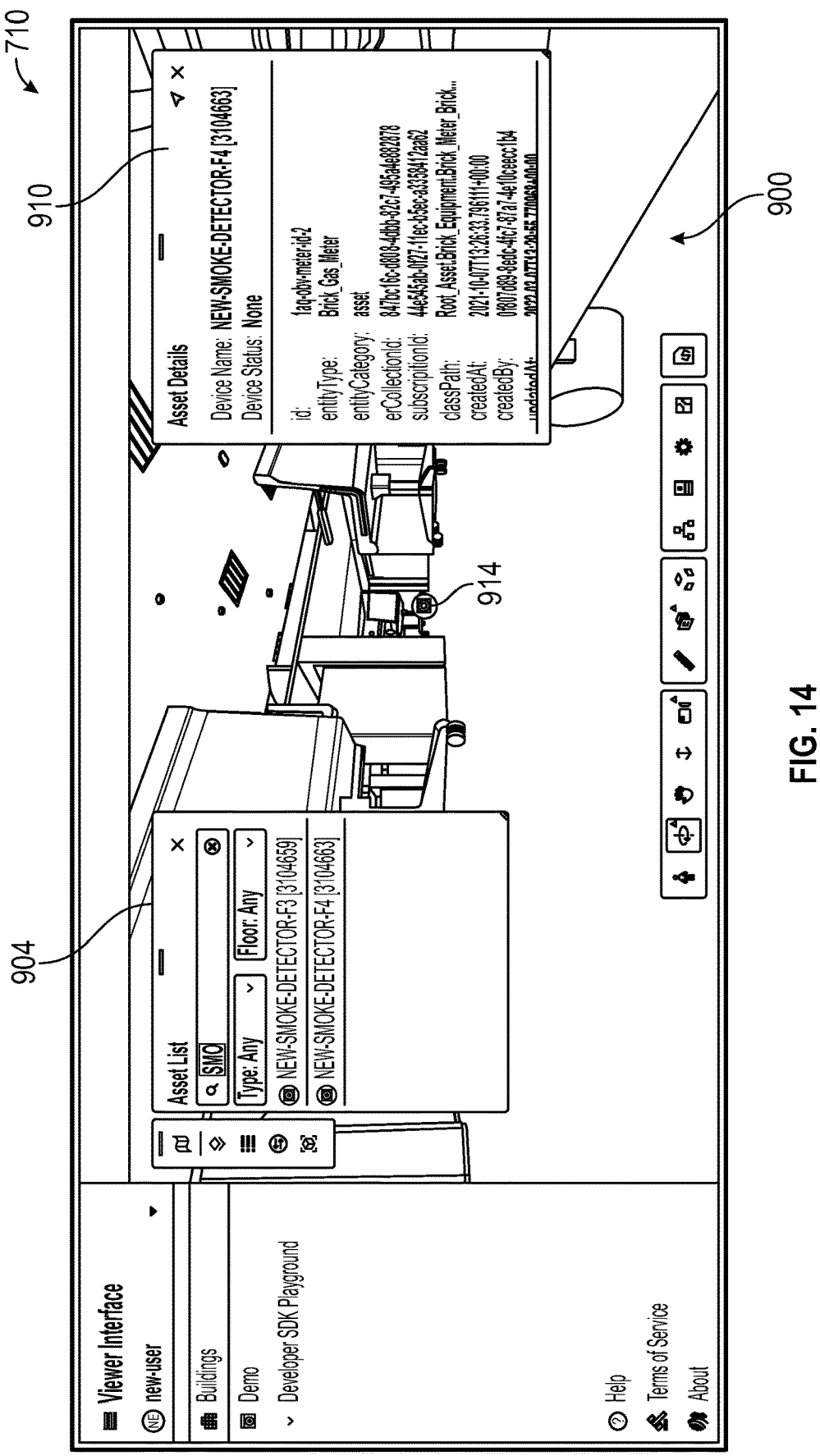

FIGS. 13 and 14 show a user searching for and selecting an unmodelled asset (e.g., a smoke detector that has not yet been installed within the physical building) within the asset list window 904 (e.g., in FIG. 13) and being navigated to a location of a virtual unmodelled asset 914 within the virtual building 902 (e.g., in FIG. 14). As shown in FIG. 13, upon selection of the unmodelled asset within the asset list window 904, the user is similarly provided with the asset details window 910 with details pertaining to the unmodelled asset. As shown in FIG. 14, the user is navigated to the location of the virtual unmodelled asset 914. In some instances, the virtual unmodelled asset 914 may be represented as an icon located at the location of the unmodelled asset (e.g., a point location within the virtual building 902). In other instances, the virtual unmodelled asset 914 may be represented by a virtual representation of the asset to be installed within the physical building. That is, in these instances, the virtual unmodelled asset 914 may be substantially similar to a modelled asset (e.g., the selected entity 912 shown in FIG. 12) within the virtual building 902, but may be indicated as "unmodelled" to indicate to the user that the asset has not yet been installed within the physical building. In yet some other instances, the virtual unmodelled asset 914 may be represented by a virtual approximation of the asset to be installed within the physical building (e.g., a virtual three-dimensional box approximately the size of the device to be installed within the physical building).

In some instances, the user is allowed to move the location of the virtual unmodelled asset 914 to a desired location within the virtual building 902. In these instances, the beckon applications 712 discussed above may communicate this location change of the unmodelled asset to the twin manager 704 to be incorporated into the corresponding graph projection associated with the unmodelled asset. That is, the user may be allowed to manipulate the position of an unmodelled asset within the viewer interface 710 and have that change communicated to and effectuated within the twin manager 704. In some instances, the user may be similarly allowed to manipulate one or more types of modelled assets within the viewer interface 710 and have those changes communicated to and effectuated within the twin manager 704 in a similar manner.

In some instances, the user is allowed to add a modelled asset or an unmodelled asset (e.g., the unmodelled asset 914) to the virtual building from a list of potential modeled assets and potential unmodelled assets. For example, in some instances, the viewer interface 710 may allow for the user to click on a particular wall (or any other selectable area) and choose have a modelled or unmodelled version of a device (e.g., depending on whether the device has an associated modelled asset) installed on that wall. In some instances, the system 700 (e.g., via one or more agents) may be configured to automatically position the added modelled or unmodelled asset on the wall (or within any other selectable area) based on a standard positioning scheme (e.g., a safety, regulatory, or normative rule for similar devices). For example, if the user is adding a light switch (e.g., a modelled or unmodelled asset representing a light switch) within a virtual room, the light switch may be automatically placed on a selected wall at a standard height and distance from a nearby door frame. Similarly, a user may add a camera (e.g., a modelled or unmodelled asset representing a camera) within a virtual room, and the camera may automatically be placed at a standard position on the ceiling (e.g., a standard distance from a corner of the room).

Figure 15:
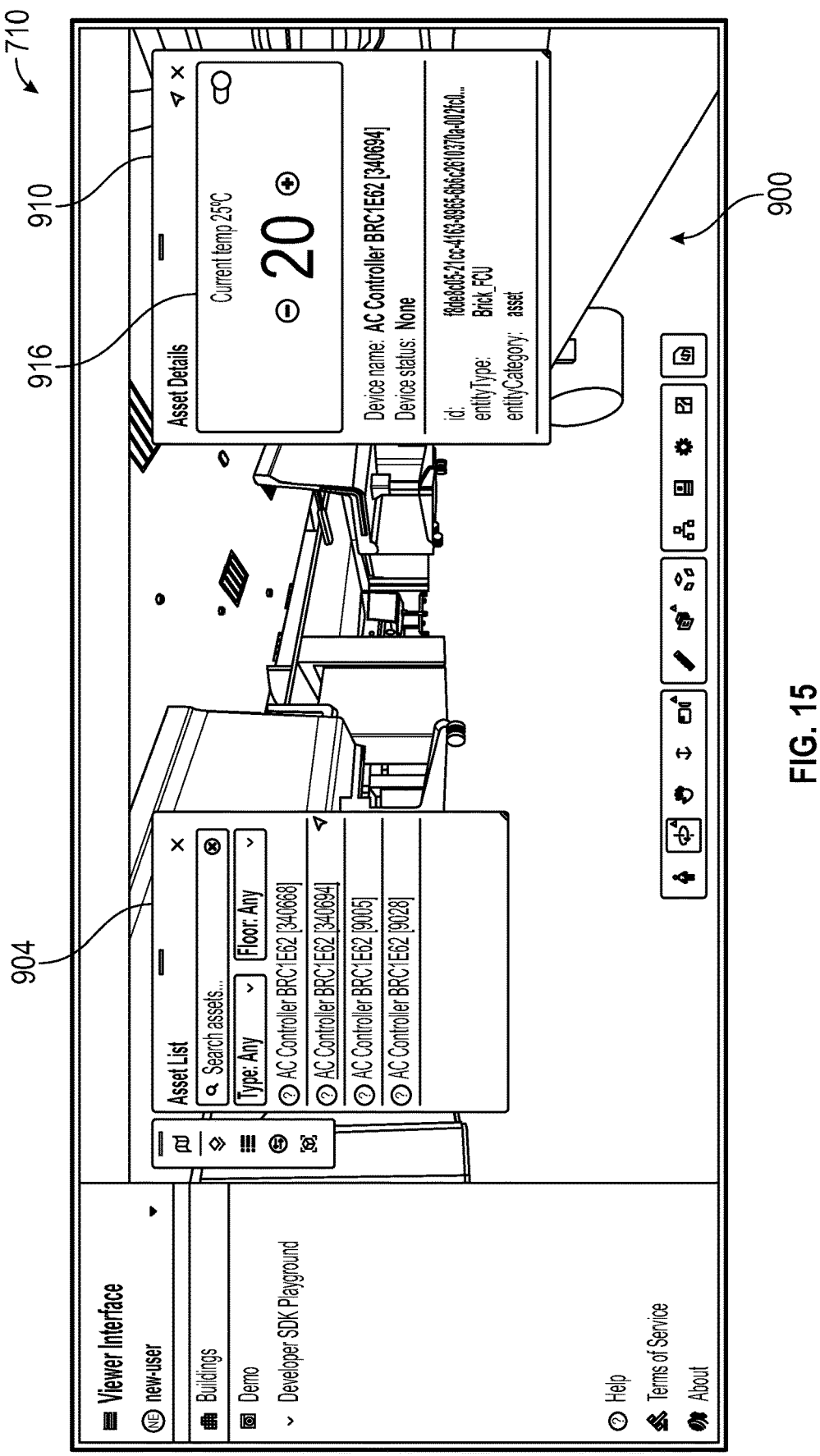

Referring now to FIG. 15, in some instances, the asset details window 910 for a given modelled asset within the virtual building 902 may include a command and control component 916 that allows for the user to control or provide commands to the physical asset (e.g., the device, the system, sub-system, etc.) corresponding to various modelled assets within the virtual building 902. For example, in some instances, a graph projection associated with a modelled asset may include a link (e.g., an edge) connecting the modelled asset (e.g., a node representing the modelled asset) to the corresponding physical asset (e.g., a node associated with a control circuit of the physical asset). In some instances, this link or edge may be between connector source code IDs and device IDs associated with the virtual and physical assets.

In some instances, to create this link, new assets may be manually ingested into the graph projections of the twin manager 704 via the viewer interface 710. For example, the viewer interface 710 may allow for the user to manually create associations (e.g., via one or more asset ingestion APIs, AI agents, and/or applications) between new virtual assets added to the virtual building 902 and new physical assets installed within the physical building.

In some instances, some new assets may belong to one or more BACnet protocols, and may thus be ingested into the graph projections of the twin manager 704 as connector components. To create connections with these connector components or to control the connector components, the BIM assets are ingested into the graph projections of the twin manager 704 and a relationship is created between the BIM assets and associated bit connector components. Again, this ingestion may be performed manually or, in some instances, automatically using the viewer interface 710 via one or more asset ingestion APIs, AI agents, and/or applications.

In any case, the link (e.g., the edge) connecting the modelled asset to the corresponding physical asset may allow for the user (e.g., assuming the user has the proper entitlements) to control the functioning of the asset within the physical building via interaction with the virtual building 902 within the viewer interface 710 (e.g., on the user device 176). For example, commands from the user input into the viewer interface 710 may be communicated back to the twin manager 704 to update the graph projection (e.g., a device status, a device set point), which may then be ultimately communicated to the control circuit of the physical asset (e.g., via the edge platform 102, the network 104, the cloud platform 106) to control the functionality of the physical asset.

As shown in FIG. 15, the virtual asset selected by the user corresponds to an AC controller. The command and control component 916 is configured to allow the user to control the device state of the AC controller (e.g., switching between an ON status and an OFF status using toggle switch 918) and a temperature set point of the AC controller (e.g., using the "+" and "−" buttons. It should be appreciated that the command and control component 916 may be configured in a variety of manners and allow for the user to control a variety of device functionalities based on the various functionalities associated with the asset selected by the user.

In some instances, the command and control component 916 may receive a command from the user regarding a virtual asset associated with a physical asset in a physical building, and the command may be communicated from the viewer interface 710 to the twin manager 704. From twin manager 704, the command may be communicated to a cloud platform (e.g., the cloud platform 106). From the cloud platform (e.g., the cloud platform 106, the command may be communicated to an edge platform (e.g., the edge platform 102), which may ultimately provide the command to the physical asset. It should be appreciated that, in other instances, the flow process for communicating the command received by the command and control component 916 to the physical asset may be different. Further, in some instances, changes to various device settings may be reflected within the viewer interface 710, the twin manager 704, and also within one or more metadata sources 406 (e.g., Metasys data 438), which may be linked together via one or more graph projections or other associations.

Figure 16A:
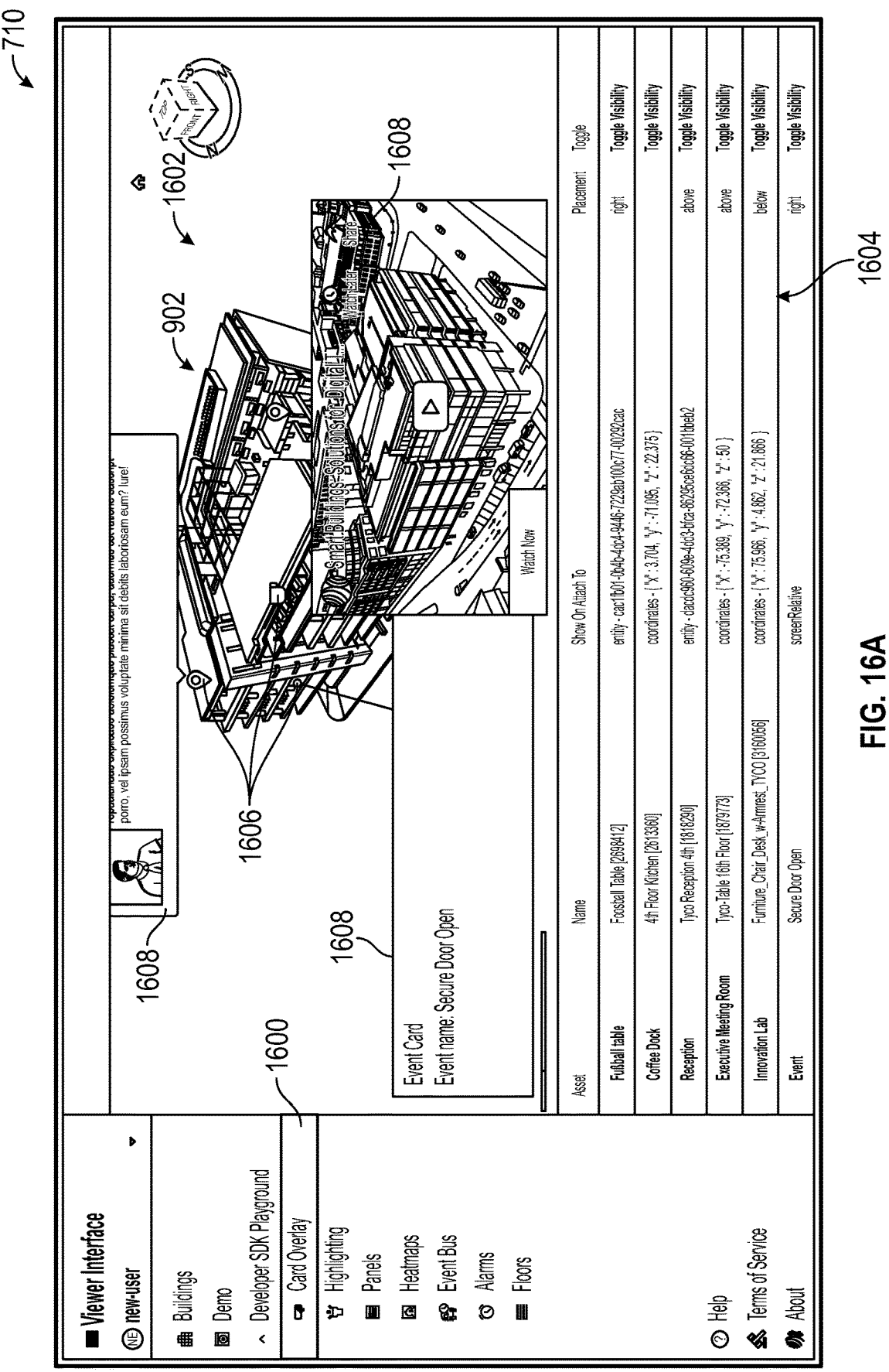
FIG. 16A is a user interface showing a card overlay page, according to an exemplary embodiment.

Referring now to FIG. 16A, the viewer interface 710 may include a card overlay button 1600 configured to display a card overlay page 1602 including the virtual building 902, a list of assets and events 1604, a variety of asset and event indicators 1606, and various asset and event overlays 1608 associated with selected assets and events within the virtual building 902 (e.g., stored within the BIM). For example, the list of assets and events 1604 may include, for each asset or event, a name of the asset or event, a specification or datasheet associated with the asset or event (e.g., allowing for the user to check whether a device has been installed properly and/or to learn about/understand enhanced features of a device that may not be enabled), a location for the corresponding event overlay 1608, a visibility toggle, and/or a variety of other information. In some instances, the information associated with the asset or event within the list of assets and events 1604 may be altered by the user as desired. In some instances, the variety of asset and event indicators 1606 are overlaid onto the virtual building 902 at the locations of the associated with the assets and events. In some instances, the various asset and event overlays 1608 are configured to provide various information (e.g., text-based information, audio-based information, video-based information) pertaining to the assets and events shown within the virtual building 902 (e.g., associated device measurement and recording data, device information, etc.).

Figure 16B:
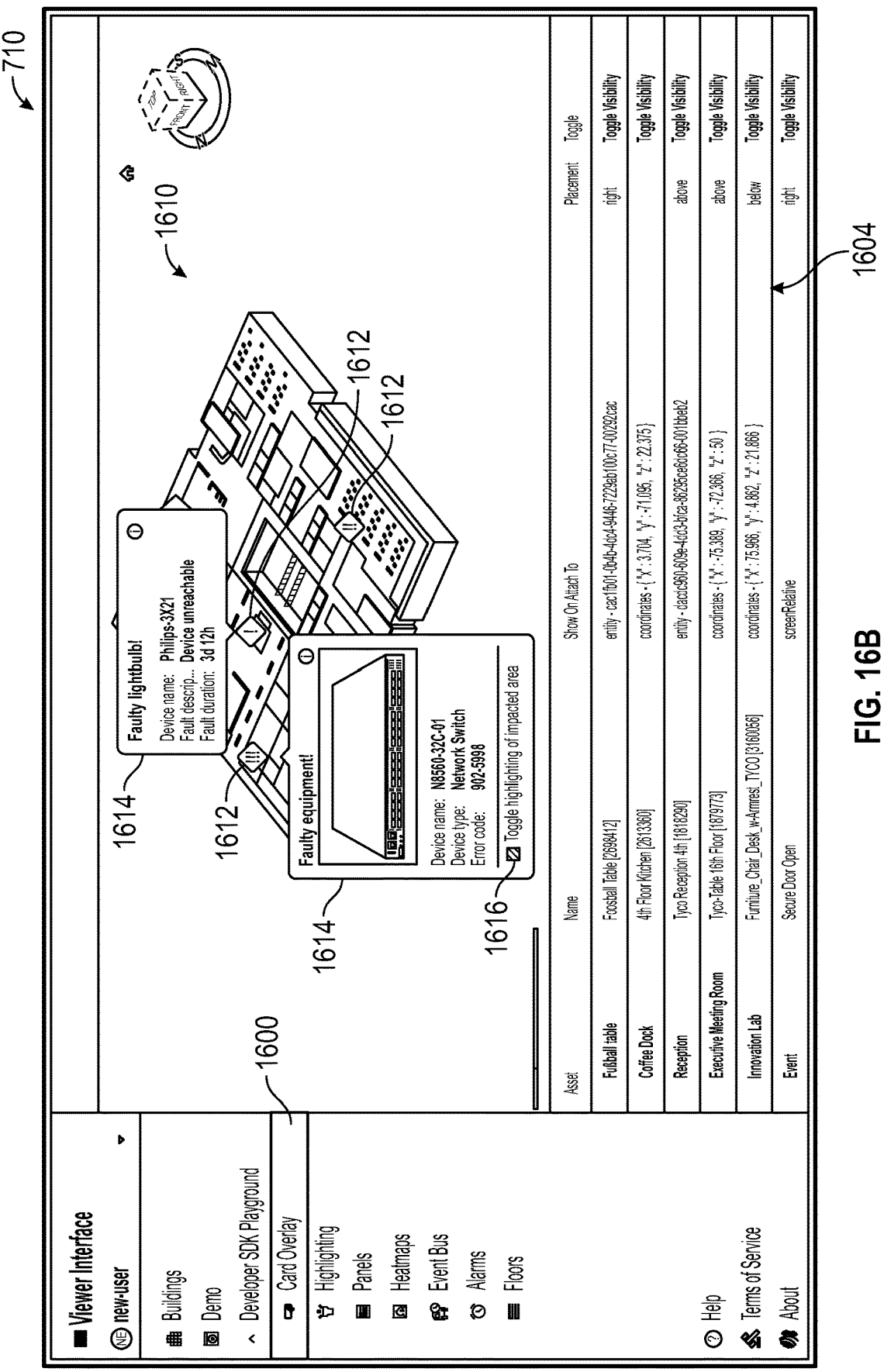
FIG. 16B is a user interface showing another card overlay page, according to an exemplary embodiment.

Referring now to FIG. 16B, another example card overlay page 1610 displayable on the viewer interface 710 is shown, according to an example embodiment. As illustrated, in some instances, the card overlay page 1610 may include one or more alarm indicators 1612 within a floor view or detail view of the virtual building 902. The alarm indicators 1612 may similarly be associated with various corresponding alarms within the virtual building 902 (e.g., stored within the BIM). For example, the alarm indicators 1612 may indicate various equipment faults (e.g., network switch faults, lightbulb faults, etc.).

In some instances, the various alarm indicators 1612 may be selectable by the user to display corresponding alarm overlays 1614 that are overlaid onto the virtual building 902 proximate the selected alarm indicators 1612. As shown, the alarm overlays 1614 may include a device name (e.g., associated with a device having a fault), a fault description (e.g., a description of the fault), a fault duration (e.g., how long the fault has been occurring), and/or an error code (e.g., an identifiable code associated with the type of fault occurring with the device). In some instances, the alarm overlays 1614 may further include a link or button 1616 configured to allow for the user to have various assets associated with the alarm highlighted within the virtual building 902. In some instances, the various information and functionality provided via the alarm indicators 1612 and/or the alarm overlays 1614 may be customizable by the user. For example, in some instances, certain alarm indicators 1612 may be customizable by the user to be displayed in a variety of colors (e.g., red for high-priority alarms and green for low-priority alarms). In some instances, the alarm overlays 1614 may be customizable by the user to include varying levels or types of information, as desired for a given alarm, alarm type, alarm priority, etc.

Figure 17:
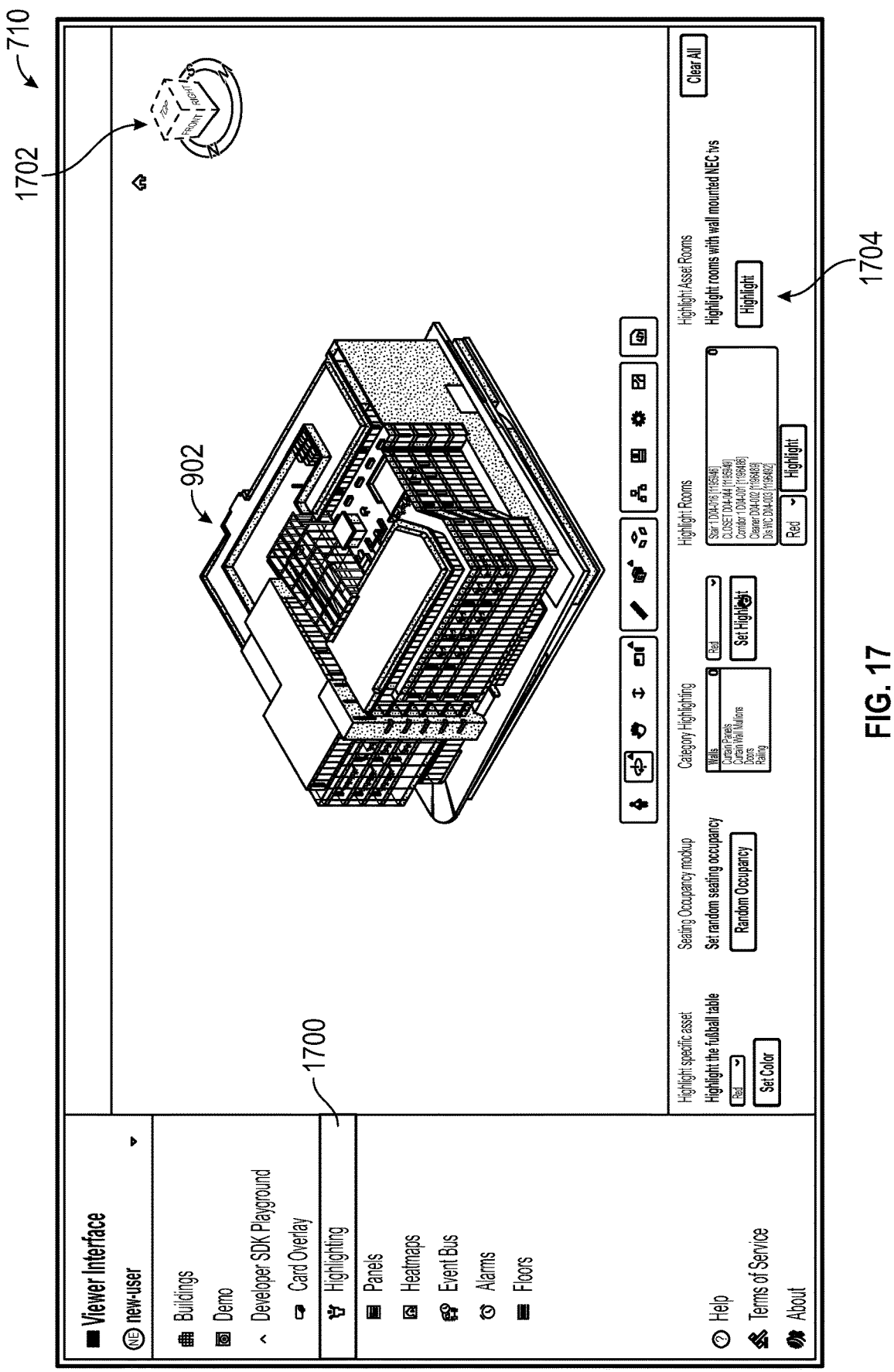
FIG. 17 is a user interface showing a highlighting page, according to an exemplary embodiment.

Referring now to FIG. 17, the viewer interface 710 may include a highlight button 1700 configured to display a highlighting page 1702 including the virtual building 902 and a highlighting control panel 1704. The highlighting control panel 1704 is configured to allow the user to highlight various elements of the virtual building 902 (e.g., highlighted surfaces in FIG. 17 are indicated by stippling). For example, in some instances, the highlighting control panel 1704 may allow the user to highlight a selected asset (e.g., a particular device, a foosball table, a particular system), a selected category of assets (e.g., walls, curtain panels, curtain wall mullions, doors, railings, temperature sensors, indoor air quality sensors, etc.), and/or one or more selected rooms. In some instances, the highlighting control panel 1704 may allow for the user to highlight rooms or floors including specific assets (e.g., "highlight rooms with wall mounted NEC TVs"). The highlighting control panel 1704 may further allow the user to select from a variety of colors with which the selected elements will be highlighted (e.g., red, green, yellow, etc.). Further, the highlight control panel may allow for a random occupancy mockup to be applied to the virtual building 902.

Figure 18:
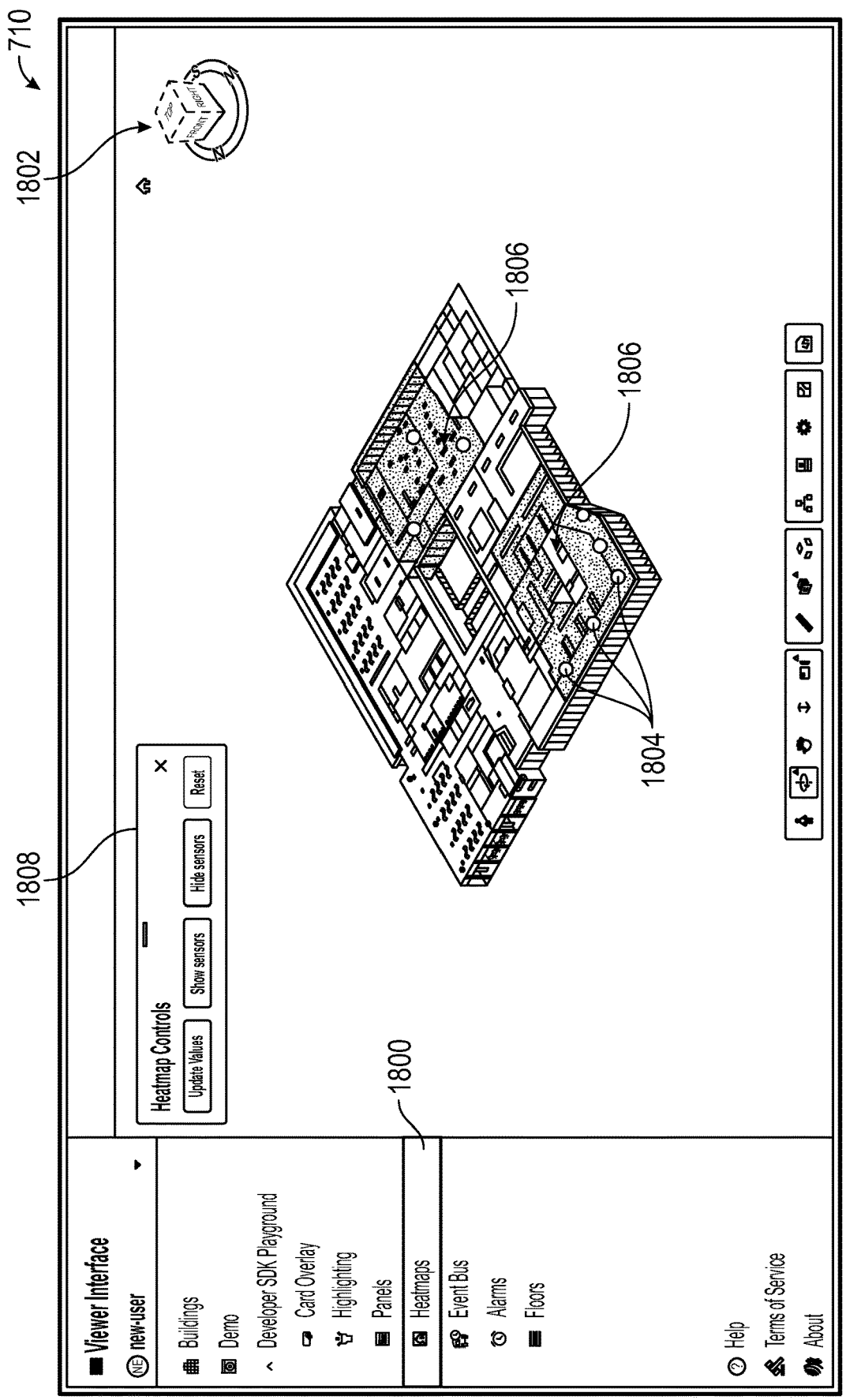
FIG. 18 is a user interface showing a heat map page, according to an exemplary embodiment.

Referring now to FIG. 18, the viewer interface 710 may include a heat map button 1800 configured to display a heat map page 1802 to the user. As illustrated, the heat map page 1802 may include a floor view of the virtual building 902 showing various sensors 1804 and heat map overlays 1806 (e.g., indicated by the stippled portions of the floor view in FIG. 18). The heat map page 1802 further includes a heat map control window 1808. The heat map control window 1808 is configured to allow the user to show or hide the various sensors 1804 within the floor view of the virtual building 902 and to update the values utilized to create the heat map overlays 1806. For example, in some instances, the sensors displayed on the heat map page 1802 correspond to physical sensors within the physical building. Accordingly, by updating the values utilized to create the heat map overlays 1806, the device measurement and recording data from the physical sensors is fetched to provide a real-time or nearly real-time heat map.

In some instances, the heat map overlays 1806 provide a visual representation (e.g., different colors over an area) of a temperature distribution, an airflow or ventilation distribution, an indoor air quality distribution (e.g., $CO^2$ levels, humidity, PM2.5 levels), a camera coverage distribution, an occupancy distribution, a lighting distribution, an energy usage distribution, an energy efficiency distribution, or any other pertinent type of distribution within the floor view of the virtual building, as desired for a given application and by fetching data from corresponding physical sensors within the physical building. For example, in some instances, high temperature areas may be overlaid with a red color and low temperature areas may be overlaid with a green or blue color. Between the high temperature areas and the low temperature areas may be a gradient color scheme indicating temperature drop off from the high-temperature area to the low-temperature area within the floor view, thereby creating the corresponding heat map overlay. In some instances, certain colors within the heat map may be indicative that a given sensor level is above or below an acceptable threshold (e.g., a temperature threshold, an air quality threshold, an energy consumption threshold). In some instances, this threshold may be set by a user via one or more options provided within the viewer interface 710. In some instances, the viewer interface 710 may allow the user to select the color scheme for a given heat map.

It will be appreciated that a variety of different types of heat map overlays may be utilized in a variety of configurations or color schemes to depict a variety of distribution types, as desired for a given application. In some instances, the heat maps shown may be selectively shown at various times throughout a given day, week, month, quarter, or year. For example, in some instances, the user may use a time slider on the heat map page 1802 to selectively view different heat maps (e.g., temperature, indoor air quality, occupancy, energy, etc.) overlaid onto a selected area representing various distributions at different times.

As an illustrative example, in some instances, a user may utilize a temperature or energy consumption heat map to identify various hot or cold areas within a given area. The user may then use the information gleaned from the heat map to make various layout, design, or device set point changes within the given area or throughout the building. Further, in some instances, the user may view a variety of heat maps pertaining to different distributions (e.g., utilizing various sensor and/or device data) to identify or correlate how various distributions interrelate (e.g., how a high temperature area may be correlated with a low energy efficiency area, how a lighting distribution may be correlated with an occupancy distribution, etc.).

In some instances, similar to the heat map overlay 1806, the viewer interface 710 may provide a lighting or camera coverage overlay configured to show a light or camera coverage distribution within a room, floor, or other area. For example, the viewer interface 710 may indicate a path of light clearance or camera visibility coming from a particular light or camera within a selected space. In these instances, the light or camera distribution may be viewed within a given area and the user may determine whether additional lights and/or cameras may be necessary.

Figure 19A:
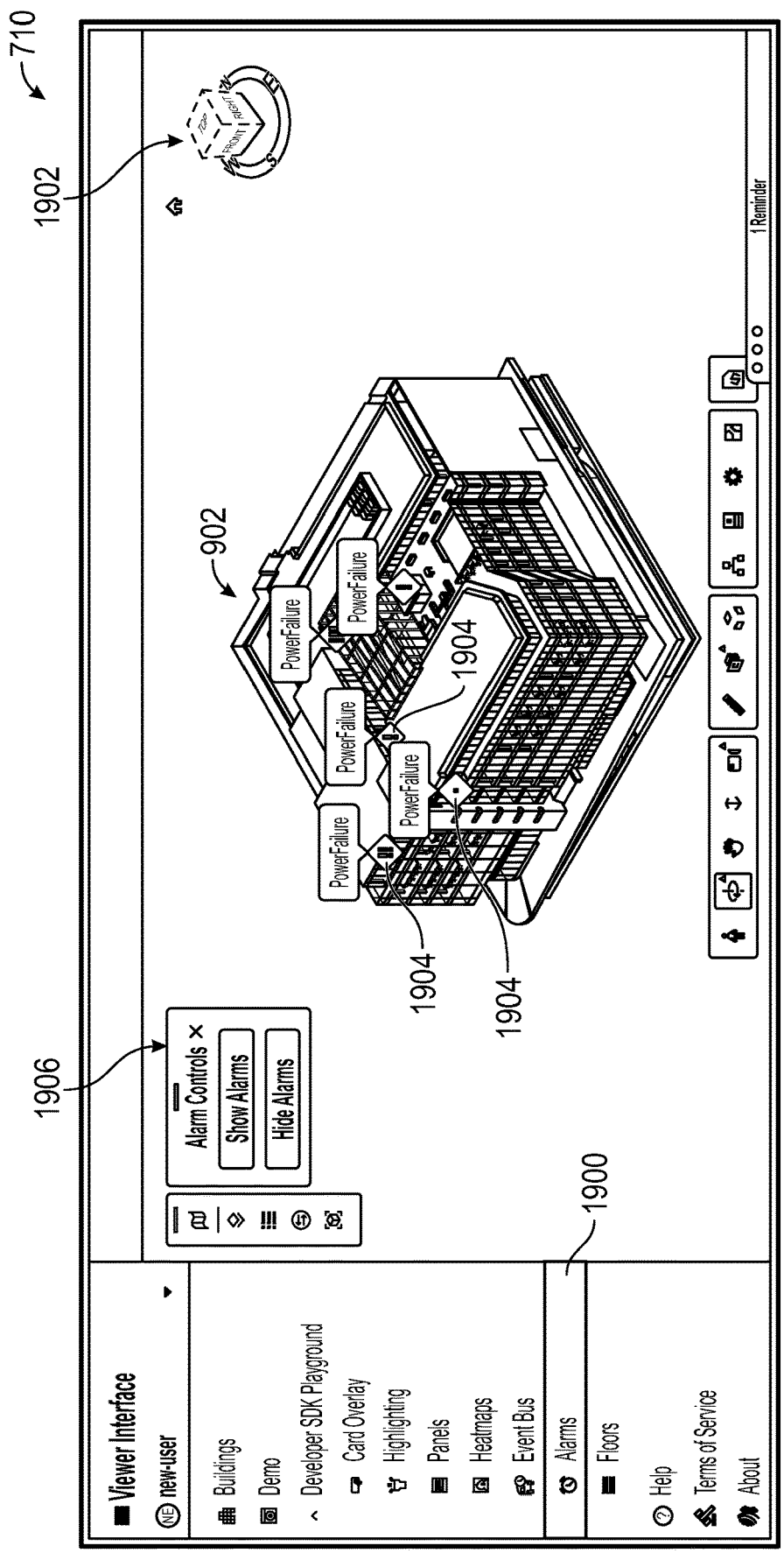
FIG. 19A is a user interface showing an alarm page, according to an exemplary embodiment.

Referring now to FIG. 19A, the viewer interface 710 may include an alarm button 1900 configured to display an alarm page 1902 to the user. As illustrated, the alarm page 1902 may include an alarm controls window 1904 and a variety of alarm indications 1906. The alarm controls window 1904 is configured to allow the user to have the various alarm indications 1906 shown or hidden on the virtual building 902. Each of the various alarm indications 1906 may be located within the virtual building 902 at a location associated with the corresponding active alarm. For example, if an alarm is associated with a security door fault, the alarm indication 1906 may be located at the door or door access panel associated with the security door fault within the virtual building 902. As another example, if a device is experiencing a power failure, the alarm indication 1906 may be located at the location of the corresponding device. It will be appreciated that the alarm indications 1906 may be provided for a variety of differing types of alarms for a variety of different types of devices. Accordingly, the foregoing examples are in no way meant to be limiting.

In some instances, the various alarm indications 1906 may be filtered based on the floor that the alarms are associated with, a type of each of the alarms (e.g., power failure, an open door fault), a criticality of the alarms (e.g., high, medium, low), or any other relevant filtering criteria. Further, in some instances, upon clicking on a particular one of the alarm indications 1906, the user is allowed to obtain additional information regarding the alarm, such as the device(s) associated with the alarm, the type of alarm, time series data associated with the alarm (e.g., when the alarm began), the criticality of the alarm, or any other relevant data. In some instances, upon clicking on a particular one of the alarm indications 1906, the user is allowed to interact with the alarm (e.g., acknowledge a fault, mute a fault, trigger a standard operating procedure, etc.).

Figure 19B:
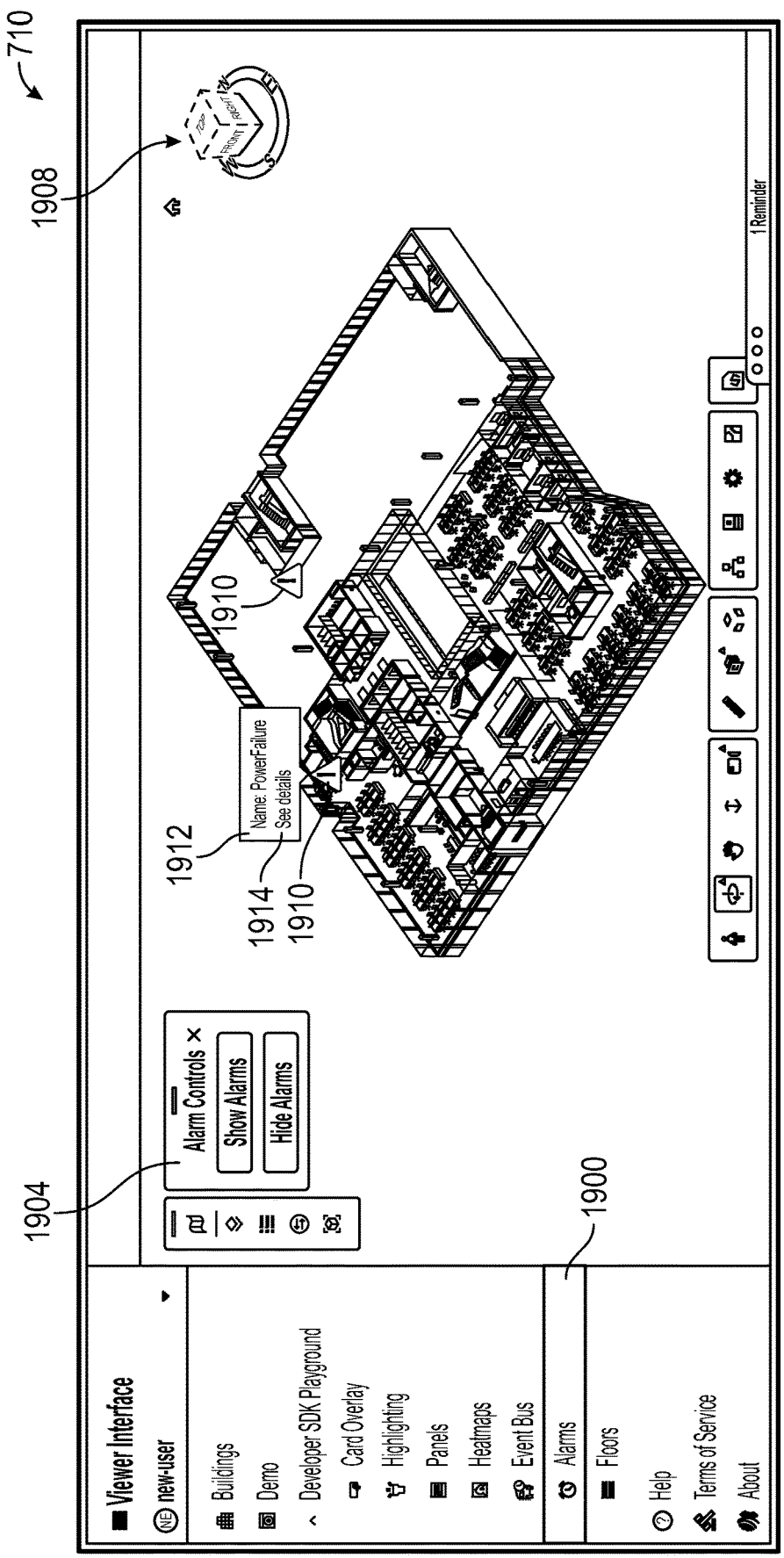
FIG. 19B is a user interface showing another alarm page, according to an exemplary embodiment.

Referring now to FIG. 19B, another alarms page 1908 displayable on the viewer interface 710 is shown, according to an example embodiment. As illustrated, the alarms page 1908 similarly includes the alarm controls window 1904 and a variety of selectable alarm icons 1910 (similar to the alarm indications 1906). The various selectable alarm icons 1910 are each located within the virtual building 902 at a location associated with a corresponding active alarm. The various selectable alarm icons 1910 may be selectable within the viewer interface 710 to display corresponding alarm description windows 1912. In some instances, the alarm description windows 1912 may include an alarm name associated with the alarm and/or various other general information pertaining to the alarm. In some instances, the alarm description windows 1912 may include a details link 1914 configured to provide the user with additional details pertaining to the alarm. In some instances, the additional details may be provided via a separate details page. In some instances, the additional details may be provided via a details pop-up window displayed on the viewer interface 710 on top of or otherwise overlaid onto the alarms page 1908. In some instances, the selectable alarm icons 1910, the alarm description windows 1912, and/or the information provided via the details link 914 may be customizable by the user to allow for the user to select for different alarms and/or alarm information to be provided within the alarms page 1908, the separate details page, and/or via the details pop-up window, as desired for a given application.

Figure 20:
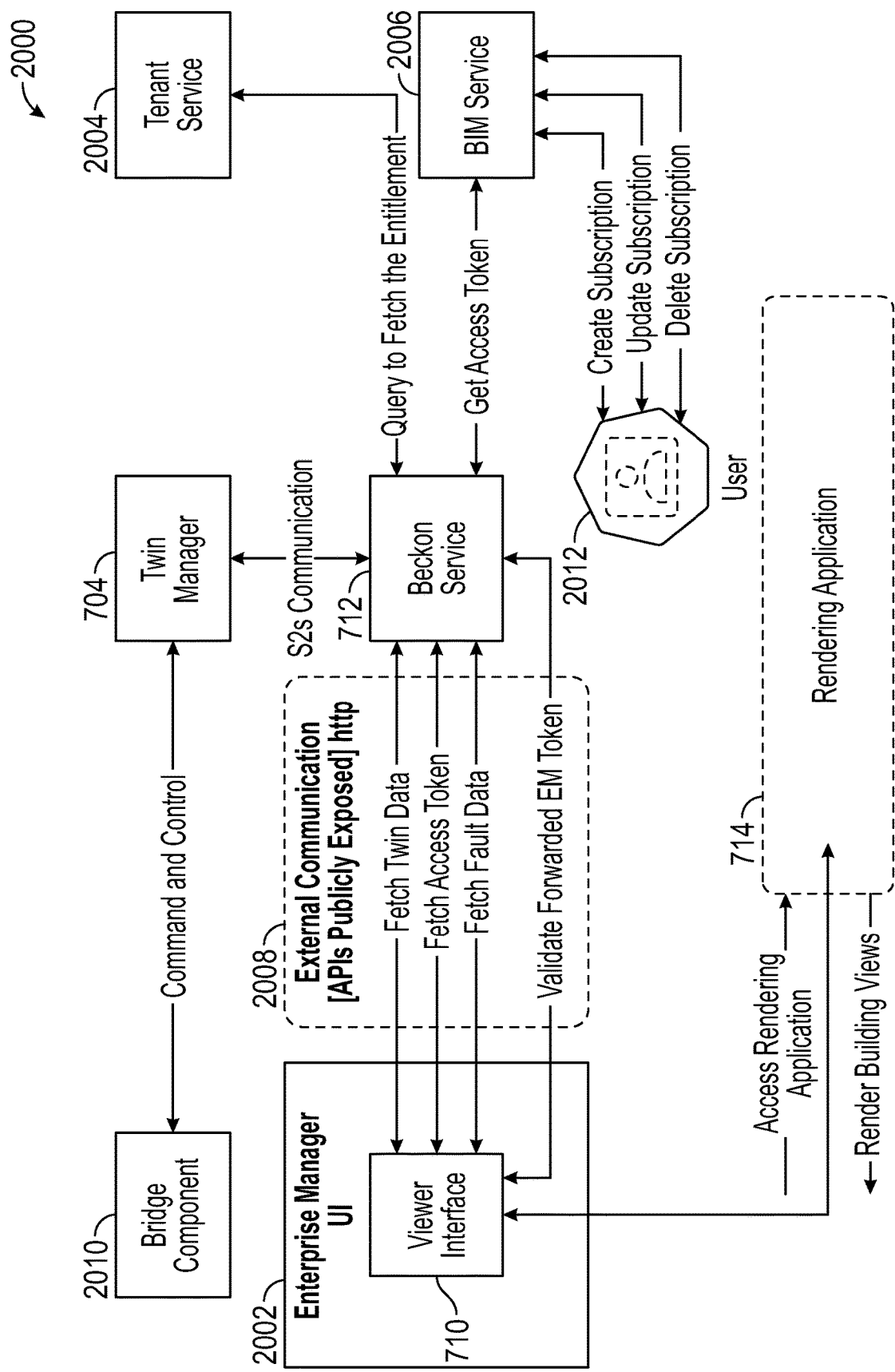
FIG. 20 is a block diagram of an enterprise manager system for generating and presenting a variety of information pertaining to an enterprise to a user, according to an exemplary embodiment.

Referring now to FIG. 20, an enterprise manager system 2000 for providing a variety of information pertaining to an enterprise to a user is shown, according to an exemplary embodiment. In some instances, the enterprise manager system 2000 includes the viewer interface 710 of the system 700 embedded within an enterprise manager user interface 2002. The viewer interface 710 in the enterprise manager system 2000 is similarly configured to communicate with the twin manager 704 and various platform manager components, such as a tenant service application 2004 and a BIM service application 2006 via the beckon services 712 using one or more external communication APIs 2008.

For example, in some instances, the viewer interface 710, when utilized within the enterprise manager user interface 2002, is configured to fetch twin data from the twin manager 704 via the beckon service 712. In some instances, the twin manager is in communication with a bridge component 2010 configured to allow for the user of the viewer interface 710 to perform control and command functions via interaction with the viewer interface 710, as discussed above with respect to FIG. 15. In some instances, the viewer interface 710 is further configured to fetch an access token from the BIM service application 2006 via the beckon service 712. In some instances, the BIM service application 2006 is configured to create, update, and/or delete a subscription associated with a user account 2012 of the user. The access token may be associated with the user account 2012 of the user. In some instances, the viewer interface is further configured to validate a forwarded enterprise manager token associated with the enterprise manager user interface 2002 with the tenant service application 2004 via the beckon service 712. In some instances, this validation may be different than the digital key service application discussed above, with respect to FIG. 7.

Once the appropriate information has been fetched by the viewer interface 710, the viewer interface 710 may then communicate the appropriate information with the rendering application 714 to create any of the various views and/or pages discussed above, with reference to FIGS. 7-19.

Figure 21:
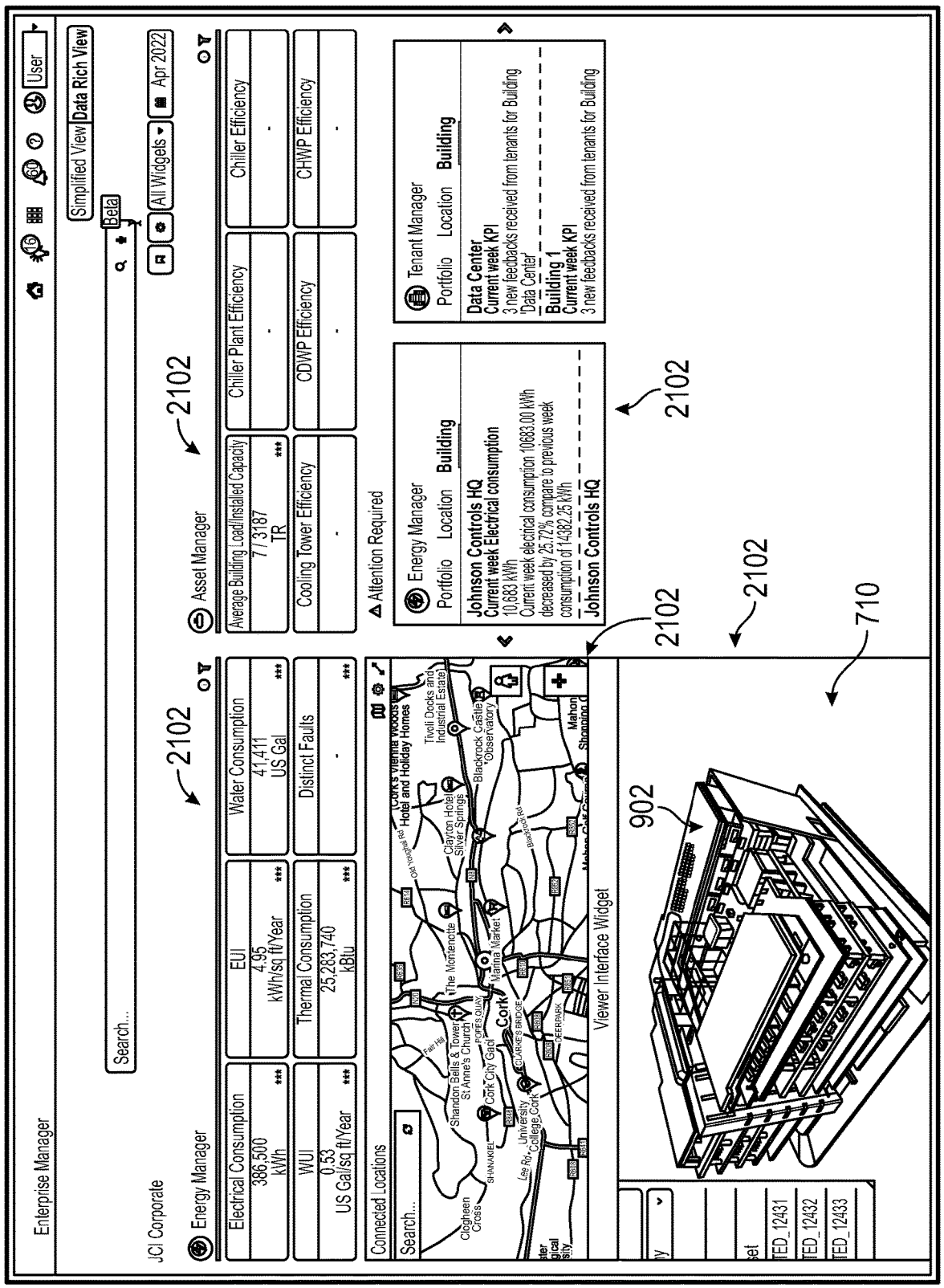
FIG. 21 is a user interface showing an enterprise manager page, according to an exemplary embodiment.

Referring now to FIG. 21, an example of an enterprise manager page 2100 of the enterprise manager user interface 2002, according to an exemplary embodiment. In some instances, the enterprise manager page 2100 includes a variety of widgets 2102 configured to provide various information to a user regarding an enterprise associated with the enterprise manager page 2100. For example, in some instances, the widgets 2102 may include an energy management widget configured to display various energy usage information (e.g., an electrical consumption metric, an energy use intensity metric, a water consumption metric, a water use intensity metric, a thermal consumption metric, a number distinct faults, etc.). In some instances, the widgets 2102 may include an asset manager widget configured to display various asset information (e.g., an average building load/installed capacity, a chiller plant efficiency, a chiller efficiency, a cooling tower efficiency, a condenser water pump efficiency, a chiller water pump efficiency, etc.). In some instances, the widgets 2102 include a connect locations widget configured to display a map view of an area having one or more buildings associated with enterprise. In some instances, the widgets 2102 include an action required widget configured to display various required actions or notifications pertaining to the energy manager and tenant manager widgets. In some instances, the action required widget is configured to allow for the various required actions or notifications to be filtered by portfolio, location, or building.

In some instances, the widgets 2102 include a building viewer widget including the viewer interface 710 described above. The building viewer widget including the viewer interface 710 is configured to allow the user of the enterprise manager page 2100 to select and view the virtual building 902 (or any other selected virtual building), and to perform any of the various functionality with respect to the virtual building 902 as discussed above, with reference to FIGS. 7-19, within the context of the enterprise manager page 2100.

Figure 22:
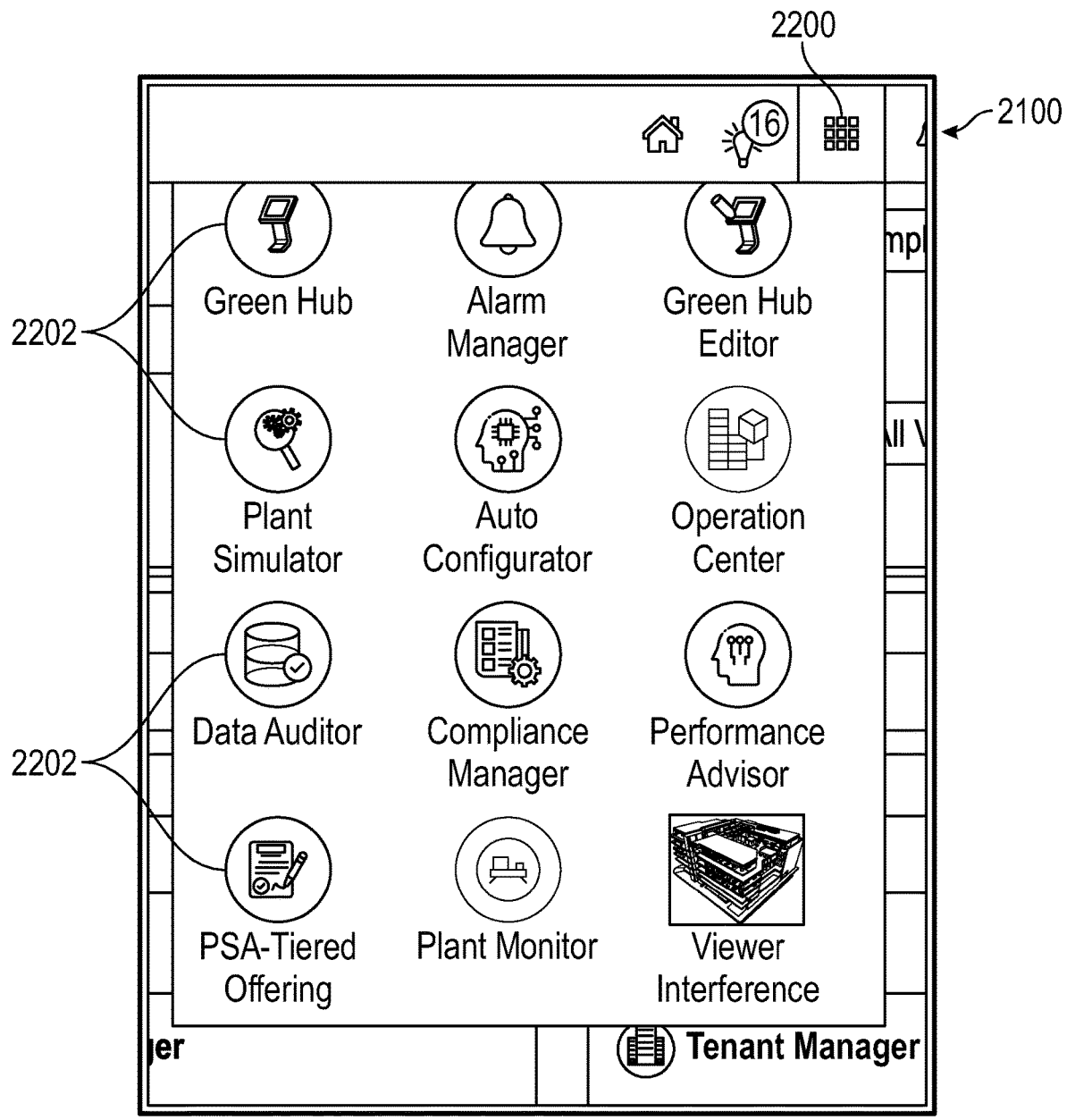
FIG. 22 is a user interface showing a plurality of widget selection icons associated with the enterprise manager page of FIG. 21, according to an exemplary embodiment.

Referring now to FIG. 22, in some instances, the enterprise manager page 2100 includes a widget selection button 2200 configured to display a plurality of widget selection icons 2202. Accordingly, in some instances, the user is allowed to customize the enterprise manager page 2100 to include only widgets 2102 that the user wishes to view. As illustrated, if the viewer interface widget not already shown on the enterprise manager page 2100, the user may select a viewer interface widget selection icon from the plurality of widget selection icons 2202 to have the viewer interface widget added to the enterprise manager page 2100.

Intelligent Fault-Driven Visualization

Referring now to FIGS. 23-33 generally, in some instances, the user may utilize a summary asset manager page of the enterprise manager user interface 2002 to view various top faults within a building, represented on a graphical model of the building as various fault indicators. These fault indicators provide a quick visual indication of where the highest priority faults are occurring within the building to the user. By showing only the top faults within the building, the user is beneficially allowed to quickly identify, obtain information about, diagnose, and address the highest priority faults within the building, all within the context of the enterprise manager user interface 2002.

For example, by interacting with a selected fault indicator, the user may be provided with various fault-specific information pertaining to the underlying fault associated with the selected fault indicators. The user may further be provided with a link to a detail asset manager page configured to provide detailed information pertaining to the underlying fault, as well as an intelligent fault visualization view of the graphical model.

The intelligent fault visualization view may be a predetermined view of the graphical model showing a piece of equipment on which the fault is occurring and any other equipment or spaces affected by the fault. For example, in some instances, the intelligent fault visualization view may be determined based on a location of the piece of equipment on which the fault is occurring, a fault type associated with the fault, a location of various other equipment that serve or are served by the piece of equipment on which the fault is occurring, and/or equipment relationships (e.g., relationships between various equipment, meters, device, etc. associated with the fault). In some instances, various intelligent fault visualizations may be independent of the areas affected by the corresponding faults. For example, in some instances, an intelligent fault visualization may include a visualization of the equipment affected by a fault linked together and independent of the area where that equipment is located within the building. For example, if a given fault is on an air handling unit, the intelligent fault visualization may depict the air handling unit linked to a corresponding chiller and variable air volume unit, and this depiction may be isolated from the building (e.g., shown by itself within the intelligent fault visualization).

In some instances, the piece of equipment on which the fault is occurring, other equipment affected by the fault, or spaces within the building affected by the fault may be highlighted or otherwise visually indicated within the graphical model to allow for the user to quickly discern where the fault is occurring and/or how it is affecting other equipment and/or spaces within the building. Beneficially, providing this highlight or other visual indication allows the user to quickly visualize and understand how the fault is affecting the building at large, and also allows for the user to more easily diagnose underlying issues which may be causing a given fault.

Figure 23:
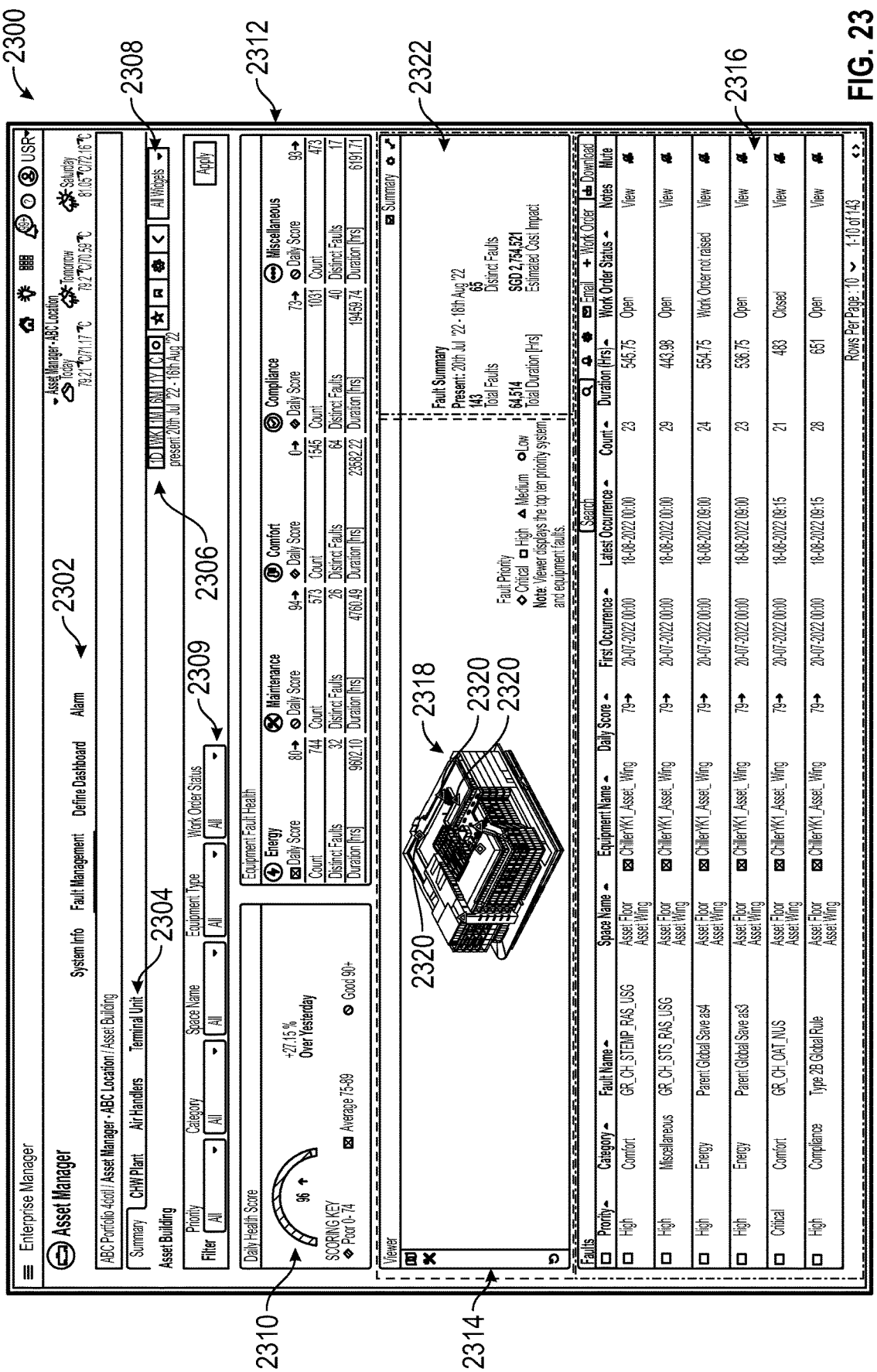
FIG. 23 is a user interface showing a summary asset manager page including a plurality of fault summary widgets, according to an exemplary embodiment.

Referring now to FIG. 23, in some instances, the user may navigate to a summary asset manager page 2300 of the enterprise manager user interface 2002 (e.g., via interaction with the asset manager widget 2102 on the enterprise manager page 2100). In some instances, the summary asset manager page 2300 may allow the user to view differing information and perform various actions through interaction with asset manager tabs 2302. For example, the user may selectively view various system information pertaining to a selected building, view fault information pertaining to the selected building, define the overall layout of the asset manager page (e.g., which may be formed as a dashboard), or view various alarm information pertaining to the selected building.

In some instances, within a fault management tab of the various asset manager tabs 2302, the summary asset manager page 2300 may allow the user to selectively view fault information pertaining to a building at different levels of particularity using any of a plurality of detail level icons 2304. For example, in some instances, various faults may be received by the system (e.g., any of the systems described herein) from one or more pieces of equipment within the building or identified (e.g., via one or more artificial intelligence agents 370) based on device measurement and recording data received from the one or more pieces of equipment within the building, and the corresponding fault information may be stored within an event database (e.g., the entity relationship and event database 160). Accordingly, the system may then retrieve that fault information from the event database to be used in the generation of the summary asset manager page 2300 (and/or the detail asset manager page 3000 of FIG. 30).

In some instances, the summary asset manager page 2300 may allow the user to selectively view an overall summary of the fault information, fault information pertaining to a particular plant or subsection of the building, fault information pertaining to particular types of equipment within the building, and so on. The summary asset manager page 2300 may further allow the user to change a timeframe from which the fault information is pulled for viewing using any of a plurality of information timeframe buttons 2306. For example, the user may choose to view fault information pertaining to the building from the last day, the last week, the last month, the last six months, the last year, etc. In some instances, the summary asset manager page 2300 may further allow the user to choose a custom timeframe. Additionally, in some instances, the summary asset manager page 2300 may allow the user to apply the selected timeframe to less than all of the widgets (i.e., only a subset of widgets) within the summary asset manager page 2300 using a widget selection dropdown icon 2308.

Similarly, in some instances, the summary asset manager page 2300 may allow for the user to change the kinds of faults for which the information is pulled for viewing using a variety of fault filter dropdown icons 2309. For example, the user may be allowed to filter the fault information provided to the user based on a fault priority (e.g., critical, high, medium, low), a fault category (e.g., energy, maintenance, comfort, compliance), a space name associated with the faults, an equipment type associated with the faults, a work order status associated with the faults, or any other suitable filtering option, as desired for a given application. In some instances, the summary asset manager page 2300 may default to showing information for all faults within the building unless the user has selected relevant filtering options.

As shown in FIG. 23, in some instances, the summary asset manager page 2300 may include a plurality of fault summary widgets. For example, in some instances, the summary asset manager page 2300 may include a daily health score widget 2310, an equipment fault health widget 2312, a viewer widget 2314, and a fault list widget 2316. As shown, the daily health score widget 2310 may provide the user with a daily health score for the selected building. In some instances, the daily health score may be calculated for the time period selected by the user (e.g., via one of the information timeframe buttons 2306) and/or the faults matching the filter selections selected by the user (e.g., via one of the fault filter dropdown icons 2309). The daily health score may be further calculated based on a variety of predetermined factors pertaining to faults within the building. For example, the predetermined factors may include a number of building faults, a total cumulative duration of the building faults, a total cost impact of the various building faults, a severity of the various building faults (e.g., critical, high, medium, low), and/or any other suitable factors, as desired for a given application.

In some instances, the equipment fault health widget 2312 may be configured to provide various equipment-based fault information to the user. For example, the equipment fault health widget 2312 may provide the user with information on building fault health (e.g., a fault health score) for various equipment sub-categories. In some instances, the sub-categories may include energy, maintenance, comfort, compliance, miscellaneous, or any other suitable sub-category, as desired for a given application. Accordingly, as shown in FIG. 23, the equipment fault health widget 2312 may display to the user a daily score for each sub-category, a total count of faults within each sub-category, a number of distinct faults within each sub-category, and a total duration of the faults within each sub-category.

In some instances, the daily score for each sub-category may be based on a similar set of predetermined factors as those described above, with respect to the daily health score for the selected building, but may only account for the various systems and devices related to the corresponding sub-category. Similarly, the total count of faults, the number of distinct faults, the total duration of the faults, and/or the total duration by severity level for the faults for each sub-category may only account for the various systems and devices related to that sub-category. In some instances, a mapping of the various systems and devices within the building to the different sub-categories shown in the equipment fault health widget 2312 may be predetermined and stored within the twin manager 704 (e.g., within a graph projection database similar to the graph projection database 162).

Figure 32:
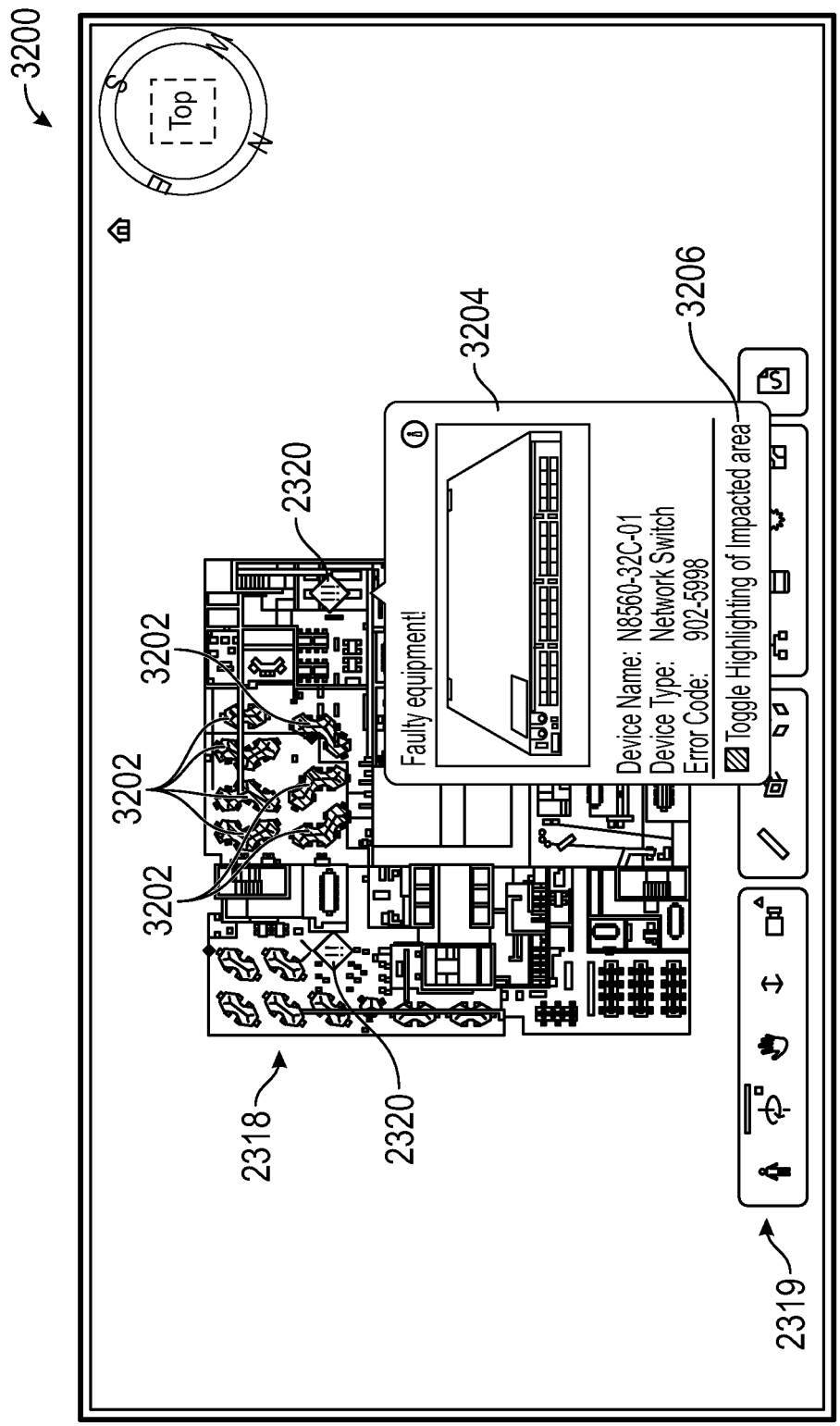
FIG. 32 is the viewer widget of FIG. 24 displaying an intelligent fault visualization indicating devices affected by a fault, according to an exemplary embodiment.
Figure 33:
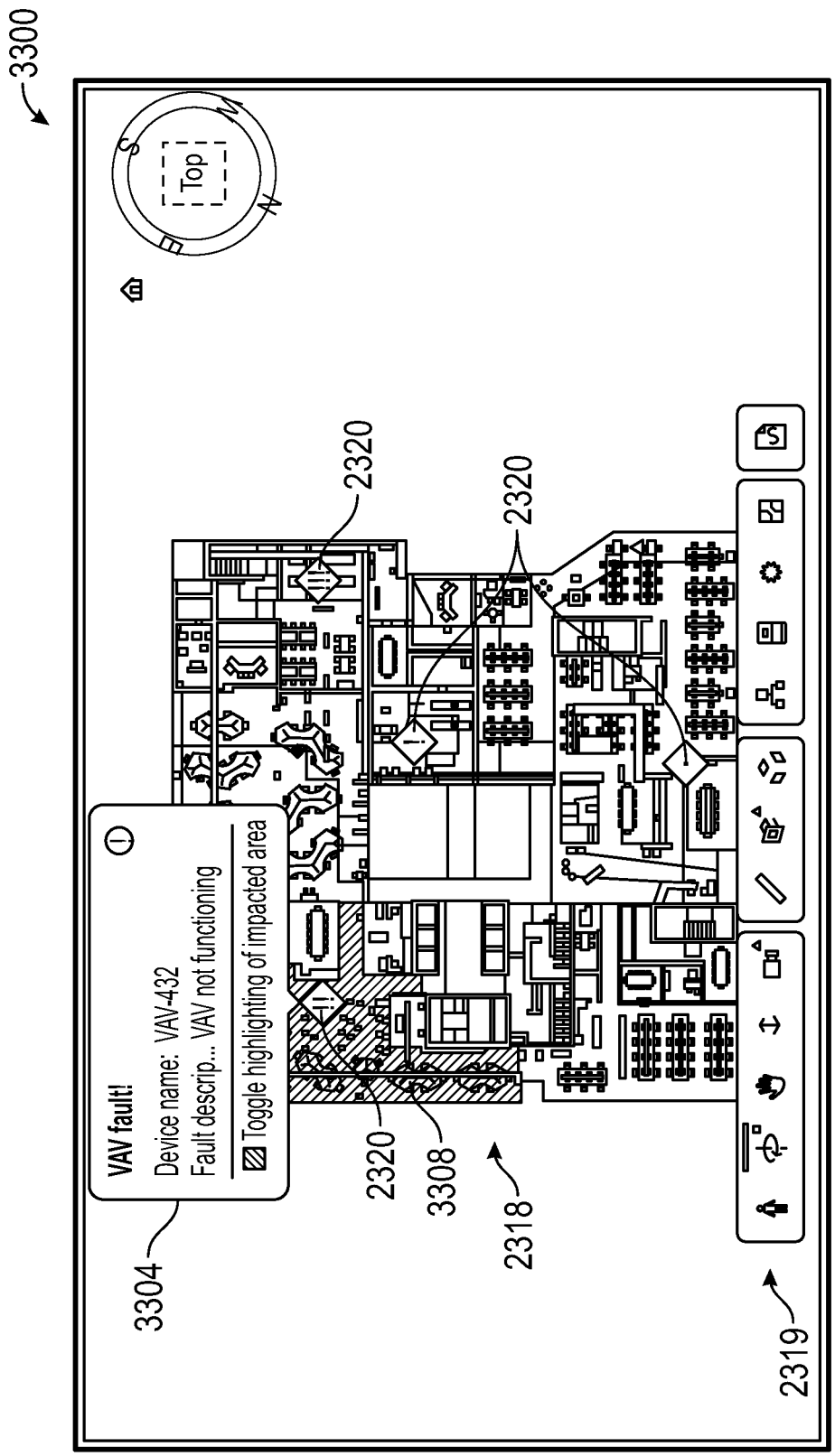
FIG. 33 is the viewer widget of FIG. 24 displaying another intelligent fault visualization indicating an area affected by a fault, according to an exemplary embodiment.

As shown in FIGS. 24-29, the viewer widget 2314 is similar to the viewer interface 710 discussed above. For example, within the viewer widget 2314, the user may be provided with a view of a graphical model 2318 of the building. The viewer widget 2314 may similarly allow for manipulation of the view of the graphical model 2318 (e.g., rotation, panning, zooming, etc.). For example, in some instances, the viewer widget 2314 may include a viewer manipulation toolbar 2319 (as shown in FIGS. 32 and 33) including a variety of view-manipulation buttons.

In some instances, the viewer widget 2314 is configured to overlay a predetermined number of fault indicators 2320 onto the graphical model 2318. In some instances, the predetermined number of fault indicators 2320 may correspond to a predetermined number of top faults associated with the building. For example, in some instances, the viewer widget 2314 is configured to overlay 10 fault indicators 2320 corresponding to the 10 top faults within the building. In other instances, more or less than 10 (e.g., 5, 20, 50) fault indicators can be shown, as desired for a given application.

In some instances, the predetermined number of top faults may be identified by the system (e.g., any of the systems described herein) based on the timeframe selected by the user (e.g., via one of the information timeframe buttons 2306 shown in FIG. 23) and/or the faults matching the filter selections selected by the user (e.g., via one of the fault filter dropdown icons 2309). The viewer widget 2314 may then overlay each fault indicator 2320 onto the graphical model 2318 based on a device location associated with a device on which each fault is occurring. For example, for each fault, the corresponding device may have a device identifier or "twin ID." Accordingly, within the twin manager 704 (e.g., within a graph projection database similar to the graph projection database 162), that device identifier or "twin ID" may be linked to a particular location within the graphical model 2318. Thus, the system (e.g., any of the systems described herein) may access the information stored within the twin manager 704 (e.g., within the graph projection database) to determine where the associated fault indicator 2320 should be overlaid within the graphical model 2318.

In some instances, the top faults may further be determined by the system (e.g., any of the systems described herein) based on a variety of fault-specific factors. For example, in some instances, the top faults may be determined based on a number of times the fault has occurred within the selected timeframe, a total cumulative duration of the recurring fault over the selected timeframe, a total cost impact of the recurring fault over the selected timeframe, a criticality of the fault, and/or any other suitable factors, as desired for a given application. In some instances, the top faults may further be determined based on a weighted combination of any of the aforementioned factors. In any case, the factors and the respective weights to be attributed to each factor when determining the top faults may be preselected by a user of the system (e.g., any of the systems described herein). Accordingly, the system may rank all of the faults based on the fault-specific factors or the weighted combination and identify the top faults as the faults having the highest impact on the building based on the fault-specific factors or the weighted combination. In some instances, the various faults may be identified and updated in real-time or nearly real-time based on a fault resolution status of each fault. For example, once a fault is resolved, the corresponding fault indicator 2320 associated with the fault may be remove from the graphical model 2318 based on the updated fault resolution status (e.g., "resolved") and a new top fault may take its place. Furthermore, in some instances, faults associated with systems and equipment may be represented with fault indicators 2320 having different forms. For example, in some instances, system-based faults may be represented by larger fault indicators 2320 than equipment-based faults, or vice versa. It should be appreciated that system-based faults and equipment-based faults may be differentiated in a variety of manners, as desired for a given application. Further, in some instances, various equipment faults may be tagged or otherwise associated with a given building, floor, or other space. As such, in some instances, the top faults may be selectively filtered and displayed for any selected building, floor, or other selected space (e.g., selected via the corresponding fault filter dropdown icon 2309 or the space section window 2325 shown in FIG. 25).

In some instances, the viewer widget 2314 may be configured to overlay all of the faults within the building exceeding a predetermined threshold for any of the individual fault-specific factors mentioned above or a predetermined threshold for a weighted combination of the fault-specific factors. In some other instances, the viewer widget 2314 may be configured to overlay only a predetermined number of top faults, as discussed above, that exceed the predetermined threshold for either any of the fault-specific factors or the weight combination.

In some instances, the various fault indicators 2320 overlaid onto the graphical model 2318 may have different colors and/or shapes depending on the criticality of the underlying fault. For example, in some instances, a red diamond shape may signify a critical fault, a dark orange square may signify a high priority, a light orange triangle may signify a medium priority, and a yellow circle may signify a low priority. It will be appreciated that the criticality of the various faults may represented by other color and/or shapes, as desired for a given scenario.

In some instances, the viewer widget 2314 further includes a fault summary portion 2322 configured to provide a summary of various pertinent fault details associated with the building over the selected timeframe. For example, in some instances, the fault summary portion 2322 may include an indication of the selected timeframe within which fault information associated with the building was compiled, a total number of faults that occurred within the selected timeframe, a total number of distinct faults within the selected timeframe, a total combined duration of the faults within the selected timeframe, and an estimated cost impact associated with the faults within the selected timeframe. In some other instances, the information displayed to the user within the fault summary portion 2322 may be selectively modified by the user based on the user's preference. Further, it should be appreciated that, in some instances, when the user selects various filtering options from the fault filter dropdown icons 2309, the summary of the various pertinent fault details may be a summary of the filtered set of faults based on the user's filtering selections.

Figure 24:
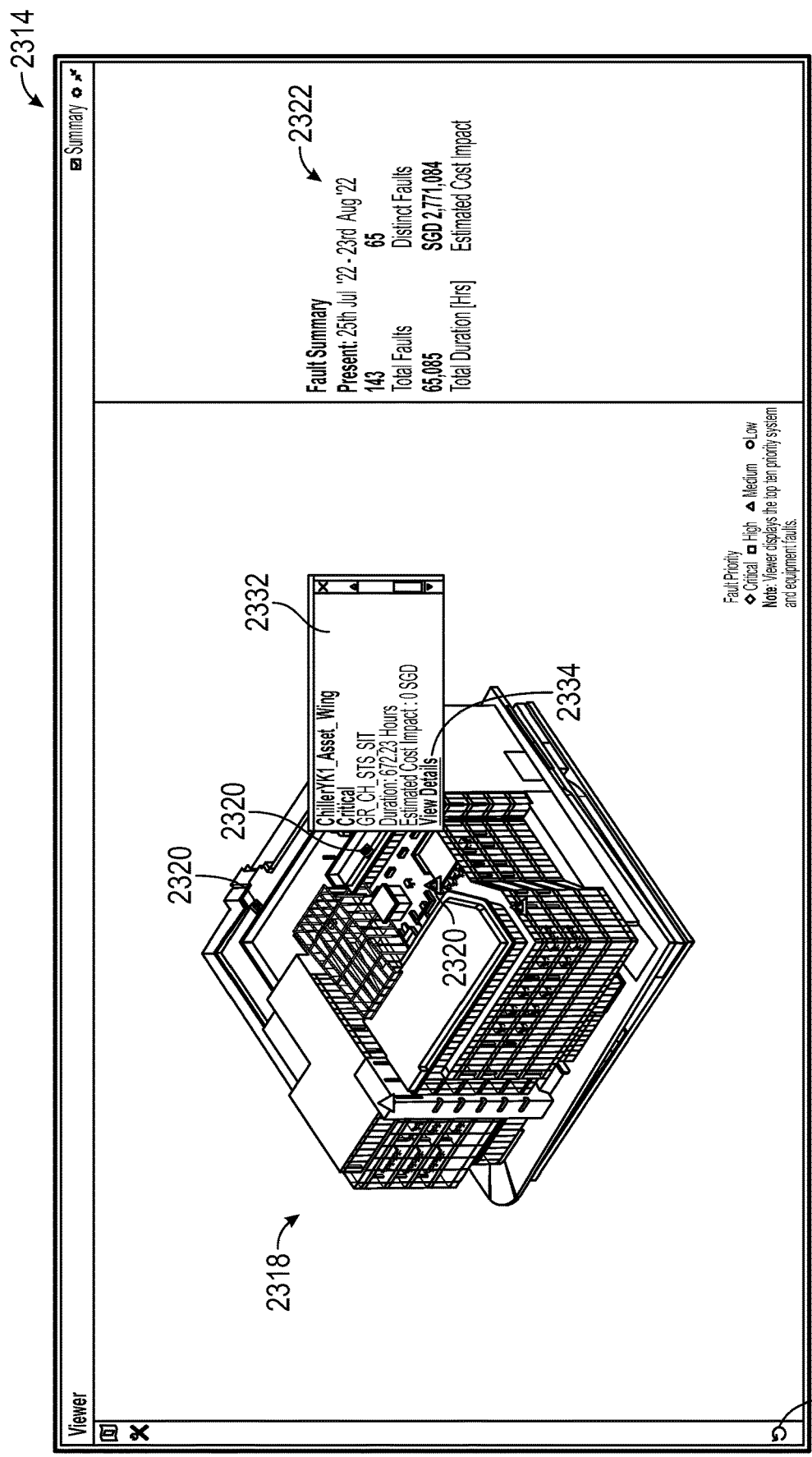
FIG. 24 is a viewer widget displaying a building fault summary view, according to an exemplary embodiment.
Figure 25:
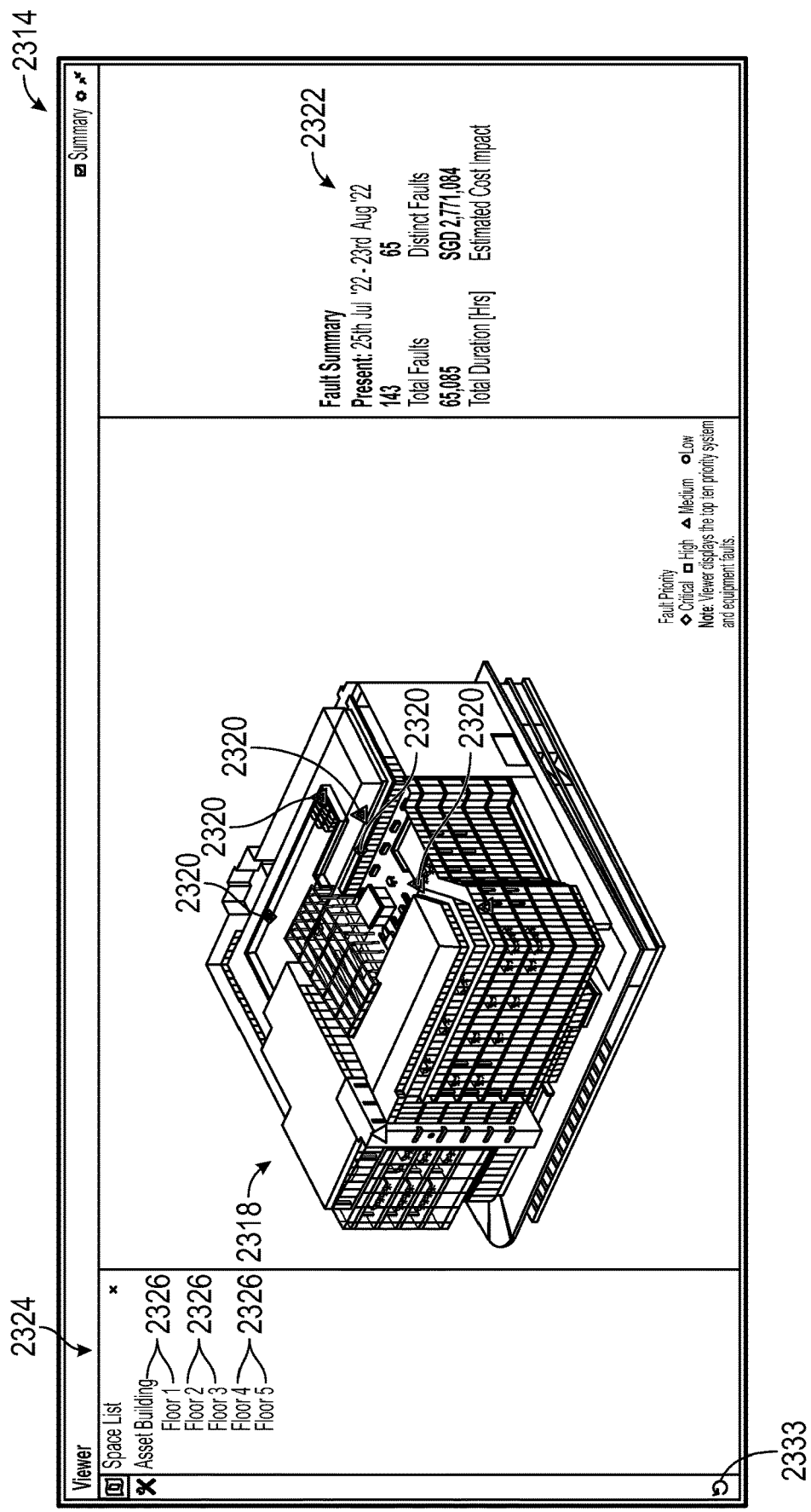
FIG. 25 is the viewer widget of FIG. 24 displaying the building fault summary view and including a space selection window, according to an exemplary embodiment.
Figure 26:
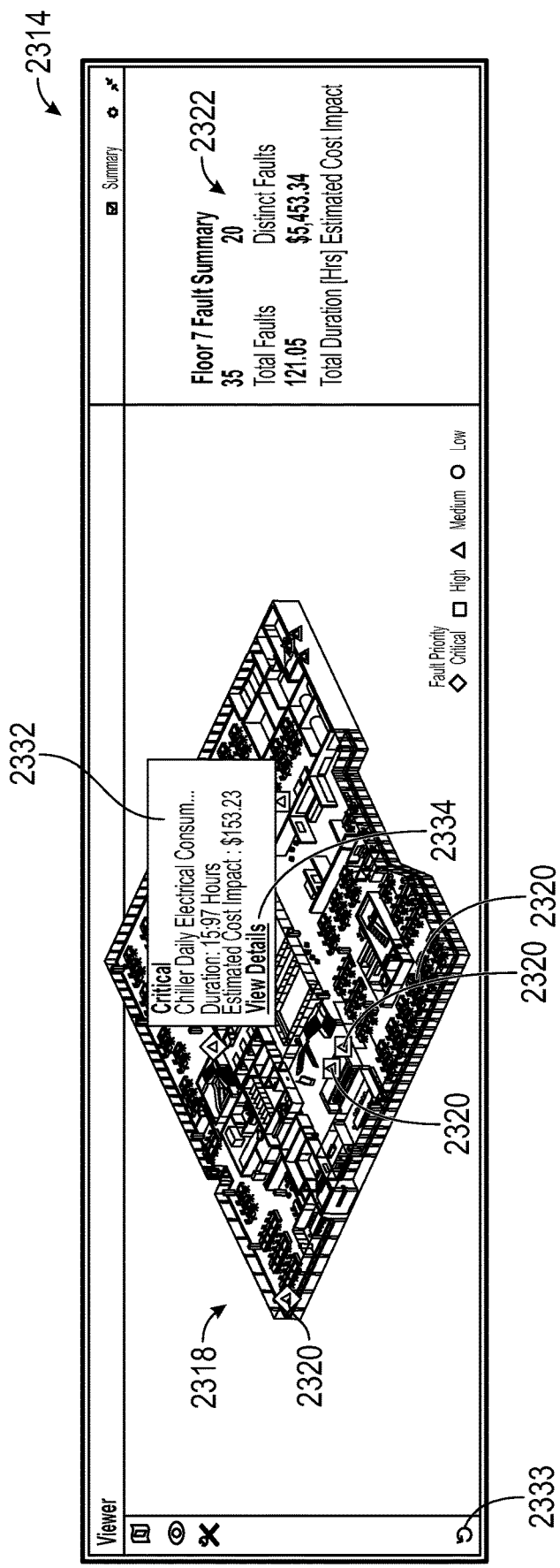
FIG. 26 the viewer widget of FIG. 24 displaying a three-dimensional floor fault summary view, according to an exemplary embodiment.
Figure 27:
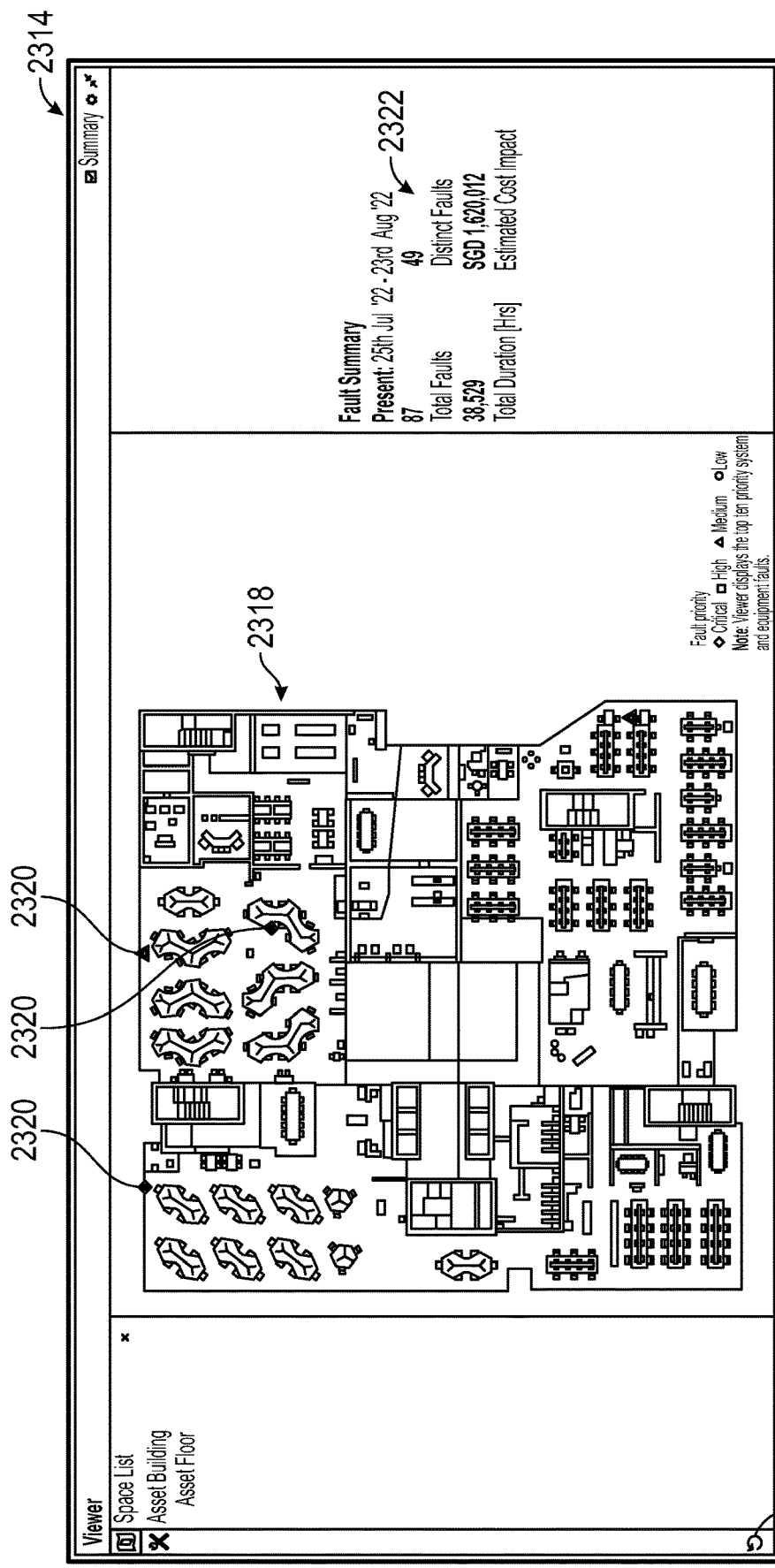
FIG. 27 is the viewer widget of FIG. 24 displaying a two-dimensional floor fault summary view, according to an exemplary embodiment.

With reference to FIG. 25, in some instances, the viewer widget 2314 may include a space selection window 2324 having a plurality of selectable spaces 2326 configured to allow the user to navigate to different views of the graphical model 2318. For example, in some instances, the user may be allowed to selectively switch between a building summary view (e.g., as shown in FIGS. 23-25 and 28) and a specific floor summary view (e.g., as shown in FIGS. 26, 27, and 29). In some instances, the user may similarly be allowed to toggle between a three-dimensional floor view (e.g., as shown in FIG. 26) and a two dimensional floor view (e.g., as shown in FIGS. 27 and 29), as desired for a given application.

Although the space selection window 2324 depicted in FIG. 25 only includes one selectable space 2326 corresponding to a building (e.g., "asset building"), it should be appreciated that the space selection window 2324 could include multiple selectable spaces 2326 corresponding to a plurality of corresponding buildings to allow for the user to selectively view fault information for different buildings. In these instances, the user may similar be able to select from multiple floor views within each selectable building. Additionally, although the selectable spaces 2326 shown in FIG. 25 only go down to the floor level, it should be understood that the space selection window 2324 could include a more detailed hierarchy. For example, in some instances, the space selection window 2324 may include selectable spaces 2326 that allow the user to selectively view predetermined spaces, devices, and/or systems within each floor.

Further, in some instances, upon selection of a particular space (e.g., a selected building, floor, or other space), the viewer widget 2314 may be configured to automatically update the fault indicators 2320 overlaid onto the graphical model 2318 and/or the information displayed within the fault summary portion 2322. For example, in some instances, upon selection of a particular floor, the system (e.g., any of the systems described herein) may be configured to identify the top faults associated with the selected floor and to overlay a corresponding number of fault indicators 2320 associated with the selected floor, in a similar manner to that discussed above. Similarly, in some instances, upon selection of a particular floor, the viewer widget 2314 may be configured to update the information displayed within the fault summary portion 2322 to include a summary of the fault information pertaining to the selected floor instead of the entire building.

Figure 28:
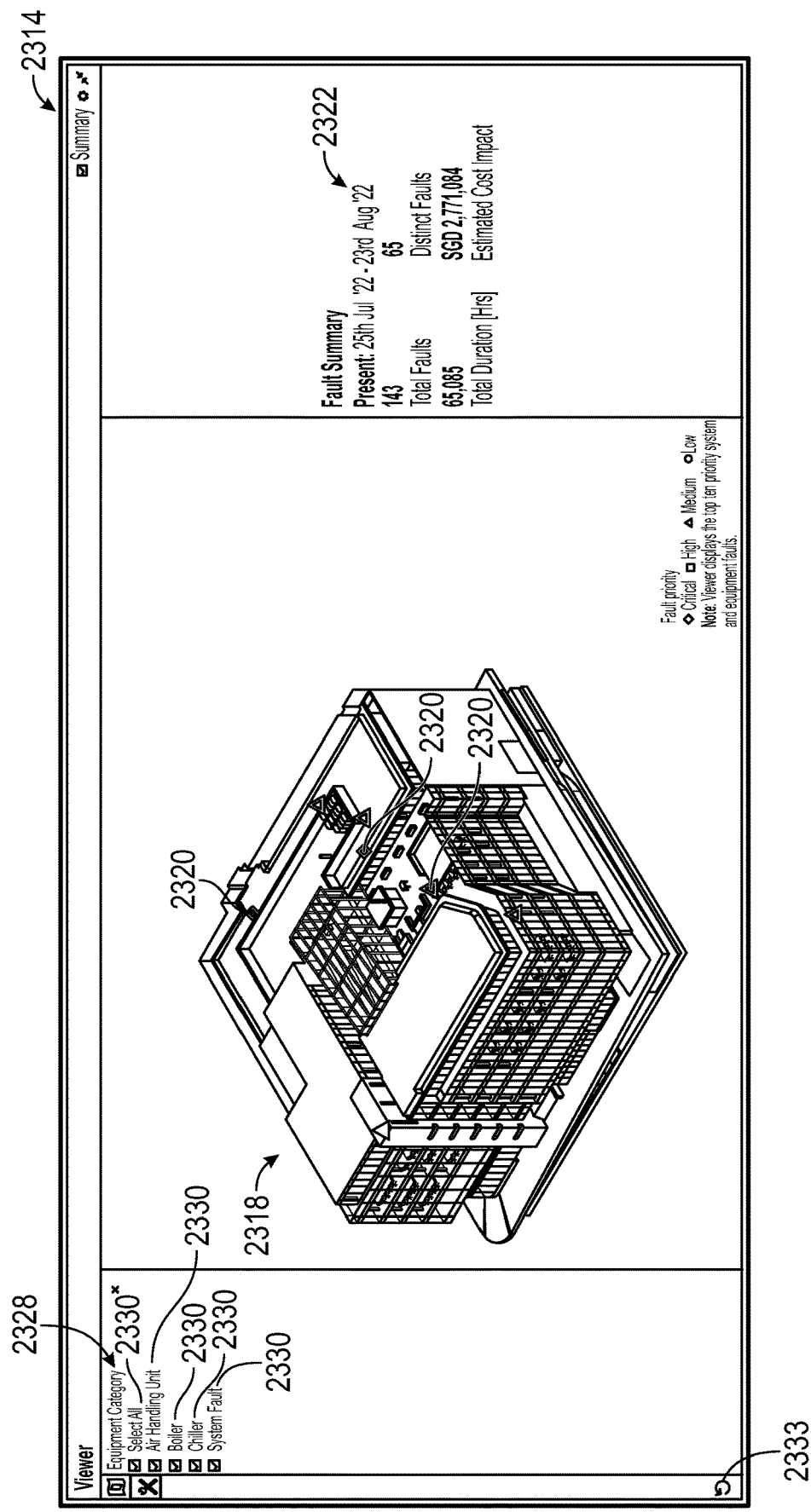
FIG. 28 is the viewer widget of FIG. 24 displaying the building fault summary view and including an equipment category selection window, according to an exemplary embodiment.
Figure 29:
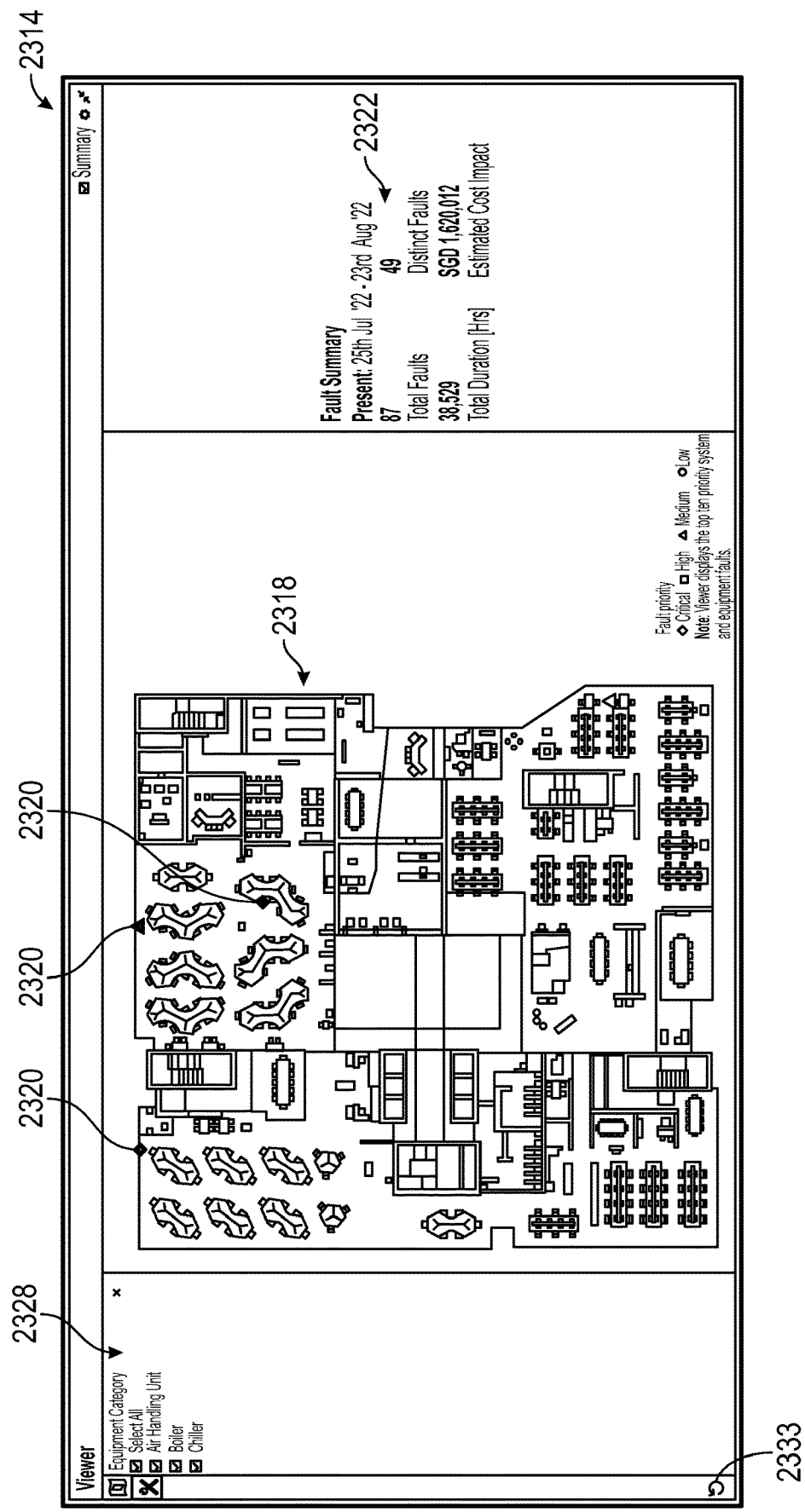
FIG. 29 is the viewer widget of FIG. 24 displaying the floor fault summary page and including the equipment category selection window, according to an exemplary embodiment.

As shown in FIGS. 28 and 29, in some instances, the viewer widget 2314 may include an equipment category selection window 2328 having a plurality of selectable equipment categories 2330 configured to allow the user to selectively toggle various fault indicators 2320 overlaid onto the graphical model 2318 on or off (e.g., to hide or show the fault indicators 2320 based on corresponding check box selections).

For example, in some instances, the plurality of selectable equipment categories 2330 may include a "select all" category configured to automatically include all of the fault indicators 2320, an "air handling unit" category configured to selectively toggle fault indicators associated with air handling units on or off, a "boiler" category configured to selectively toggle fault indicators associated with boilers on or off, a "chiller" category configured to selectively toggle fault indicators associated with chillers on or off, and/or a "system fault" category configured to selectively toggle fault indicators associated with entire systems on or off. In some instances, various other equipment categories may be provided within the equipment category selection window, such as, for example, variable air volume devices, network switches, plumbing, security devices, etc.

Referring again to FIG. 23, the fault list widget 2316 may include a list of all of the faults within the timeframe selected by the user (e.g., via one of the information timeframe buttons 2306 shown in FIG. 23) and/or the faults matching the filter selections selected by the user (e.g., via one of the fault filter dropdown icons 2309). In some instances, each fault within the fault list widget 2316 includes a variety of information pertaining to the fault. For example, in some instances, for each fault, the fault list widget 2316 may include a priority of the fault, a category of the fault (e.g., comfort, miscellaneous, energy, compliance, etc.), a fault name, a space name of a space associated with the fault, an equipment name of a piece of equipment associated with the fault, a daily score associated with the fault, a timestamp of a first occurrence of the fault, a timestamp of the latest occurrence of the fault, a total count of occurrences of the fault, a cumulative total duration of the occurrences of the fault, a work order status, a link to any notes associated with the fault, and an option to mute the fault. It should be appreciated that this list of information is meant to be illustrative and is in no way meant to be limiting. For example, in some other embodiments, various additional information may be included within the fault list widget. Further, in some instances, the user may be allowed to configure the amount and type of information displayed within the fault list widget 2316 for each fault.

In some instances, the faults displayed within the fault list widget 2316 may each be selectable to navigate the user to another asset manager page including a plurality of fault detail widgets (e.g., detail asset manager page 3000 shown in FIGS. 30 and 31) including various additional details pertaining to the selected fault.

Referring to FIGS. 24 and 26, in some instances, upon the user clicking on a particular fault indicator 2320 within the viewer widget 2314, the viewer widget 2314 may be configured to display a fault overlay card 2332 including various details pertaining to an underlying fault associated with the corresponding fault indicator 2320. In some instances, the fault overlay card 2332 may include a variety of fault details, such as, for example, a fault name, a fault criticality level, a device identifier associated with the fault, a duration associated with the fault, an estimated cost impact associated with the fault, and/or any other pertinent information, as desired for a given application. In some instances, the viewer widget 2314 may allow the user to return to the default view (e.g., the view without the fault overlay card 2332) by clicking on a reset button 2333.

In some instances, a fault indicator 2320 may be associated with a recurring fault having a plurality of associated occurrences. In these instances, the various fault details described above may be displayed within the fault overlay card 2332 for each of the associated occurrences (e.g., viewable within the fault overlay card 2332 via a window scroll bar). Similarly, in some instances, the fault associated with the selected fault indicator 2320 may be presented at a top of the fault overlay card 2332, and similar fault details to those described above may be accessible for other top faults (e.g., associated with other fault indicators 2320) within the fault overlay card 2332 (e.g., arranged below the fault information corresponding to the selected fault indicator 2320 and similarly viewable within the fault overlay card 2332 via the window scroll bar).

As shown in FIG. 24, in some instances, the fault overlay card 2332 may further include a "view details" link 2334. In some instances, the "view details" link may be configured to navigate the user to another asset manager page including a plurality of fault detail widgets (e.g., detail asset manager page 3000 shown in FIGS. 30 and 31).

Figure 30:
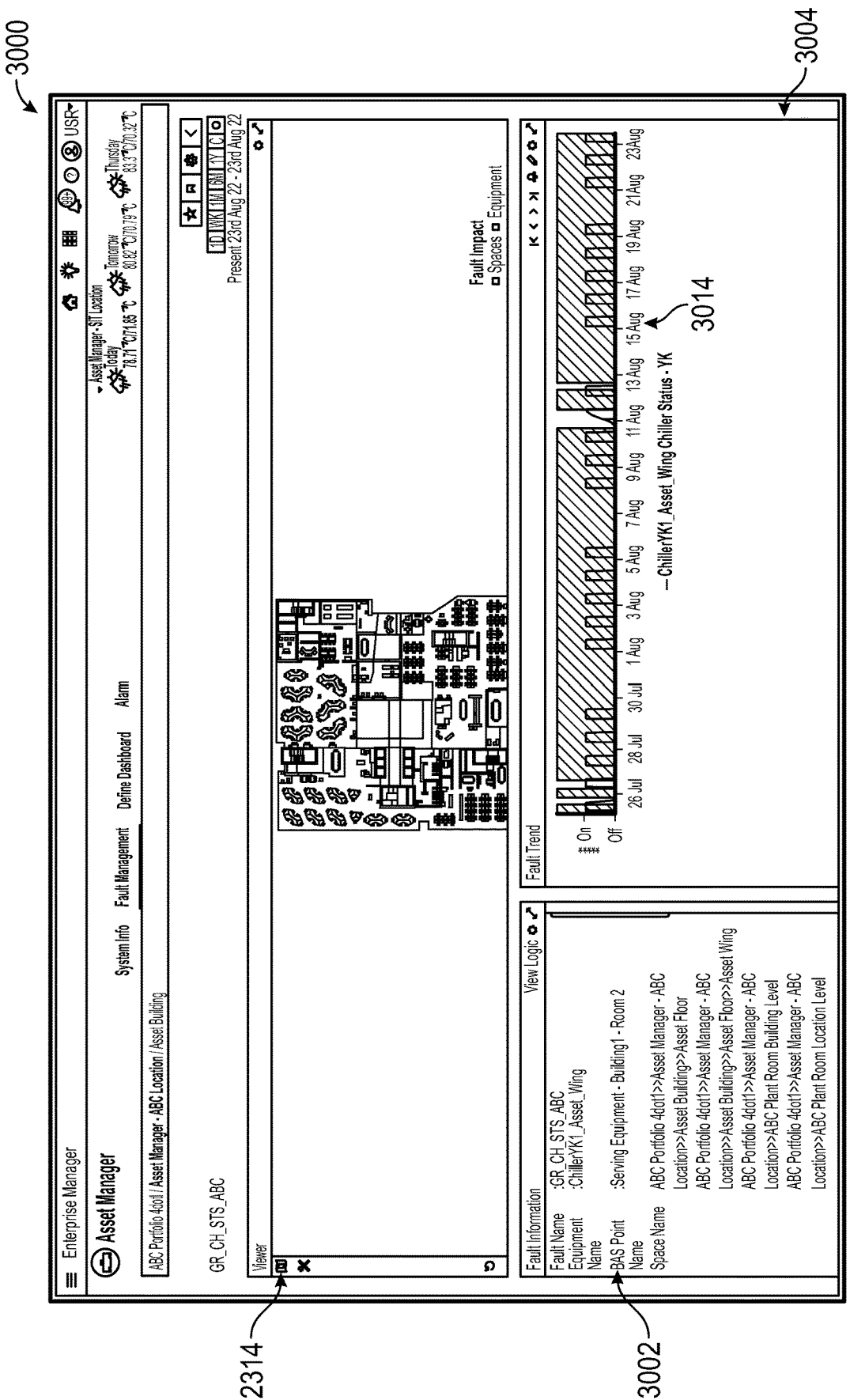
FIG. 30 is a user interface showing an upper portion of a detail asset manager page including a plurality of fault detail widgets, according to an exemplary embodiment.
Figure 31:
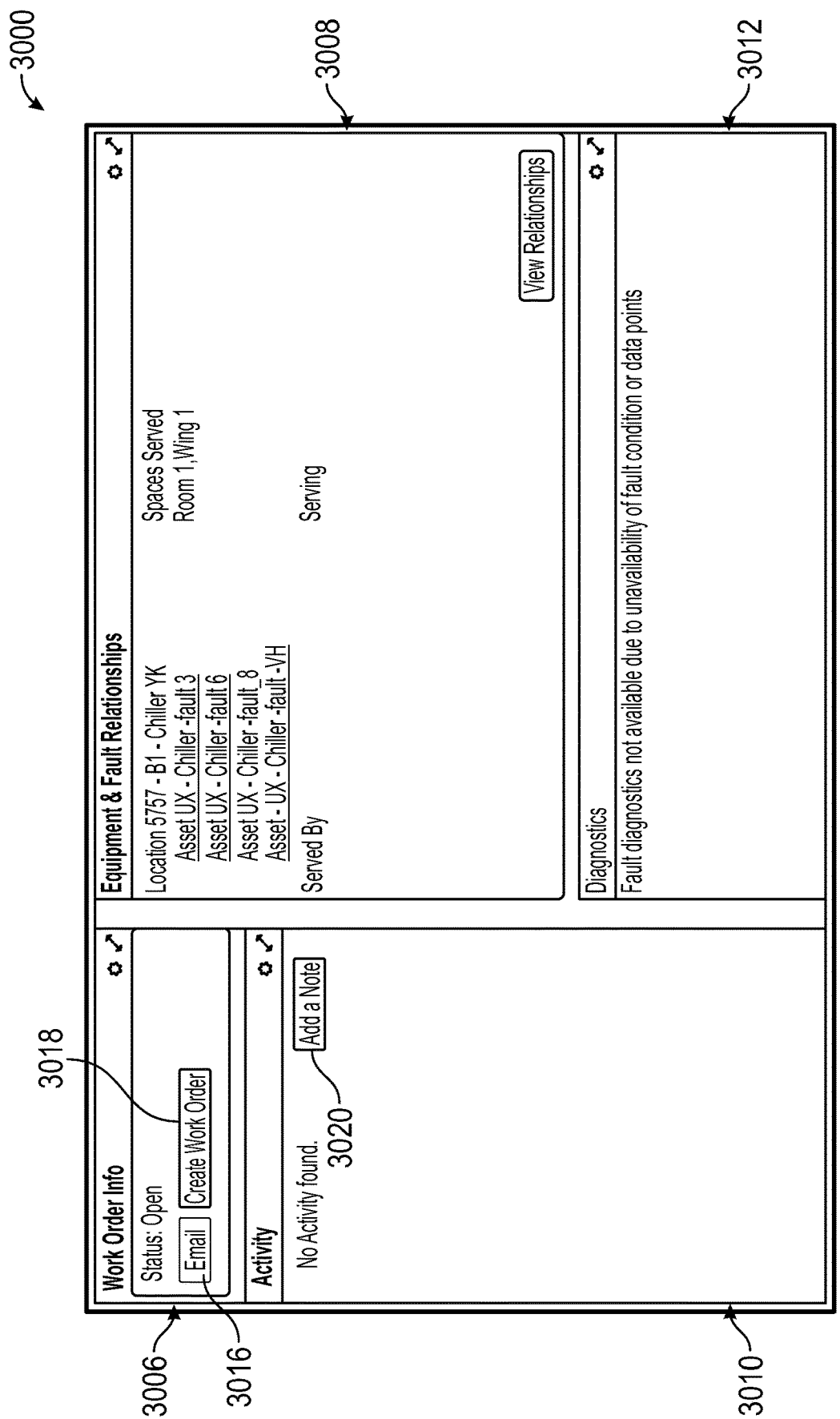
FIG. 31 is a user interface showing a lower portion of the detail asset manager page of FIG. 30 including a plurality of additional fault detail widgets, according to an exemplary embodiment.

Referring now to FIGS. 30 and 31, in some instances, upon the user clicking on the "view details" link 2334 or selecting a particular fault from within the fault list widget 2316, the system (e.g., any of the systems described herein) may navigate the user to a detail asset manager page 3000 of the enterprise manager user interface 2002. In some instances, the detail asset manager page 3000 may be substantially similar to the summary asset manager page 2300 described above, but may alternatively include a plurality of a plurality of fault detail widgets associated with the selected fault indicator 2320.

The various fault detail widgets may be configured to provide the user with a variety of specific details and information pertaining to the underlying fault associated with a selected fault indicator 2320. For example, in some instances, the detail asset manager page 3000 may include a fault information widget 3002, a fault trend widget 3004, a work order information widget 3006, an equipment and fault relationships widget 3008, an activity widget 3010, a fault diagnostics widget 3012, and the viewer widget 2314.

As shown in FIG. 30, the fault information widget 3002 may include a variety of specific information pertaining to the underlying fault. For example, the specific information pertaining to the underlying fault may include a fault name of the fault, an equipment name of a piece of equipment associated with the fault, a building automation system (BAS) point name associated with the fault, and/or a space name associated with the fault. In some other instances, the fault information widget 3002 may contain various other types of information, as desired for a given application.

In some instances, the fault trend widget 3004 may include a graphical depiction 3014 of a fault trend associated with the underlying fault of the selected fault indicator 2320. For example, in some instances, the graphical depiction

3014 may show a fault status over the selected timeframe. Accordingly, the graphical depiction 3014 may provide the user with a visual indication of a history of the fault occurring (e.g., over the selected or predetermined timeframe). In some instances, the fault trend widget 3004 may further include various recent device measurement and recording data associated with the equipment on which the fault is occurring, data associated with equipment (e.g., sensors) within a space affected by the fault, and/or data associated with other equipment served by or serving the equipment on which the fault is occurring. As such, the various device measurement and recording data may allow for the user of the system (e.g., any of the systems described herein) to diagnose the underlying issue associated with the fault.

As shown in FIG. 31, the work order information widget 3006 includes a work order status associated with the underlying fault of the selected fault indicator 2320, an email button 3016, and a "create work order" button 3018. The email button 3016 may be configured to allow the user to contact an employee, service person, or any other concerned party associated with resolving the underlying fault and to share the fault details associated with the fault with the employee, service person, or other concerned party. The "create work order" button 3018 may be configured to allow the user to create a work order to resolve the underlying fault. As such, the work order information widget 3006 is configured to allow the user to address and resolve the underlying within the context of the detail asset manager page 3000.

In some instances, the equipment and fault relationships widget 3008 includes a variety of information pertaining to the equipment associated with the underlying fault, as well as any other equipment and/or space relationships associated with the underlying fault. For example, in some instances, the equipment fault may include a list of fault occurrences associated with a location of the underlying fault, a listing of spaces served by the equipment on which the fault is occurring, a listing of any equipment served by the equipment on which the fault is occurring, and a listing of any equipment serving the equipment on which the fault is occurring. In some other instances, the equipment and fault relationships widget 3008 includes various other relevant information pertaining to the equipment and fault relationships, as desired for a given application.

In some instances, the listing of spaces served by the equipment on which the fault is occurring, the listing of the equipment served by the equipment on which the fault is occurring, and/or the listing of any equipment serving the equipment on which the fault is occurring may be determined or identified by the system (e.g., any of the systems described herein) based on device-device relationship information or device-space mapping information associated with the various systems and devices within the building that is stored within the twin manager 704 (e.g., within a graph projection database similar to the graph projection database 162).

For example, in some instances, a given fault may be occurring on a particular device having a corresponding device identifier or "twin ID." Accordingly, within the twin manager 704 (e.g., within the graph projection database), that device identifier or "twin ID" may be linked to various spaces and other devices in the building, and those links may identify how the device having the fault occurring on it is related to the various spaces and other devices in the building. Thus, the system (e.g., any of the systems described herein) may access the information stored within the twin manager 704 (e.g., within an entity relationship and event database similar to the entity relationship and event database 160) to identify the affected spaces and other related devices.

In some instances, the activity widget 3010 is configured to provide the user with an indication of any notes pertaining to activity that has been taken to address the underlying fault (e.g., notes captured or provided by service technicians). For example, the activity widget 3010 is configured to capture observations and/or notes pertaining to how the fault is being or has been addressed and provide the user with an annotative service/activity history based on the fault and/or maintenance responses to the fault. Further, the activity widget 3010 may include an "add a note" button 3020 configured to allow the user to create a new note pertaining to the fault.

In some instances, the fault diagnostics widget 3012 is configured to provide the user with various fault diagnostics based on fault condition and/or fault data information. For example, in some instances, the fault diagnostics widget 3012 may include various identified potential fault causes determined based on the fault condition and/or fault data information. Accordingly, the user may utilize the fault diagnostics widget 3012 to aid in responding to and/or troubleshooting the select fault.

As best depicted in FIGS. 32 and 33, in some instances, upon the user clicking on the "view details" link 2334 or selecting a particular fault from within the fault list widget 2316, the viewer widget 2314 may be configured to provide the user with an intelligent fault visualization view of the graphical model 2318. That is, the viewer widget 2314 may automatically navigate the user to a view of the graphical model 2318 showing the equipment on which the fault is occurring, as well as various equipment and/or spaces affected by the fault or potentially affecting the fault. As will be described below, in some instances, the intelligent fault visualization view of the graphical model 2318 for a given fault may be determined or generated by the system based on one or more of a location of a piece of equipment on which the fault is occurring, locations of one or more pieces of equipment served by or serving the piece of equipment on which the fault is occurring, locations of one or more spaces affected by the fault, and/or a fault type associated with the fault.

Referring to FIG. 32, an intelligent fault visualization 3200 of the graphical model 2318 to be displayed within the viewer widget 2314 is shown, according to an example embodiment. As illustrated, the intelligent fault visualization 3200 relates to a fault occurring on a network switch. For example, upon the user clicking on the "view details" link 2334 within a fault overlay card 2332 associated with the network switch or selecting the particular network switch fault from within the fault list widget 2316 of the summary asset manager page 2300, the system (e.g., any of the systems described herein) may automatically navigate the user to the detail asset manager page 3000 and the viewer widget 2314 may be automatically updated to show the intelligent fault visualization 3200 of the graphical model 2318.

The intelligent fault visualization 3200 shown in FIG. 32 similarly includes the graphical model 2318 and various fault indicators 2320. However, the intelligent fault visualization 3200 further includes a plurality of affected devices 3202 and an intelligent visualization overlay card 3204. In some instances, the plurality of affected devices 3202 may be highlighted or otherwise identified within the intelligent fault visualization 3200 to allow the user to quickly visualize how a given fault is affecting various devices within the building. In a similar manner to that discussed above, the various devices affected by a given fault may be determined and/or identified by the system (e.g., any of the systems described herein) based on device-device relationship information associated with the piece of equipment on which the fault is occurring, which may be retrieved from within the twin manager 704 (e.g., within a graph projection database similar to the graph projection database 162).

For example, in the example intelligent fault visualization 3200 shown in FIG. 32, the fault is occurring on a network switch. Based on the device-device relationship information, the system (e.g., any of the systems described herein) may determine that the specific network switch on which the fault is occurring serves a variety of workstations on a specific floor. Accordingly, the system (e.g., any of the systems described herein) may identify those workstations as the plurality of affected devices 3202 and highlight those workstations within the graphical model 2318, as shown in FIG. 32.

In some instances, the intelligent visualization overlay card 3204 may provide a variety of detailed information pertaining to the fault. For example, the intelligent visualization overlay card 3204 may include a fault name associated with the corresponding fault, a fault description (as shown in FIG. 33), an image or graphic of the device or equipment on which the fault is occurring, a device name associated with the device or equipment on which the fault is occurring, a device or equipment type (e.g., "network switch") associated with the device or equipment on which the fault is occurring, and/or an error code associated with the corresponding fault.

In some instances, the intelligent visualization overlay card 3204 may further include an impact toggle link 3206. The impact toggle link 3206 may be configured to allow the user to selectively toggle the highlighting of the affected devices 3202 (and/or the affected area indication 3308 shown in FIG. 33) on or off within the viewer widget 2314. In some instances, the various affected devices 3202 (and/or the affected area indication 3308 shown in FIG. 33) may be shown directly or automatically by default without the user selecting the impact toggle link 3206.

Referring now to FIG. 33, another intelligent fault visualization 3300 of the graphical model 2318 to be displayed within the viewer widget 2314 is shown, according to another example embodiment. The intelligent fault visualization 3300 may be substantially similar to the intelligent fault visualization 3200 depicted in FIG. 32. However, as illustrated, the intelligent fault visualization 3300 relates to a fault occurring on a variable air volume (VAV) system. Accordingly, while the intelligent fault visualization 3300 similarly includes the graphical model 2318, various fault indicators 2320, and an intelligent visualization overlay card 3304, the intelligent fault visualization 3300 alternatively includes an affected area indication 3308.

In some instances, the affected area indication 3308 may indicate an area affected by the selected fault by is highlighting or otherwise identifying the area within the intelligent fault visualization 3300 to allow the user to quickly visualize how the selected fault is affecting a given area within the building. In a similar manner to that discussed above, the area affected by a given fault may be determined and/or identified by the system (e.g., any of the systems described herein) based on device-space mapping information associated with the piece of equipment on which the fault is occurring, which may be similarly retrieved from within the twin manager 704 (e.g., within a graph projection database similar to the graph projection database 162).

For example, in the example intelligent fault visualization 3300 shown in FIG. 33, the fault is occurring on a VAV system. Based on the device-space mapping information, the system (e.g., any of the systems described herein) may determine that the specific VAV system on which the fault is occurring serves a specific area on a given floor. Accordingly, the system (e.g., any of the systems described herein) may identify that area as the affected area and generate the affected area indication 3308 by highlighting or otherwise indicating the affected area within the graphical model 2318, as shown in FIG. 33.

Accordingly, in some instances, the systems described herein are configured to produce intelligent fault visualizations relating to specific faults for viewing by a user. It should be appreciated that, while FIG. 32 shows various affected devices 3202 and FIG. 33 shows an affected area indication 3308, in some scenarios, a single fault may affect multiple devices and multiple areas. For example, if a fault occurs on a chiller that serves an air handling unit in a given space within a building, the air handling unit may be adversely affected by the fault, which may result in temperature issues within the given space (e.g., high zone temperatures). Accordingly, an intelligent fault visualization for the chiller fault may include the chiller (e.g., having an associated fault indicator 2320 arranged on or proximate to the chiller within the graphical model 2318), the air handling unit (e.g., highlighted, similar to the affected devices 3202 in FIG. 32), and an affected area indication (e.g., highlighted, similar to the affected area indication 3308 shown in FIG. 33). In some instances, the intelligent fault visualization may further include a heat map overlay (e.g., showing temperature distribution) indicating one or more sensor readings throughout an area affected by a fault.

In some instances, the intelligent fault visualization for a given fault may be generated or determined by the system based on the equipment on which the fault is occurring (e.g., a location of the equipment on which the fault is occurring), other equipment affected by the fault (e.g., locations of the other equipment), an area affected by the fault within the building, a location of a user device viewing the intelligent fault visualization within the building, and/or a role of the user accessing the intelligent fault visualization. In some instances, the system may further determine whether the intelligent fault visualization should be a three-dimensional building view, a three-dimensional floor view, a two-dimensional floor view, or any other suitable view based on any combination of these factors.

For example, if a given fault affects devices and/or areas spanning multiple floors, the system may generate the intelligent fault visualization for that fault as a three-dimensional building view, so as to show the user all of the affected devices and/or areas within a single view. Alternatively, as shown in FIG. 32, if a given fault (e.g., a network switch fault) only affects a few workstations on a specific floor, the system may generate the intelligent fault visualization for that fault as a two-dimensional floor view. Further still, in some instances, if a given fault affects only a subset of devices on a given wall within a particular area (e.g., an electrical circuit fault affecting only a subset of devices on a given wall), the system may generate an intelligent fault visualization for that fault as a three-dimensional floor view to allow for the user to quickly visualize which devices on a given wall are affected. Additionally, if a given fault pertains to sensor readings in a given area (e.g., temperature sensors, particulate sensors, viral load sensors, air flow sensors), the system may generate an intelligent fault visualization that includes an overlaid heat map (e.g., similar to the heat map overlay 1806) to provide the user with a visualization of the various sensor readings in the affected area.

For example, in some instances, the system may determine which type of view (e.g., a three-dimensional building view, a three-dimensional floor view, a two-dimensional floor view) to utilize for a given intelligent fault visualization based on one or more predetermined or preset rules. In some instances, one predetermined or preset rule may be that, if a fault affects devices and/or areas spanning multiple floors within the building, a three-dimensional building view is to be utilized. In some instances, another predetermined or preset rule may be that, if a fault affects multiple devices on a given floor that are not stacked vertically on the floor, a two-dimensional floor view is to be utilized. In some instances, another predetermined or preset rule may be that, if a fault affects multiple devices on a given floor that are stacked vertically on the floor, a three-dimensional floor view is to be utilized. It will be appreciated that a variety of other types of predetermined or preset rules may be created and utilized, as desired for a given application.

In some instances, the system may further determine which type of view (e.g., a three-dimensional building view, a three-dimensional floor view, a two-dimensional floor view) to utilize for a given intelligent fault visualization based on a fault type of the fault. For example, in some instances, certain fault types may be automatically linked to corresponding preset fault views.

For example, in some instances, a given fault may require technician intervention (e.g., a technician manually checking electrical connections associated with a specific device and various associated devices). In these instances, the fault may correspond to a first fault type, which may be automatically linked to a three-dimensional floor view configured provide sufficient detail for the technician to quickly identify the device on which the fault is occurring, as well as the various associated devices to aid in the technician's resolving of the underlying issue causing the fault. In some other instances, if a given fault does not require technician intervention (e.g., a security door fault), the fault may correspond to a second fault type, which may be linked to a two-dimensional floor view to be provided to the user configured to allow the user to quickly locate the security door on the floor.

In some instances, the system may further determine that one or more pieces of equipment or areas affected by a given fault are hidden from view (e.g., within a wall, below a floor, above a ceiling, hidden by another piece of equipment). In these instances, another predetermined or preset rule may dictate that one or more virtual components shown within the intelligent fault visualization for that fault should be hidden or displayed as transparent elements to allow for the underlying equipment to be viewed. In some instances, one or more predetermined or preset rules may dictate that the upstream and downstream devices associated with a given fault (e.g., equipment served by or serving the piece of equipment on which the fault is occurring) within the intelligent fault visualization for that fault should be isolated, such that all other pieces of equipment are automatically hidden within the preset fault view. For example, if a particular temperature sensor detects a high zone temperature (e.g., a "high zone temperature fault" is detected) in an area within a floor of the building, the predetermined or preset rule may dictate that the intelligent fault visualization for that fault isolates all air-side equipment within that floor (e.g., HVAC units, VAV units, chillers, heating units, etc.).

In some instances, the predetermined or preset rules and/or the preset fault views for different fault types may be received, removed, and/or modified by a user (e.g., via a settings page accessible from the summary asset manager page 2300 and/or the detail asset manager page 3000) and stored within the twin manager (e.g., twin manager 704) or elsewhere within the system (e.g., memory 120, memory 126, memory 166, etc.). It will be appreciated that a variety of other types of predetermined or preset rules and/or preset fault views may be applied to various other faults to generate corresponding intelligent fault views, as desired for a given application.

For example, in some instances, one or more predetermined or preset rules may be based on a location of a user device within the building. For example, if a fault pertains to a high energy consumption, if the system (e.g., one or the AI agents 370) determines that a user device (e.g., user device 176) on which the user is accessing the graphical model is within the building (e.g., based on GPS data or other locational data of the user device), the user may be presented (e.g., via the viewer interface 710) with directions from the user's location to the equipment affected by the fault. Similarly, in some instances, one or more predetermined or preset rules may be determined based on a role of the user accessing the viewer interface 710. For example, the user may be any of a manager, a service technician, an emergency responder, etc. In some instances, a manager may be provided with a view showing an overall building effect of a given fault (e.g., via a full building view with various assets highlighted). In some instances, a service technician may be provided with a view showing a specific area within the building (e.g., a particular room within which the fault is occurring) and highlighting the affected equipment to allow for the service technician to quickly identify and address underlying issues causing the fault. In some instances, an emergency responder may be provided with directions to a given area where the fault is occurring (e.g., an area where a smoke detector has detected a likely fire), as will be further discussed below.

In some instances, the systems described herein may be configured to predict (e.g., via AI agents 370) a travel path of smoke or fire within the building based on various ingested sensor data from within the building (e.g., smoke detector data, airflow data, a building layout of the building). In some instances, one or more predetermined or preset rules may dictate that, upon detection of a fire within the building, an intelligent fault visualization is generated and presented to the user (e.g., via the viewer interface 710) that includes an animated overlay depicting the predicted travel path of the smoke or fire within the building overlaid onto the graphical model. In some instances, the intelligent fault visualization may further include a representation of an exit path for the user to exit the building based on a location of the user device (e.g., the user device 176) and the predicted travel path of the smoke or fire. For example, the exit path may be a path within the building that avoids or otherwise circumnavigates the predicted travel path of the smoke or fire. In some instances, the predicted travel path and/or the exit path may be updated in real-time or nearly real-time based on additional ingested information.

Accordingly, in some instances, in some instances, the systems described herein may be configured to detect various emergency events occurring within the building (e.g., via the alarm application 168 or one or more beckon applications 712) and to display corresponding intelligent fault visualizations based on the detected emergency events. For example, as discussed above, in the case of a fire, the intelligent fault visualization may include navigational directions configured to navigate the user out of the building while avoiding a detected fire (e.g., using received temperature sensor date from various locations within the building). In some other instances, in the event of a detected fire where the user is an emergency responder (e.g., a member of a fire fighting team), the intelligent fault visualization may provide a location of the fire within the building to be used by the emergency responder in locating the fire. In some instances, in the case of a detected active shooter or otherwise dangerous person being detected within the building, the intelligent fault visualization may include shelter-in-place instructions or other emergency instructions. In some other instances, in the case of a detected active shooter or otherwise dangerous individual within the building where the user is an emergency responder (e.g., a law enforcement officer), the intelligent fault visualization may provide a real-time location of the active shooter or otherwise dangerous individual (e.g., determined based on one or more camera feeds) to be used by the emergency responder in locating the active shooter or otherwise dangerous individual.

Accordingly, the intelligent fault visualizations generated by the systems described herein provide dynamic, fault-driven views to the user that allow the user to quickly understand a given fault's overall effect on the building. In some instances, these dynamic, fault-specific views may allow for the user to more quickly resolve underlying issues causing the associated faults. For example, in some instances, a fault on a first piece of equipment may, in fact, be caused by a downstream (or upstream) device malfunctioning or an unrelated device malfunctioning within an area served by the first piece of equipment. The intelligent fault visualizations described herein beneficially provide the user with a fault-driven view showing, at a fault-specific level of detail, not only the equipment on which the fault is occurring, but also any downstream (or upstream) devices and/or areas affected by the fault, and may thus allow for the user to more easily identify any potential underlying issues that are causing the fault.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

In various implementations, the steps and operations described herein may be performed on one processor or in a combination of two or more processors. For example, in some implementations, the various operations could be performed in a central server or set of central servers configured to receive data from one or more devices (e.g., edge computing devices/controllers) and perform the operations. In some implementations, the operations may be performed by one or more local controllers or computing devices (e.g., edge devices), such as controllers dedicated to and/or located within a particular building or portion of a building. In some implementations, the operations may be performed by a combination of one or more central or offsite computing devices/servers and one or more local controllers/computing devices. All such implementations are contemplated within the scope of the present disclosure. Further, unless otherwise indicated, when the present disclosure refers to one or more computer-readable storage media and/or one or more controllers, such computer-readable storage media and/or one or more controllers may be implemented as one or more central servers, one or more local controllers or computing devices (e.g., edge devices), any combination thereof, or any other combination of storage media and/or controllers regardless of the location of such devices.

What is claimed:

1. A building management system for a building comprising one or more storage devices storing instructions thereon that, when executed by one or more processors, cause the one or more processors to:

ingest asset information from a building system of the building;

cause a graphical model of the building to include a fault indicator based on the asset information, the fault indicator corresponding to a fault occurring on a first physical asset within the building, the first physical asset corresponding to a first virtual asset within the graphical model;

cause a display device of a user device to display the graphical model within a user interface;

receive a selection of the fault indicator from a user via the user interface;

in response to receiving the selection:

select a fault-driven view of the graphical model depicting the first virtual asset and one or more second virtual assets, the one or more second virtual assets corresponding to one or more second physical assets affected by the fault occurring on the first physical asset; and cause the user interface to navigate to the fault-driven view, wherein selecting the fault-driven view includes selecting between a three-dimensional building view, a three-dimensional floor view, and a two-dimensional floor view based on the first physical asset or the one or more second physical assets.

2. The building management system of claim 1, wherein the instructions, when executed by the one or more processors, further cause the one or more processors to select the fault-driven view based on a location of the first virtual asset and one or more of a relationship between the first virtual asset and the one or more second virtual assets, locations of the one or more second virtual assets, or a fault type associated with the fault indicator.

3. The building management system of claim 1, wherein the one or more second virtual assets are highlighted within the fault-driven view of the graphical model.

4. The building management system of claim 3, wherein the one or more second physical assets comprise one or more spaces within the building.

5. The building management system of claim 3, wherein the one or more second physical assets comprise one or more devices that one of serve or are served by the first physical asset.

6. The building management system of claim 1, wherein the instructions, when executed by the one or more processors, further cause the one or more processors to:

identify a plurality of faults within the building based on the asset information, each fault of the plurality of faults being identified based on one or more of a cost impact of the fault, a criticality of the fault, or a duration of the fault, and wherein causing the graphical model of the building to include the fault indicator based on the asset information comprises causing the graphical model of the building to include a plurality of fault indicators corresponding to the identified plurality of faults.

7. The building management system of claim 1, wherein the instructions, when executed by the one or more processors, further cause the one or more processors to identify the one or more second physical assets affected by the fault occurring on the first physical asset based on the asset information, the asset information comprising one or more of device-space mapping information or device-device relationship information.

8. The building management system of claim 1, wherein the instructions, when executed by the one or more processors, further cause the one or more processors to, in response to receiving the selection of the fault indicator, cause the user interface to include a fault trend widget providing a representation of a history of the fault occurring over a predetermined timeframe.

9. A building management system for a building comprising one or more storage devices storing instructions thereon that, when executed by one or more processors, cause the one or more processors to:

ingest asset information from a building system of the building;

identify a plurality of faults within the building based on the asset information, each fault of the plurality of faults being identified based on one or more of a cost impact of the fault, a criticality of the fault, or a duration of the fault;

cause a graphical model of the building to include a plurality of fault indicators corresponding to the plurality of faults;

cause a display device of a user device to display the graphical model within a user interface;

receive a selection of a fault indicator of the plurality of fault indicators associated with a corresponding fault of the plurality of faults from a user via the user interface;

in response to receiving the selection:

select an intelligent fault visualization view of the graphical model, the intelligent fault visualization being based on a first piece of equipment on which the corresponding fault is occurring and one or more of a second piece of equipment that is affected by the corresponding fault, a space effected by the corresponding fault, or a fault type of the corresponding fault; and cause the user interface to navigate to the intelligent fault visualization view, wherein selecting the intelligent fault visualization view includes selecting between a three-dimensional building view, a three-dimensional floor view, and a two-dimensional floor view.

10. The building management system of claim 9, wherein the intelligent fault visualization view of the graphical model depicts the first piece of equipment and one or more of the second piece of equipment or the space affected by the corresponding fault.

11. The building management system of claim 10, wherein the one or more of the second piece of equipment or the space affected by the corresponding fault is highlighted within the intelligent fault visualization view.

12. The building management system of claim 9, wherein the instructions, when executed by the one or more processors, further cause the one or more processors to identify the second piece of equipment based on the asset information, the asset information comprising device-device relationship information associated with the first piece of equipment.

13. The building management system of claim 9, wherein the instructions, when executed by the one or more processors, further cause the one or more processors to identify the space affected by the corresponding fault based on the asset information, the asset information comprising device-space mapping information for the first piece of equipment.

14. The building management system of claim 9, wherein the instructions, when executed by the one or more processors, further cause the one or more processors to, in response to receiving the selection, cause the user interface to include a fault trend widget providing a representation of a history of the fault occurring over a predetermined timeframe.

15. A method comprising:
ingesting asset information from a building system of a building;
causing a graphical model of the building to include a fault indicator based on the asset information, the fault indicator corresponding to a fault occurring on a first physical asset within the building, the first physical asset corresponding to a first virtual asset within the graphical model;
causing a display device of a user device to display the graphical model within a user interface; receiving a selection of the fault indicator from a user via the user interface;
in response to receiving the selection:
selecting a fault-driven view of the graphical model depicting the first virtual asset and one or more second virtual assets, the one or more second virtual assets corresponding to one or more second physical assets affected by the fault occurring on the first physical asset; and causing the user interface to navigate to the fault-driven view,
wherein selecting the fault-driven view includes selecting between a three-dimensional building view, a three-dimensional floor view, and a two-dimensional floor view based on the first physical asset or the one or more second physical assets.

16. The method of claim 15, further comprising selecting the fault-driven view based on a location of the first virtual asset and one or more of a relationship between the first virtual asset and the one or more second virtual assets, locations of the one or more second virtual assets, or a fault type associated with the fault indicator.

17. The method of claim 15, wherein the one or more second physical assets comprise one or more spaces within the building.

18. The method of claim 15, wherein the one or more second physical assets comprise one or more devices that one of serve or are served by the first physical asset.

* * * * *